US007443400B2

(12) United States Patent
Matskewich et al.

(10) Patent No.: US 7,443,400 B2

(45) Date of Patent: Oct. 28, 2008

(54) FONT REPRESENTATIONS

(76) Inventors: Tanya Matskewich, 15606 NE. 40 th St., M378, Redmond, WA (US) 98052; David Kilgrow, c/o Microsoft Corporation One Microsoft Way, Redmond, WA (US) 98052; David M. Meltzer, 848 NE. 102nd St., Seattle, WA (US) 98125

( * ) Notice: Subject to any disclaimer, the term of this patent is extended or adjusted under 35 U.S.C. 154(b) by 40 days.

(21) Appl. No.: 10/917,372

(22) Filed: Aug. 13, 2004

(65) Prior Publication Data

US 2006/0017732 A1 Jan. 26, 2006

Related U.S. Application Data

(63) Continuation of application No. 10/898,578, filed on Jul. 26, 2004.

(51) Int. Cl.
*G06T 11/00* (2006.01)

(52) U.S. Cl. ..................................................... 345/467

(58) Field of Classification Search ...... 345/467–469.1, 345/470

See application file for complete search history.

(56) References Cited

U.S. PATENT DOCUMENTS

| | | | | | |
|---|---|---|---|---|---|
| 5,468,077 | A | * | 11/1995 | Motokado et al. | 400/76 |
| 5,606,649 | A | | 2/1997 | Tai | |
| 5,825,370 | A | * | 10/1998 | Yoshida et al. | 345/472 |
| 5,831,636 | A | * | 11/1998 | Merchant et al. | 345/467 |
| 5,852,448 | A | | 12/1998 | Cheng | |
| 5,903,861 | A | * | 5/1999 | Chan | 704/9 |
| 5,923,778 | A | * | 7/1999 | Chen et al. | 382/185 |
| 5,949,435 | A | | 9/1999 | Brock et al. | |
| 6,151,032 | A | * | 11/2000 | Cheng | 345/469 |
| 6,157,390 | A | | 12/2000 | Cheng | |
| 6,232,987 | B1 | | 5/2001 | Choi et al. | |
| 6,249,908 | B1 | | 6/2001 | Stamm | |
| 6,369,902 | B1 | | 4/2002 | Beaman et al. | |
| 6,426,751 | B1 | | 7/2002 | Patel et al. | |
| 6,496,191 | B2 | * | 12/2002 | Asai et al. | 345/467 |
| 6,501,475 | B1 | | 12/2002 | Cheng | |

(Continued)

OTHER PUBLICATIONS

Ariel Shamir et al., "Compacting Oriental Fonts by Optimizing Parametric Elements," *The Visual Computer* (1999), pp. 302-318.

(Continued)

*Primary Examiner*—Kee M. Tung
*Assistant Examiner*—David H Chu

(57) ABSTRACT

Methods for rendering font objects include: receiving input identifying an object to be rendered; selecting a data set for rendering the object from: (a) a first data set including font object data in a first format (e.g., trajectory data), and (b) a second data set including font object data in a second format (e.g., outline data); and rendering the object using the selected data set. The data set may be selected based on at least one run time parameter, such as the ppem or space available for the rendering, the desired text size, system resolution, font object complexity, contextual information, etc., to provide a high quality rendered image. Additional data sets (e.g., augmenting data, enhancing data, etc.) may be included to provide more rendering options to further increase the quality of the rendered image under some conditions. The various data sets may be independently created so that each data set can be produced specifically targeted to selected rendering conditions (such as a selected ppem range).

18 Claims, 49 Drawing Sheets

U.S. PATENT DOCUMENTS

| | | | | |
|---|---|---|---|---|
| 6,512,531 | B1 | 1/2003 | Gartland | |
| 6,600,490 | B1 | 7/2003 | Brock et al. | |
| 6,604,878 | B1 * | 8/2003 | Wong | 400/484 |
| 6,678,410 | B1 | 1/2004 | Phinney et al. | |
| 6,714,199 | B1 | 3/2004 | Beaman et al. | |
| 6,760,028 | B1 | 7/2004 | Salesin et al. | |
| 6,771,267 | B1 | 8/2004 | Muller | |
| 6,952,210 | B1 * | 10/2005 | Renner et al. | 345/471 |
| 6,956,968 | B1 * | 10/2005 | O'Dell et al. | 382/182 |
| 7,009,612 | B2 | 3/2006 | Hakamada | |
| 2001/0052900 | A1 * | 12/2001 | Lee | 345/467 |
| 2002/0168208 | A1 * | 11/2002 | Lee | 400/484 |
| 2004/0006749 | A1 | 1/2004 | Fux et al. | |
| 2005/0027547 | A1 * | 2/2005 | Chen et al. | 705/1 |
| 2005/0122327 | A1 * | 6/2005 | Greve | 345/467 |

OTHER PUBLICATIONS

Soon-Bum Lim et al., "Oriental Character Font Design by a Structured Composition of Stroke Elements," *Computer-Aided Design*, vol. 27, No. 3, pp. 193-207, Mar. 1995.

Laxmi Parida et al., "Computational Methods for Evaluating Swept Object Boundaries," *The Visual Computer* (1994) pp. 266-276.

Laxmi Parida, "Vinyas: An Interactive Calligraphic Type Design System," *Proceedings of the International Conference on Computer Graphics* (ICCG 93), pp. 355-368, 1993.

John D. Hobby, "Rasterizing Curves of Constant Width," pp. 1-19, 1989.

Tung Yun Mei, "LCCD, A Language for Chinese Character Design," *Software-Practice and Experience*, vol. 11, 1273-1292, (1981).

Bob Thomas, "Stroke-Based Fonts" Brochure from Bitstream Inc. of Cambridge, Mass, date not avaliable.

Internet Printout: http://www.panose.com/newmedia/stroke_fonts.asp, "East Asian Stroke Font Set," pp. 1-3, dated Mar. 28, 2003.

Internet Printout: http://www.dynalab.com.hk/eng/services/faq.html, "DynaDoc Frequently Asked Questions," pp. 1-4, dated Mar. 28, 2003.

Internet Printout: http://www.microsoft.com/typography/what/what.htm, "What is TrueType?" dated May 16, 2003.

Internet Printout: http://www.microsoft.com/typography/hinting/hinttut2.htm, "Basic Hinting Philosophies and TrueType Instructions," pp. 1-3, dated Mar. 28, 2003.

* cited by examiner

FONT REPRESENTATIONS

RELATED APPLICATION DATA

This application is a continuation of U.S. patent application Ser. No. 10/898,578, filed Jul. 26, 2004, entitled "Font Representations," naming Tanya Matskewich, David Kilgrow, and David M. Meltzer as inventors. This previous U.S. patent application is entirely incorporated herein by reference.

FIELD OF THE INVENTION

This invention generally relates to systems, methods, and computer-readable media associated with fonts and representations of fonts. Example aspects of this invention relate to designing, storing, compiling, and rendering high-quality, compact fonts that are useful over a wide variety of text sizes and on devices of varying system size and/or resolution.

BACKGROUND

Improvements in computer related technologies have spawned a wide variety of computer-containing devices that access, store, and display information to their users. Such devices include, for example, laptops and other personal computers (including pen-based computing systems and handheld computing systems); personal digital assistants; pocket personal computers; mobile and cellular telephones, pagers, and other communication devices; watches; appliances; and many other devices or systems that include monitors or other display devices that present printed and/or graphical information to users. In recent years, such devices have become smaller, lighter, faster, more powerful, and more reliable than ever.

While often taken for granted by the device users, printed or graphical information does not magically appear on display devices, and it does not magically render from printers or other devices associated with computer systems. Rather, the content and appearance of printed and graphical information are carefully controlled by the computer system, display device, and/or printer to assure that it renders in a proper and aesthetically pleasing manner. Displayed and printed information must appear in typefaces and font designs that are easy to read irrespective of the desired text size and/or the resolution of the rendering system.

Fonts based on Latin scripts and other character-based fonts generally have a relatively limited number of characters (e.g., the American-English alphabet has fifty-two letters (capital and small letters), ten numerals, punctuation, and up to approximately a few hundred other commonly used characters or symbols). Accordingly, the characters or "glyphs" associated with Latin-based fonts or other character-based fonts generally may be provided as stored outline descriptions and/or stored bitmap descriptions of the various characters at different desired text sizes, for each desired font on a system. Because of the relatively small number of characters or glyphs present in many Latin-based fonts or other character-based fonts, the memory footprint of the font (that is, the amount of computer system memory required to store the font) is not excessively large, even when stored bitmap descriptions are provided for each character at each desired text size.

Various fonts for Asian scripts and/or other ideographic, pictographic, and complex scripts, on the other hand, may contain more than 60,000 independent characters or glyphs, and many currently used Asian scripts (or other ideographic-based scripts, pictographic-based scripts, and complex scripts) contain at least tens of thousands of glyphs. Providing outline descriptions for each glyph and/or providing individual bitmap descriptions for this large number of glyphs at every desired text size on a computer system requires many megabytes of data and a large amount of file storage space. This large memory footprint can be too large for the storing, retrieving, and processing constraints of many computing devices, such as small, mobile, or hand held devices or other devices that have limited data storage space, limited memory, and/or limited processing capacity. This problem is further exacerbated in devices that enable user selection and/or dynamic download of a variety of different fonts and/or text display sizes.

In an effort to reduce the overall size of ideographic-based fonts, some font designers and producers have sought to create smaller versions of the fonts. For example, smaller versions of a font may be created by removing glyphs, features, or bitmaps from the font. This approach, however, also reduces the functionality of the font.

In another effort to reduce the overall size of ideographic-based fonts, some font designers and producers have used an approach called "glyph compositing." Instead of storing full-form outline and/or bitmap descriptions of entire glyphs for every character, one static "generic" copy of each commonly occurring glyph part or glyph fragment is stored (along with a lesser number of full-form entire glyph descriptions). In this way, the glyph parts and fragments can be shared and reused for the reconstruction of many glyphs. Although this approach reduces the overall size of the font, the font size often is still too large for devices with small amounts of available memory. Further, in this approach, many details of the natural glyph shapes are lost, and the overall quality of the reconstructed or reassembled glyph images often is reduced.

Accordingly, there is a need in the art for systems and methods that will allow fonts, including fonts with large character sets and glyph sets, to remain intact and that will enable devices to support full character complements and families of fonts and produce high quality rendered output at a variety of device resolutions and text display sizes, without overburdening the memory and processing capabilities of the computing system or device. It further would be advantageous to provide a font representation that produces high quality output on small mobile devices and/or other devices having limited or reduced memory and/or processing capabilities.

SUMMARY

Aspects of the present invention include numerous approaches that help to improve legibility and aesthetic appearance of a font representation and/or decrease storage size required for a font representation.

Numerous aspects of this invention are applicable to font representations of various scripts (including Latin and East Asian scripts) and are independent of any particular font format or script type. Some aspects can be especially beneficial if applied to structured ideographic fonts. Some aspects help contribute to the quality of font representations that are to be rendered at small text sizes or/and low display resolutions. Additional aspects of the invention relate to reusability of font objects and extensions of the TrueType technology.

Different aspects of the invention address multiple issues in such primary areas as geometrical descriptions of font elements and instructing font elements (e.g., specification of possible modifications of the appearance of a font element under different conditions). Both areas are considered in close connection to use of a component-wise structure of a font representation. While numerous aspects of the invention may be applied independently of a particular structure of a font representation, some other aspects provide methods that can be differentially applied to different font elements (such as glyphs, radicals, and strokes) based on characteristics specific to a particular type of font element. Because one of the ultimate purposes of a font representation is to provide high quality rendering results, aspects of this invention analyze in detail how different elements of a font representation can be "tuned," depending, for example, on actual characteristics of the rendered image to be produced (such as pixels regions available for rendering a glyph, glyph parts, and/or glyph components), hardware specifications, run-time parameters, etc.

Aspects of the invention also aim to propose additional opportunities for high quality designs of font representations and do not imply any necessary limitations. For example, font representations in accordance with at least some examples of the invention can support any desired level of tradeoff between diversity of the font design and compactness (which typically leads to some uniformity of the design). Many aspects of the present invention can be easily supported by existing font technology (including existing font formats, existing rendering engines (such as TrueType), etc.). However, some can benefit (for example, contribute to compactness of a font representation) if supported by special features of a font format and rendering engine. Therefore, some possible extension of currently existing font technology is possible in accordance with at least some aspects of this invention.

According to at least some aspects of the present invention, multiple geometrical descriptions of the same font elements, including, for example, a combination of trajectory-based geometrical descriptions, outline-based geometrical descriptions, and optionally bitmap-based descriptions and/or augmented trajectory-based descriptions, may be combined. These different descriptions may be designed independently and may be used under different conditions (for example, based on run time parameters, such as available space or ppem for the rendering, system resolution, font size, etc.), so that for every combination of possible rendering conditions, a rendered image of a font element will have an optimal appearance. A single rendering engine may be used to render these font objects from the various different descriptions. This approach allows the font to "cover" complete glyph sets and complete ranges of ppems with a relatively simple design and without significant memory space expenses. The approach has a potential to significantly reduce the need for bitmap descriptions of font elements without compromising rendered quality. This results in a decrease of required storage size (as compared to corresponding font representations containing a significant number of bitmap-based descriptions). It also contributes to sub-setting of a font for conditions known a priory. Additional aspects of the invention provide approaches for handling enhancing features of font elements or font objects (such as serifs, special stroke ending features, and the like), which also contribute to the overall quality of a font representation.

Still other aspects of the invention relate to instructing elements of a font representation. In particular, for componentized font representations, aspects of the invention propose such rules and means of control that can increase reusability of the font components, which also contributes to compactness of a font representation and provides a possibility to design every one of the font components more carefully, which naturally leads to a better quality. According to some aspects of the present invention, instructing code associated with a font component may be sensitive both to the context of a component in a specific glyph (e.g., on information that may vary from glyph to glyph) and to run-time information (e.g., on information that may vary from one run-time request of a specific glyph to another request), and the code should not impose any specific limitations on possible modifications of a component's data. The use of componentized font representations and instructing code supports pixel-hinting and its applications to elements of font representations at any level of a hierarchy, as well as to parameters of the conditional rules associated with the elements.

In accordance with at least some examples of the present invention, instructing code may be associated with reusable radical components to make any rendering of the component sensitive to an arrangement of the radical components or guiding frames associated with radical components in a particular glyph. In accordance with still other example aspects of the present invention, rules associated with reusable radical components may be provided that will be responsible for generation of a simplified form of a radical (e.g., by eliminating one or more strokes in the radical) whenever there is not enough pixel space available for legible or complete rendering of a full representation of the radical as a component of a font object (e.g., may use guiding frame data for the radical and/or pixel availability information).

Additional aspects included in at least some examples of font representations according to this invention may include:

(a) representation of "enhancing features" of a font (such as serifs, ending features, and the like) by swept trajectory data;

(b) modifiable enhancing features of the type described above;

(c) a "fill-in" routine to be executed by a rendering engine that "fills-in" closed regions defined by a trajectory-based description (e.g., if a trajectory-based description encloses an area including pixels, this routine will ensure that all pixels within the enclosed area are "turned on");

(d) the ability to choose or select a geometrical description of a font object, at least in part, based on the pixel region available for rendering all or some portion of the font object (e.g., based on run time information) (in at least some instances, different geometrical descriptions may be used for different parts or components of the same font object (e.g., part of a font object may be rendered using augmented trajectory-based descriptions, while other parts of the same object may be rendered using simple trajectory-based descriptions));

(e) a font representation and a rendering engine that uses trajectory-based descriptions based on TrueType-compatible mathematical representations;

(f) the ability to use information regarding arrangements of guiding frames (or bounding boxes) of radicals (or other font objects) to configure other radicals (or other font objects) in the context of a glyph;

(g) the ability to use information regarding guiding frames (or bounding boxes) of radicals (or other font objects) to configure the radical (or other font object) itself (e.g., key elements of an object may be positioned with respect to the guiding frame (or bounding box));

(h) the ability to use information regarding guiding frames (or bounding boxes) of radicals (or other font objects) for pixel-hinting of glyph components (e.g., pixel-hinting with respect to the guiding frame (or bounding box) of an object);

(i) the ability to pixel-hint positions and/or dimensions of a guiding frame (or bounding box) itself;

(j) the ability to conditionally enable or disable augmentations and/or enhancing features, e.g., based on the pixel region available for the rendering;

(k) rules associated with a reusable radical object (or other font object) for performing stroke substitution depending on glyph specific information and run time information (e.g., may use guiding frame and/or pixel availability based information); and (l) the extension of TrueType hinting language to support the various approaches described above.

As one more specific example, additional aspects of this invention may include methods for rendering a desired font object that include: receiving input data indicating a desired font object to be rendered; obtaining data for rendering the desired font object from a font object data set, wherein the font object data set includes data corresponding to a description of the desired font object and data corresponding to at least one augmenting trajectory description corresponding to an enhancing feature for at least one portion of the desired font object; and rendering the desired font object using the obtained data. Use of the augmenting data may be optional, so methods according to this aspect of the invention additionally may include determining whether to use the augmenting trajectory description during the rendering. This determination may include evaluation of one or more "run time parameters," such as data relating to an amount of space available for rendering the desired font object; data relating to a guiding frame size for the desired font object when rendered; data relating to a text size for rendering the desired font object; data relating to a resolution associated with the rendering of the desired font object; and data relating to ppem associated with the rendering of the desired font object. Additionally, if desired, the size, shape, location, or other characteristics of the enhancing feature may be modified, e.g., based on input data during the rendering.

In at least some examples, the augmenting trajectory data used for rendering the desired font object may, at least in part, define a region that encloses one or more pixels. In such situations, during the rendering step, all of the pixels located fully within this enclosed region may be activated in the same manner as the other pixels activated in rendering the desired font object (e.g., so that the enclosed area will not enclose unactivated pixels).

Additional aspects of the invention may relate to methods for rendering a desired font object that include: receiving input data indicating a desired font object to be rendered; selecting a data set for providing data for rendering at least a first portion of the desired font object, wherein the data set is selected from the group consisting of: (i) a first data set that includes data relating to at least the first portion of the desired font object in a first format, and (ii) a second data set that includes data relating to at least the first portion of the desired font object in a second format, wherein the data set is selected, at least in part, based on a pixel region available for rendering at least the first portion of the desired font object; and rendering at least the first portion of the desired font object using the selected data set. Again, the selected data set(s) may include one or more augmenting data descriptions corresponding to one or more enhancing features for the desired font object, as generally described above. When the desired font object includes at least a second portion, the second portion also may include an augmenting data description corresponding to an enhancing feature, and the selecting may include determining whether to use the second augmenting data description during the rendering, optionally, based at least in part on the pixel region available for rendering the second portion.

Another example aspect of the invention relates to methods for rendering a desired font object that include: receiving input data indicating a desired font object to be rendered; obtaining data for rendering the desired font object from a font object data set, wherein the font object data set includes data corresponding to at least a first augmenting data description corresponding to a first enhancing feature for the desired font object; determining whether to use the first augmenting data description based, at least in part, on a pixel region available for rendering at least a first portion of the desired font object including the first enhancing feature; and rendering the desired font object, wherein the desired font object is rendered using the first augmenting data description when the determining step determines that the pixel region available for rendering the first portion of the desired font object is large enough to display the first enhancing feature and wherein the desired font object is rendered without using the first augmenting data description when the determining step determines that the pixel region available for rendering the first portion of the desired font object is not large enough to display the first enhancing feature. Of course, these same procedures may be used, if desired, for determining whether to render a second or additional enhancing features for the desired font object.

Still an additional aspect of the invention relates to methods for rendering a desired font object that include: receiving a first data set for rendering at least a first portion of the desired font object wherein the first data set includes data relating to a guiding frame associated with at least the first portion of the desired font object; receiving a second data set for rendering at least a second portion of the desired font object; and rendering the desired font object using at least the first data set and the second data set, wherein the data relating to the guiding frame is used in determining at least one of a position, size, or shape of at least some part of the second portion of the desired font object during the rendering. An additional or alternative aspect of the invention relates to methods for rendering a desired font object, that include: receiving a first data set for rendering at least a first portion of the desired font object wherein the first data set includes data relating to a guiding frame associated with at least the first portion of the desired font object; and rendering the desired font object using at least the first data set, wherein the data relating to the guiding frame is used in determining at least one of a position, size, or shape of at least some part of the first portion of the desired font object during the rendering.

Additional aspects of the invention relate to hinting when rendering font objects. One example of this aspect relates to methods for rendering a desired font object that include: receiving a first data set for rendering at least a first portion of the desired font object wherein the first data set includes data relating to a guiding frame associated with at least the first portion of the desired font object; receiving a second data set for rendering at least a second portion of the desired font object; and rendering the desired font object using at least the first data set and the second data set, wherein the data relating to the guiding frame is used in hinting at least some part of the second portion of the desired font object during the rendering. Another example of this aspect of the invention relates to methods for rendering a desired font object that include: receiving a first data set for rendering at least a first portion of the desired font object wherein the first data set includes data relating to a guiding frame associated with at least the first portion of the desired font object; and rendering the desired font object using at least the first data set, wherein the rendering includes hinting of the guiding frame to, at least in part, control a position or size of at least a part of the first portion of the desired font object.

An additional example aspect of the invention relates to methods for rendering a desired font object that include: receiving input data indicating a desired font object to be rendered, wherein the desired font object includes plural portions; determining an amount of pixel space available for rendering the desired font object; and rendering a complete version of the desired font object when the amount of pixel space available is sufficient to render the complete version of the desired font object and rendering a modified version of the desired font object when the amount of pixel space available is insufficient to render the complete version of the desired font object, wherein the modified version of the desired font object has eliminated at least one portion as compared to the complete version of the desired font object. Still another example aspect of the invention relates to methods for rendering a desired font object, that include: receiving input data indicating a desired font object to be rendered, wherein the desired font object includes at least a first portion and a second portion; determining an amount of pixel space available for rendering the desired font object; and rendering a complete version of the desired font object, including the first portion and the second portion, when the amount of pixel space available is sufficient to render the complete version of the desired font object and rendering a modified version of the desired font object when the amount of pixel space available is insufficient to render the complete version of the desired font object, wherein the modified version of the desired font object has substituted a third portion for at least one of the first portion or the second portion as compared to the complete version of the desired font object.

Aspects of the invention also relate to systems, rendering engines, and computer-readable media including computer-executable instructions stored thereon for performing various methods, including the methods described above.

Another specific example aspect of the invention relates to computer-readable media including data stored thereon for rendering font objects, wherein the data includes, for example: a first data set including mathematical representations of plural font objects in a conventional TrueType font format (e.g., in an outline format); and a second data set including mathematical representations of plural font objects in a trajectory format, wherein the mathematical representations in the second data set are TrueType compatible representations. The data sets may be stored on the media in one or more tables without departing from the invention.

Rendering systems in accordance with examples of this invention may include, for example: means for receiving input indicating a desired font object to be rendered; and a rendering engine for providing data for rendering the desired font object, wherein the rendering engine has access to computer-readable media including at least a first data set stored thereon for rendering plural font objects including the desired font object, wherein the first data set includes mathematical representations of plural font objects including the desired font object in a trajectory format, wherein the mathematical representations in the first data set are TrueType compatible representations. Another example rendering system according to the invention may include: means for receiving input indicating a desired font object to be rendered; and a True Type rendering engine for providing data for rendering the desired font object, wherein the TrueType rendering engine includes access to data for at least one hinting procedure associated with the desired font object as part of the rendering, wherein the hinting procedure includes at least one member selected from the group consisting of: hinting at least some portion of the desired font object based on a guiding frame associated with a different portion of the desired font object; hinting a guiding frame associated with a first portion of the desired font object to, at least in part, control a position or size of at least a part of the first portion of the desired font object; hinting to eliminate at least one portion of the desired font object based on a size of a guiding frame associated with at least a first portion of the desired font object; and hinting to substitute at least one stroke in the desired font object with a different stroke based on a size of a guiding frame associated with at least a first portion of the desired font object.

BRIEF DESCRIPTION OF THE DRAWINGS

The above and other objects, features, and advantages of the present invention will be more readily apparent and more fully understood from the following detailed description, taken in conjunction with the appended drawings, in which.

DETAILED DESCRIPTION

I. Terms

Figure 1A:
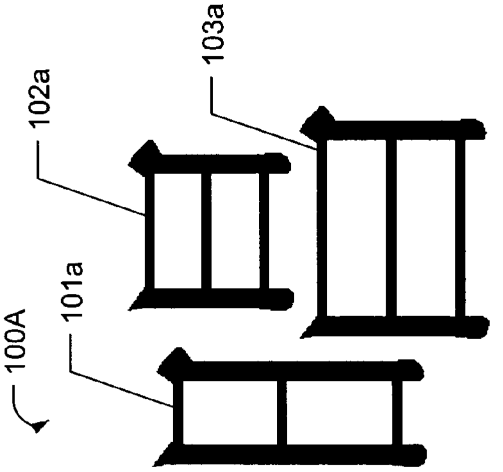
FIGS. 1A through 1C illustrate examples of "natural" modifications of the appearance and "natural" behaviors of various glyph components.

The following terms are used herein, and unless otherwise noted or clear from the context, these terms have the meanings provided below.

"Hierarchical Representation" or "Structured Representation"—A "hierarchical" or "structured" representation of a glyph or font, as used herein, means that glyph data corresponding to at least some glyphs in a font is composed from data corresponding to one or more separate radicals (and these individual radicals may be repeated in a single glyph and/or in several glyphs in the font), and further that at least some radicals in the glyphs may be composed from data corresponding to one or more separate strokes (and these individual strokes may be repeated within a single radical, in numerous glyphs, and/or in other radicals in the font). In some instances or examples, individual strokes also may be composed from data corresponding to one or more "stroke portions," which may include data corresponding to various stroke enhancing features (such as end features, serifs, or the like) that are individual or common to plural strokes, radicals, and/or glyphs in the font. In addition, and alternatively, some glyphs may be directly composed from one or more stroke components and/or one or more stroke enhancing features without any specified radical component. There is no limitation imposed to the possible kinds hierarchies supported by fonts in accordance with examples of the invention and/or to the number of levels in any particular hierarchical structure.

"Simple Glyph" or "Simple Glyph Representation" or "Non-Hierarchical Glyph" or "Non-Hierarchical Glyph Representation"—These terms all are used interchangeably to refer to a glyph or glyph representation that has a single level of description and no additional component parts.

"Glyph"—The term "glyph" refers to a shape that is defined in a font to represent a character or another graphic element on screen, on paper, on any display device, on any display medium, and/or output in any other manner. As used herein, glyphs include, but are not necessarily limited to representations of: letters, characters, symbols, shapes, graphics, icons, ideographic characters, pictographic characters, and the like. Glyphs may be composed of one or more independent instances of radicals and/or strokes and/or stroke portions. A glyph may contain multiple instances of the same radical and/or multiple instances of the same stroke and/or multiple instances of the same stroke portion. The term "glyph" also may refer to the physical displayed image of a character or other graphic element.

"Radical"—The term "radical" refers to a conceptual building block of a glyph, or to a sub-symbol included as part of at least some glyphs. A radical typically comprises a set of one or more associated (or grouped) strokes that may appear separately, connected, or overlapping within a glyph when rendered. Although there is similarity, the term "radical," as used herein, is broader and more general than the rather restricted term "radical" used in formal linguistics and used in describing certain parts of East Asian writing systems (such as Chinese, Japanese, and Korean). In this specification, the term "radical" may apply to glyph components that are artificially, but purposefully constructed, e.g., to improve system performance, reduce overall font size or the like, and such "radicals" may have no analog in formal linguistics or written ideographic, pictographic, or complex scripts.

"Stroke"—A building block of or a sub-symbol included as part of at least one radical and/or glyph. A stroke is typically a continuous uninterrupted single marking segment akin to a segment produced by one brush or pen movement in handwritten text. A stroke also may be akin to a portion of one brush or pen movement in handwritten text. Also, as used herein, a stroke may be any artificial, but purposefully made element of a glyph object whether or not it corresponds to any analog of written text.

"Display device"—Any device on which, or through which, information (including printed, visual, and/or graphical information) is presented to a user. Such devices may include, but are not necessarily limited to: computer screens or monitors (including, but not limited to monitors associated with laptops, desktops, pen-based computing systems, hand-held computing systems, and the like); LCD, LED, plasma, or other display surfaces (including, but not limited to display screens or surfaces associated with computers, televisions, telephones, pagers, other communication devices, watches, personal digital assistants, appliances, and the like); a projector for projecting an image including virtual images and including rendered information onto a surface, screen or wall; and the like.

"Render" or "Rendered" or "Rendering"—The process of determining how information (including text, graphics, and/or electronic ink) is to be displayed, whether on a surface, on a screen, printed, displayed using a projector, or output in some other manner. With respect to fonts, the term "rendering" may include the process of converting run-time contextual information and data (such as, requested character/glyph identifiers, device resolution, requested text display size, and the like) and stored font data and information (e.g., outlines, bitmaps, trajectories, and the like) into final display-ready images (also called "rendered images"), e.g., through the transformational steps of scaling, grid fitting, pixel-hinting, scan conversion, and the like. "Rendering" is not limited to black-and-white displays. Rather, information may be rendered in color, in grayscale, and/or in any appropriate format or method without departing from the invention.

"Rendering Engine"—The software and programs involved in the process of rendering font data and/or other information.

"Rendering Device"—Any device that provides, produces, or makes available rendered information in its final presentation form, including printed and/or graphical information. In addition to "display devices" as described above, rendering devices include printers (e.g., dot matrix printers, ink jet printers, laser jet printers, copiers, and the like); typewriters; and the like.

"Computer-Readable Medium"—The term "computer-readable medium" refers to any available media that can be accessed by a user on or through a computer system. By way of example, and not limitation, "computer-readable media" may include computer storage media and communication media. "Computer storage media" includes volatile and non-volatile, removable and non-removable media implemented in any method or technology for storage of information, such as computer-readable instructions, data structures, program modules, or other data. "Computer storage media" includes, but is not limited to: RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

"Function," "Program," "Routine," or "Rule"—These terms are used interchangeably in this specification and refer to computer code and/or computer-executable instructions.

"Pixel"—The term "pixel" refers to the smallest, elemental, individually-addressable unit of a display or the smallest discrete element of a stored bitmap.

"Pixel Grid"—The entire two-dimensional, rectangular coordinate system that is available in device space for a particular display medium.

"Rendering Pixel Space"—A specific, limited-size, two-dimensional, rectangular array of pixels to which a desired glyph, radical, stroke, and/or other image will be rendered.

"Pixel Region"—A specific, limited-size, two-dimensional set of pixels available for rendering a specific glyph, or a component or sub-component of a glyph.

"Device Resolution"—The number of pixels (or discrete "dots") available per inch on a display device. Usually, device resolution is expressed in units of "dpi" (dots per inch) or "ppi" (pixels per inch).

"PPEM" or "ppem"—The term "PPEM" ("Pixels Per EM") or "ppem" is a typographic term and a numeric value (or pair of numeric values) referring to the number of pixels used for defining a particular bitmap or a particular set of bitmaps that all have the same bitmap size. This term also is used in some instances to refer to the number of pixels available for a rendered image.

"Component"—The term "component" refers to one part that can be arranged or combined with other parts to form a whole. When used in the context of a glyph, the term may refer to a radical, a stroke, a stroke portion, an enhancing feature, and the like that may be used, optionally in combination, to make up the entire glyph.

"Point Size"—A typographic term referring to a physical measure of vertical height for text or graphics. There are 72 points in 1 inch.

"Desired Glyph"—The terms "desired glyph" and "requested glyph" are synonymous. The desired glyph is the one intended to be displayed.

"Memory Footprint"—The term "memory footprint" refers to the amount of computer system memory required to store a font, or a set of fonts.

II. Background and General Information Relating to the Invention

A. Information Relating to Certain Fonts for Use on Electronic Devices

As those skilled in the art understand, things that exist in the everyday world and computer-based constructs representing these things can be confused with one another, particularly when both are referred to using the same name or term. To reduce possible confusion, the term "entity" is used in this specification to refer to things (e.g., people, books, plants, ideas, computers, businesses, written characters, etc.) that exist in the real world, and the term "object" has been chosen to refer to computer-based constructs that model or represent various real world entities. A glyph written on paper is an example of a glyph "entity" while a computer-based stored representation of a glyph is an example of a glyph "object."

Ideographic written scripts have a large number of characters with repeating basic design elements. In the written scripts of East Asia, many characters, pictographs, ideographs, and the like are constructed from a basic set of strokes. The written characters (or glyphs) also are conceived and constructed from meaningful combinations of a basic set of linguistic and graphical parts called "radicals." Rules for writing the scripts, and linguistic rules for placement of constituent parts within the written character forms (ideographic space) also exist. Although the basic strokes and basic radical shapes are repeated and reused, there may be slight and subtle variations in these elements that occur naturally and intentionally. Some of the variations reflect a natural influence of each part on the other constituent parts (such as relative positioning, size, length, width, and orientation, etc.) as they seemingly "compete" for space within the bounds of the character or ideographic space. Variations of stroke and radical shapes also may occur in different writing styles, as a result of cultural preference for internal "balance" and "harmony" in the character forms, and as a result of different cultural preferences for different aesthetic graphical shapes. Historically, in order to retain all of these subtleties and variations, East Asian fonts have been designed and constructed to contain at least one set of stored geometrical data for each character or glyph that has any difference in shape or form, resulting in large font sizes (e.g., fonts having a large memory footprint when stored electronically).

Figure 1B:
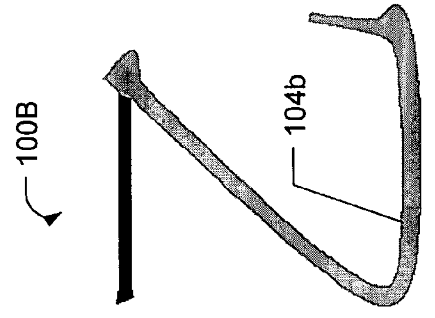
Figure 1C:
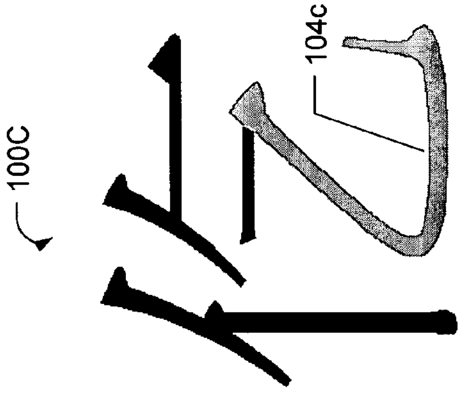

FIGS. 1A-1C illustrate a few examples of natural modifications and natural behaviors that may be designed into component radicals and strokes within different glyph contexts. In glyph 100A (FIG. 1A), three variations of the same basic radical (101*a*, 102*a*, and 103*a*) appear in a centered and balanced overall glyph composition. Each instance of the basic radical varies in overall height and/or width. In glyphs 100B and 100C (FIGS. 1B and 1C, respectively), two instances of the same basic stroke (104*b* and 104*c*) appear in two different contexts. In order to fit in the remaining available space, stroke 104*c* in glyph 100C is made smaller (narrower and shorter) than stroke 104*b* in glyph 100B. Notably, although different instances of a radical have different global characteristics (such as different horizontal and vertical extents), the radicals still share many common characteristics, and the various instances still can be easily recognized as instances of the same object. In particular, independent of the "global" shape modifications, the various instances of radicals 101*a*, 102*a*, and 103*a*, and strokes 104*b* and 104*c* maintain certain characteristics such as stroke width and the appearance of stroke endings and corners. Certain elements (such as endings, corners, and sharp turns, etc.) may be positioned differently with respect to other elements, but they maintain their shape as well as the type of and shape of interconnecting elements.

In many East Asian fonts, it is possible to identify a natural hierarchy of reusable glyph components. For example, many East Asian glyph objects can be constructed from a collection of reusable components, including, for example: commonly occurring radical objects, commonly occurring stroke objects, and commonly occurring enhancing feature objects (such as stroke endings, serifs, and the like). This natural hierarchy, and the reusability of glyph components, can be reflected in the organization and structure of stored glyph representations. In order for the glyph components to be reusable in a general sense and yet retain fidelity to the original design details, additional "guiding" information, composition information, and "reconstruction" rules must be stored in the font or preserved in some other way.

Figures 2A, 2B, 2C, 2D, 2E, 2F:
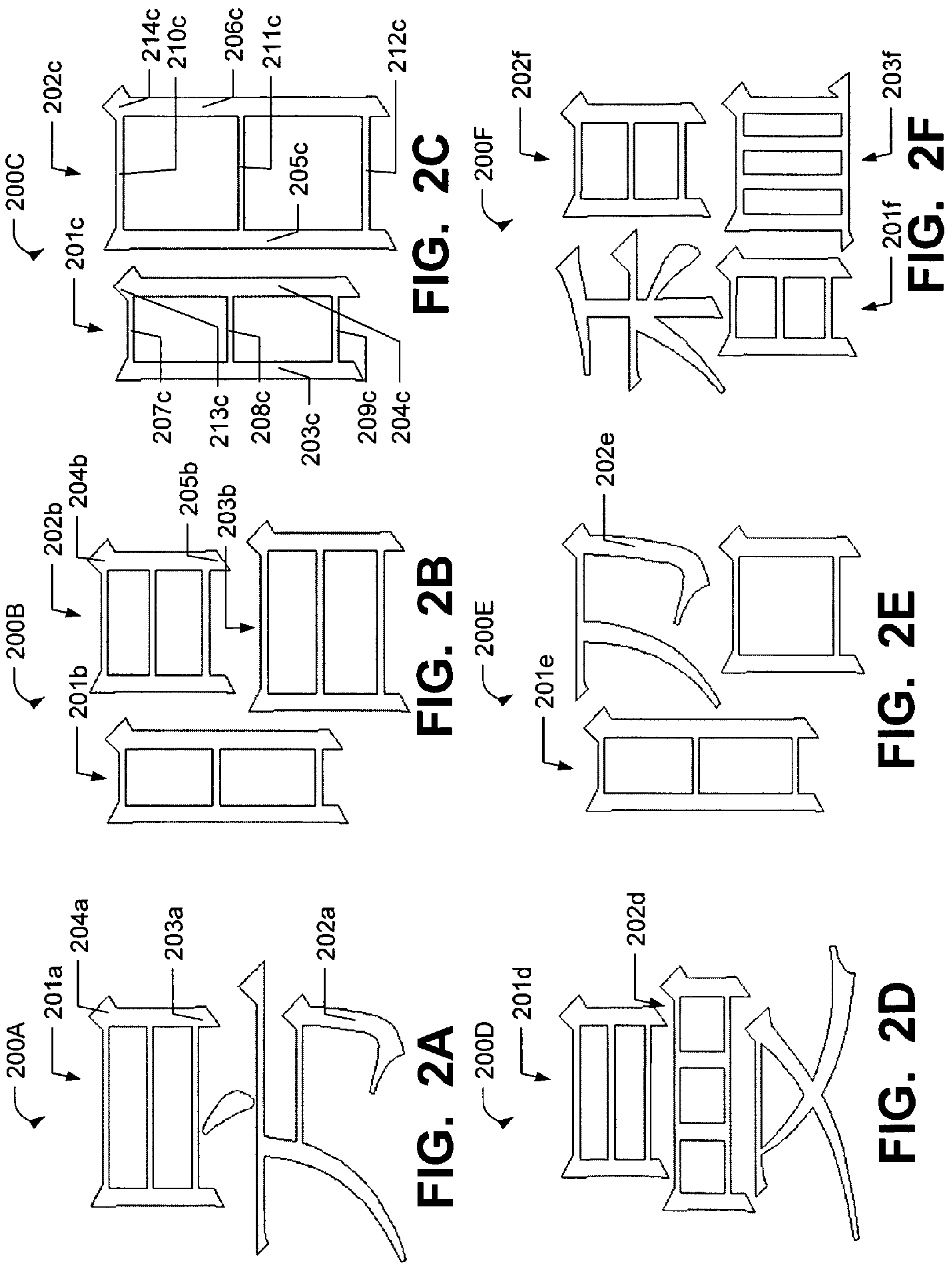
FIGS. 2A through 2F illustrate examples of glyph elements repeated in numerous glyphs.

FIGS. 2A-2F illustrate a variety of reusable glyph components in six example glyphs (200A, 200B, 200C, 200D, 200E, and 200F). All six glyphs contain (among other reusable parts and components) at least one instance of the same reusable radical component (201*a*, 201*b*, 202*b*, 203*b*, 201*c*, 202*c*, 201*d*, 201*e*, 201*f*, and 202*f*). All six glyphs shown in FIGS. 2A-2F contain multiple instances of reusable stroke components. For example, glyph 200A and glyph 200E each contain one instance of the same reusable stroke component (202*a* and 202*e*). All six glyphs also contain multiple instances of reusable stroke enhancing features (e.g., stroke endings), such as strokes 203*a* (FIG. 2A) and 205*b* (FIG. 2B), and enhancing features 204*a* (FIG. 2A) and 204*b* (FIG. 2B). Not only are the various components reusable across multiple glyphs, but the radical, stroke, and enhancing feature components also are reusable as instances within the naturally occurring component hierarchy of a single glyph. For example, in glyph 200C (FIG. 2C), each of the two radical components (201*c*, 202*c*) may be comprised of two instances of a reusable vertical stroke component (such as 203*c*, 204*c*, 205*c*, 206*c*), and three instances of a reusable horizontal stroke component (such as 207*c*, 208*c*, 209*c*, 210*c*, 211*c*, 212*c*). Further, at least some instances of a horizontal stroke component may (or may not) include an instance of a reusable enhancing feature (such as 213*c*, 214*c*).

Not only is a natural hierarchy of glyph components observable in many written scripts and fonts, but natural variations and modifications to the shape of glyph components (relative to each other) can be seen. For example, as a basic recurring stroke or radical is written or rendered, it may be stretched or compressed, expanded or contracted, thinned or broadened, or otherwise modified to fit the allocated or remaining area in the ideographic space for the glyph. Indeed, some parts of a stroke or radical may appear to be "deformed" to accommodate the graphical shape of some other part(s). A high quality font design will retain these natural modifications and variations. Systems and methods for designing, producing, compiling, and rendering compact fonts are needed that can retain and reflect the original design intent in the displayed glyph images.

Figure 3A:
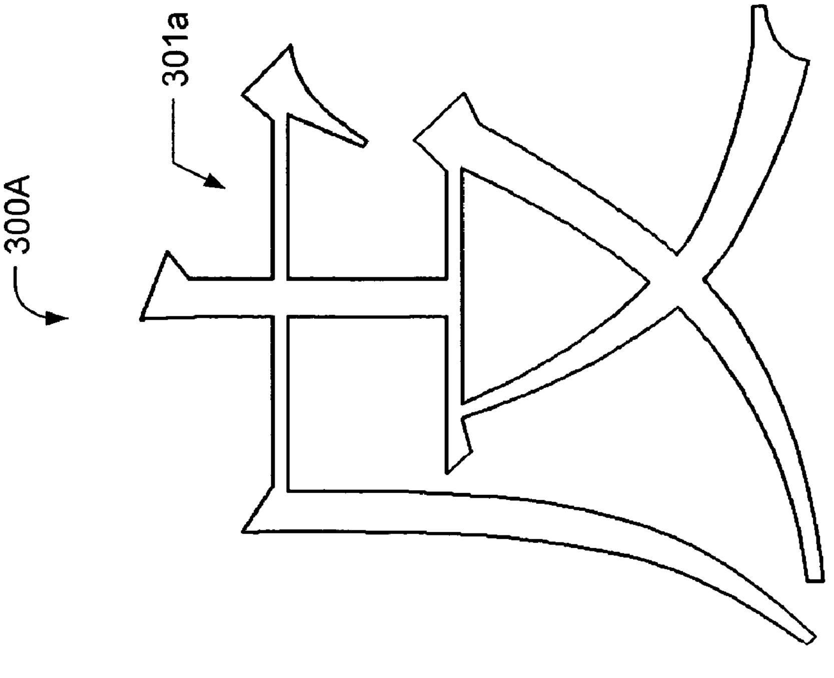
FIGS. 3A and 3B illustrate an example "modification" of a radical entity.
Figure 3B:
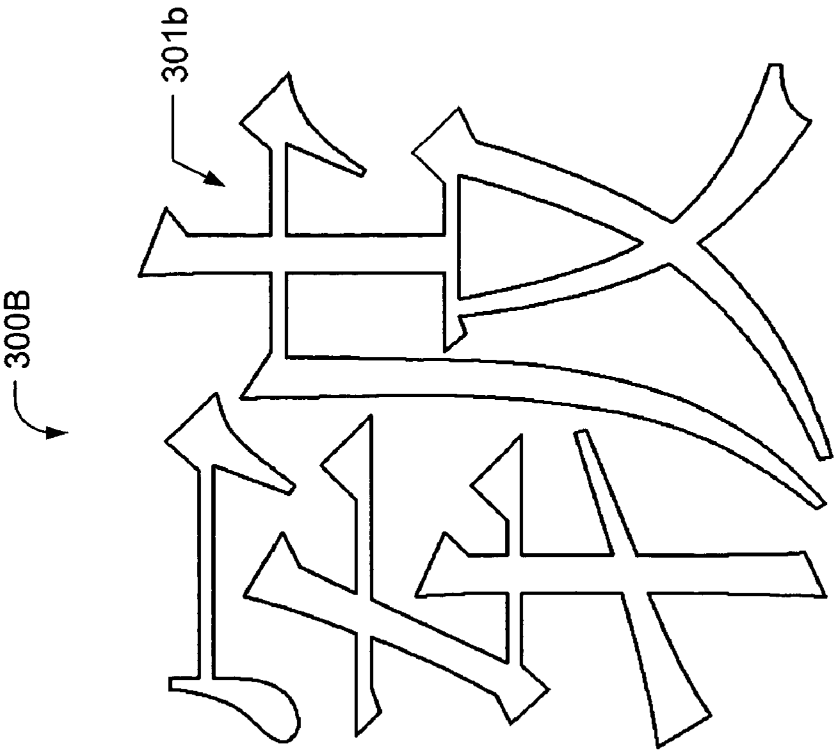
Figures 4A, 4B, 4C, 4D:
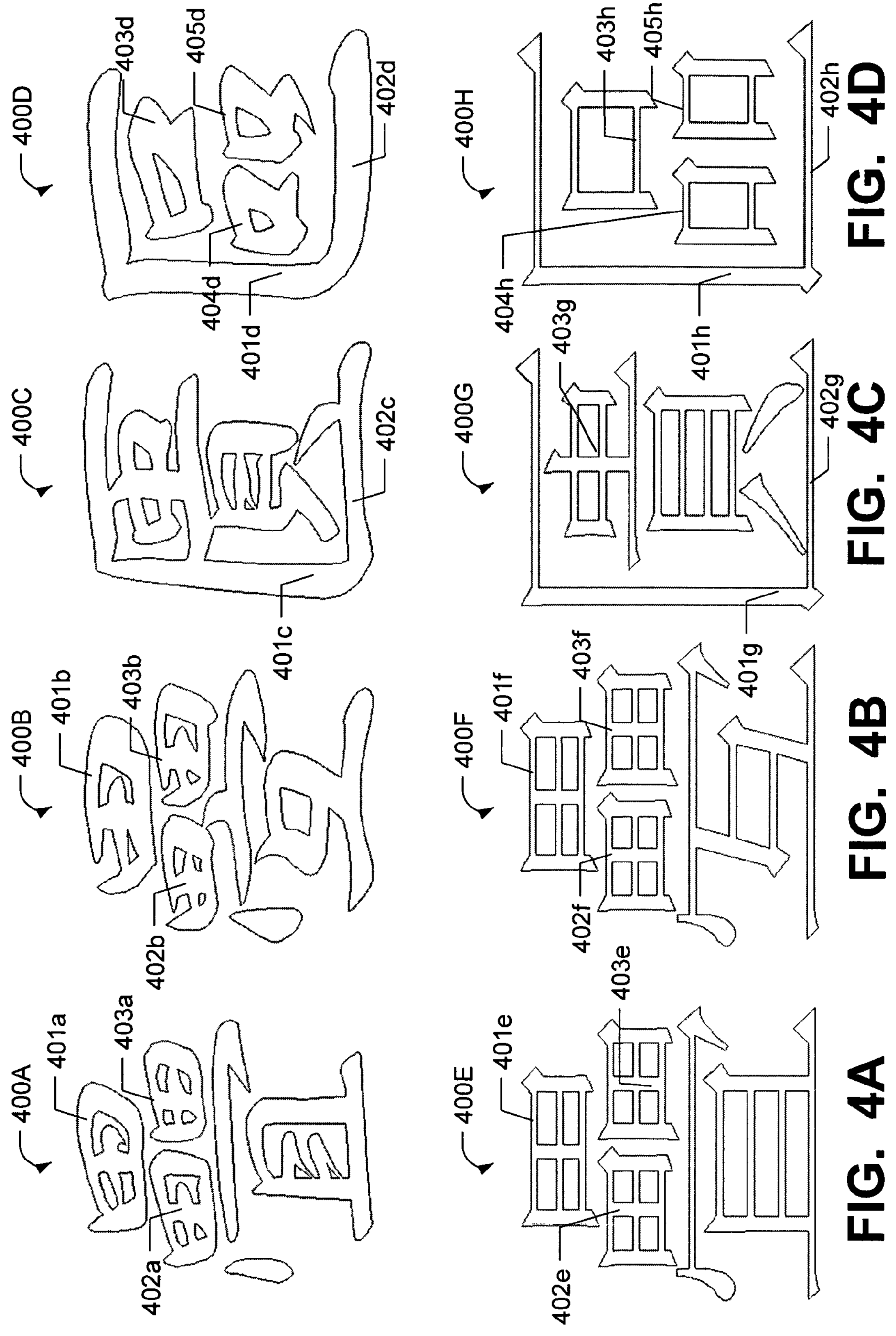
FIGS. 4A through 4D illustrate examples of "free-form" and "structured" designs of ideographic fonts.

FIGS. 3A and 3B show two glyphs (300A and 300B). Glyph 300A contains an instance of a radical component 301*a*. Glyph 300B contains more than one radical component, including another instance (301*b*) of the radical component 301*a* found in glyph 300A. Radical instance 301*b* has been modified (scaled horizontally and slightly transformed) to fit and fill the right-hand portion of the ideographic space for glyph 300B. Comparing these two representations of radicals 301*a* and 301*b*, one sees that the horizontal stroke widths have been retained, the vertical stroke widths have been retained, and the shape and size of the enhancing features (e.g., stroke endings) have been retained. These are characteristics of high quality glyph shapes.

Some typeface designs are more regular and "structured," while others appear to be less regular and more "free-form." In general, typefaces that are more regular and structured can be rendered with higher quality and greater fidelity to the original typeface design on devices with lower resolution than can typefaces that are less regular and more free-form. The more regular and structured a typeface is, the more likely it is to have repeating patterns and repeating shapes, and the more likely it can be designed from re-useable and modifiable components in a compact font form, such as re-usable and modifiable components in a hierarchical structure.

FIGS. 4A-4D illustrate four example glyphs from a free-form style font (glyphs 400A, 400B, 400C, and 400D) and the same corresponding four example glyphs from a more regular structured font (glyphs 400E, 400F, 400G, and 400H). Notably, glyph 400A is partially composed of "radicals" 401*a*, 402*a*, and 403*a*, and glyph 400B is partially composed of the same corresponding "radicals" 401*b*, 402*b*, and 403*b*. Yet, because of the "free-form" nature of the font, the corresponding radical component shapes and/or the corresponding stroke component shapes are quite irregular, e.g., even though radical 401*a* and radical 401*b* are intended to have the same linguistic and semantic meaning, these radicals appear significantly different in the two glyphs 400A and 400B. In a similar fashion, radicals 402a, 403a, 402b, and 403b all represent instances of the same radical component. Yet, significant inconsistencies and irregularities between and among these shapes can be seen. Glyphs 400C and 400D further illustrate the free-form nature of this font, for example, by comparing component strokes 401c and 401d, as well as strokes 402c and 402d. The top of stroke 401c appears quite different from the top of stroke 401d, and the overall shape of stroke 402c is quite different from that of stroke 402d. In glyph 400D, radical components 403d, 404d, and 405d are all instances of the same basic radical. Yet, even within the single glyph 400D, significant shape variations and irregularities among these components can be seen.

In contrast, glyphs 400E, 400F, 400G, and 400H, and their component radicals, strokes, and enhancing features, are very regular and consistent. For example, radicals 401e and 401f have the same overall shape, and the corresponding component strokes and enhancing features are identical. In the same way, radical component 402e has the same shape and form as radical component 403e, and these components have the same shape as radical components 402f and 403f in glyph 400F. Also, stroke components 401g and 401h are identical in shape, and stroke components 402g and 402h are identical in shape. Other repeating radical, stroke, and enhancing features can be seen by comparing FIGS. 4A through 4D. For example, radical components 404h and 405h have identical shapes, and radical components 403h and 403g can be seen to be minor variations of the same shape. Additional regularities include: the strokes generally are arranged in a regular, horizontal and vertical fashion, many horizontal and vertical strokes intersect at 90 degree angles, horizontal strokes generally have a common thickness, vertical strokes generally have a common thickness, the enhancing features (such as stroke endings) are identical from component-to-component and from glyph-to-glyph, etc.

Fundamentally, a font is a specific set of characters/glyphs that have a typeface design in common. The font designer and producer must consider the font format, how the font elements and components will be modeled, and how the font format and rendering technology can support the envisioned design.

The design of an original typeface generally begins in the mind of a typeface designer as a visual concept of a cohesive graphic style incorporating repeated patterns and shapes, and various associations among the shapes which are bound to character forms (glyphs) and various design elements of glyphs. When these natural visual concepts and entities are expressed in physical form as drawings of characters, glyphs, and glyph components and the like on paper (or any drawing surface), they form the natural design expressions of the typeface.

Designing a font (or font representation), in at least some instances, starts with deciding on the set of characters, deciding on the typeface, and deciding on a font format. Designing a font representation also involves the identification of consistent font-wide characteristics as well as relationships and dependencies (e.g., that may constitute natural hierarchies and relationships) between various glyphs and glyph components, and then designing the font representations, data structures, and the like that model these characteristics, relationships, and dependencies.

Storing a font (or a font representation) involves capturing the natural designs (the design entities) and converting/transforming them into computer-based representations (objects) and the like in the chosen font format. Storing a font representation also may involve capturing and converting/transforming the font-wide design characteristics, as well as the design relationships and dependencies between and among various glyphs and glyph components, into computer-based relationship representations (such as a hierarchy of related components), stored rules, stored parametric values, stored controls, stored programs and functions, and the like.

Each design entity may have multiple corresponding computer-based descriptions in a final font implementation. For example, a glyph may have an outline description and one or more bitmap descriptions in a font. Design entities also may have one or more design representations that are used during the design process, but any such design representations may be entirely independent of the final font representations or descriptions. For example, a stroke entity can be designed with a design representation using a sweeping trajectory with a variable brush, and then the silhouette of the resulting stroke shape can be stored in outline form as the stored object description in the font. Since possible design representations are not part of the final font representation and descriptions, they are not described in any greater detail here. The computer-based representations and descriptions may be stored in a known font format, such as TrueType/OpenType, PostScript, or the like.

Compiling involves traversing, accessing, and evaluating the stored representations and descriptions of glyphs and glyph components in various contexts (such as, different device resolutions and different desired text sizes) to provide the information necessary for the rendering engine of the system to generate high-fidelity displayed manifestations (renditions) of requested characters/glyphs in bitmap image form.

As noted above, rendering is the process of determining how information (including text, graphics, and/or electronic ink) is to be displayed, whether on a surface, on a screen, printed, displayed using a projector, or output in some other manner. "Rendering" may include the process of determining the location, size, and pixel density (number of pixels) of a target rendering pixel space available on the display device/media for the desired glyph, and converting/transforming the compiled glyph data (compiled from the stored representations and descriptions such as outlines, bitmaps, etc.) into a final display-ready bitmap image.

Rendering typically may involve the transformational steps of: scaling outline descriptions, trajectory descriptions, or bitmap descriptions of the object to be rendered; interpreting hinting instructions and glyph program instructions and the like; and grid fitting and scan conversion of the resulting compiled glyph data to a bitmap image. Much of this work may be accomplished by a rasterizer (such as a conventional TrueType Rasterizer). The rendering process typically attempts to map (scale) the resolution of the stored font data to the resolution of the display device and determines the size and number of available pixels on the display device for the desired character/glyph. A target bitmap image is created to match this rendering pixel space. In the final steps, the compiled glyph image may be "superimposed" on the target bitmap image in such a way that the bitmap image pixels that coincide with the compiled glyph shape are turned "ON," and the bitmap image pixels that are not part of the glyph shape are turned "OFF." Finally, the rendered target bitmap image is output to the display device or display medium to fill the rendering pixel space.

In order for the stored font data (in any particular font format) to be rendered successfully, a rendering engine (e.g., a suite of programs) must exist that includes a rasterizer capable of correctly processing the compiled data, including stored font data. The rendering engine and rasterizer must understand how the font data is organized and stored, and how it is to be transformed and translated. At any one of the processing and transformational steps noted above, loss of quality and loss of fidelity to the original typeface design can occur.

TrueType is both a font format and a font-rendering technology that is known in the art. The TrueType font format was first envisioned by Apple Computer and then jointly developed by Apple Computer and Microsoft Corporation in the late 1980s. Since then, Microsoft Corporation has taken a leadership role in further advancing TrueType as an industry standard and promoting its use. The TrueType Rasterizer is part of the TrueType font rendering technology. TrueType fonts contain scaleable TrueType font data.

OpenType is an extension of the TrueType font format, adding support for some types of PostScript font data (for example PostScript font data in Adobe CFF (Compact Font Format)). The OpenType format also provides for advanced OpenType layout information to support high-end typography and advanced text-processing. The OpenType font format was jointly developed by Adobe and Microsoft Corporation and is known to those skilled in this art.

The TrueType specification includes not only data format specifications, but also a definition of a general programming language instruction set. The TrueType rasterizer is capable of interpreting these instructions and, among other things, is capable of modifying the stored font data under a variety of run-time conditions. This is referred to as "instructing the glyph data" or "hinting," and it provides the capability to achieve improved rendered image quality over a range of device resolutions. This same instruction set can be used conditionally to make other adjustments (such as precise positioning) to various components of the font's stored glyph data.

In addition to the stored font data, run-time data also may be used during the compiling and rendering processes. For example, the resolution of the display device, the desired text size, and the identifiers for the desired characters/glyphs are all run-time pieces of data that are not stored in the font. In addition, the final output may be rendered in color, gray-scale, or using sub-pixel positioning (as used in ClearType® rendering for example), all of which require additional data at run-time ("ClearType®" is a registered trademark of Microsoft Corporation for computer software used in displaying fonts on computers or other display devices). Still other forms of run-time information may be accessed and used during compiling, rendering, and rasterization. For example, previously compiled cached data sets, language-specific and script-specific rules for text shaping and layout, and the like may be used.

All physical display devices have a finite display size and a finite resolution that may be expressed in physical device units (e.g., dots per inch or "dpi"). Glyph outline data, however, typically is designed and stored in the font in a different (usually higher) resolution that often is expressed in font units (also called "design units"). The design units and the device units are both discrete integral values.

When glyph data is rendered to a physical display device, the text display size and the display resolution together determine the number of display pixels (in the horizontal and vertical directions) that will be available in the rendering pixel grid for the displayed glyph. As the font data is scaled and mapped to the target bitmap image, numeric rounding may occur up to some integral fractions of a pixel and produce different displayed images on devices with different resolutions.

1. Definition of "Bitmap-Based Descriptions"

Bitmap-based glyph descriptions (also known as "embedded bitmaps" or "stored bitmaps") provide one way of representing a font object's geometrical data. Fundamentally, each glyph object is described by a stored matrix of discrete pixel values where each value is either set to ON or OFF. "ON" values may be single-bit values or multiple-bit values. The pattern of ON pixels in the matrix form the "printing" or "marking" shape of the character or glyph. Generally, in many conventional fonts, a separate stored bitmap matrix is required for each character at each supported text display size.

One benefit of bitmap-based descriptions is that they can provide high quality, ready-to-display glyph images, if they are well-crafted, hand-designed, and hand-tuned. However, bitmap-based descriptions typically require very large amounts of file or memory space, and each additional supported text size only adds to the amount of space needed. The large file size is one factor that limits the practicality of producing and using bitmap-based descriptions extensively, particularly for fonts that contain several thousand individual glyphs or font objects. High quality, well-crafted, and hand-tuned bitmap-based descriptions also are very expensive (almost prohibitively expensive) to design and produce, particularly for ideographic character sets and fonts including a very large number of glyphs or characters. Programmatically-generated bitmaps are generally of poor quality. Primarily for these reasons, bitmap-based descriptions typically are provided only for small ppem sizes and for a limited number of characters or glyphs. Scaling existing bitmap data (to match intermediate or large text sizes and sizes not directly supported in a font) almost always results in poor quality, irregular-looking glyph images.

2. Definition of "Outline-Based Descriptions"

Outline-based descriptions are another way to represent the geometrical data of glyphs or glyph components. An outline-based description is defined by a series of contours, where every contour is represented by a closed sequence of line segments, arcs, and/or curves. Outer contours bound a glyph's shape from outside while inner contours bound the glyph's shape from inside.

Figures 5A, 5B, 5C, 5D:
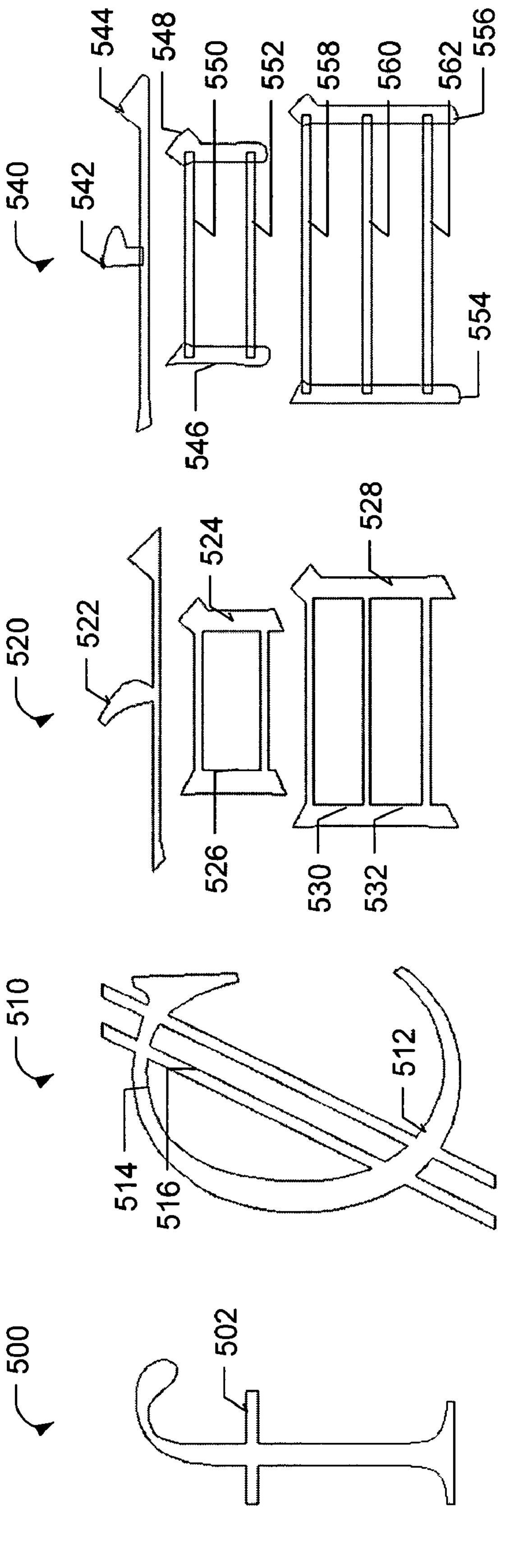
FIGS. 5A through 5D illustrate examples of outline-based glyph descriptions.

FIGS. 5A-5D illustrate examples of outline-based glyph descriptions for several glyphs. In FIG. 5A, glyph 500 is described by one outer contour 502. In FIG. 5B, glyph 510 is described by one outer contour 512 and two inner contours 514 and 516. The shape of a more complex glyph 520 is shown in FIG. 5C. Glyph 520 is described by three outer contours 522, 524, and 528 and three inner contours 526, 530, and 532. Note that inner contour 526 is interior to the shape described by outer contour 524, and inner contours 530 and 532 are interior to the shape described by outer contour 528. Although in some examples contours are not permitted to overlap themselves or be "self-crossing" and are required to have no intersections with other contours, glyph 540 (shown in FIG. 5D) is an example of an outline-based representation composed of several component contours that do intersect and overlap each other. Glyph 540 is described by eleven outer contours 542, 544, 546, 548, 550, 552, 554, 556, 558, 560, and 562.

Figure 6C:
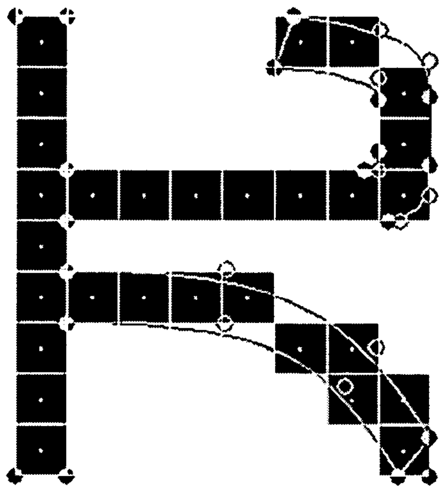
FIGS. 6A through 6E illustrate examples of outline rasterization.
Figure 6E:
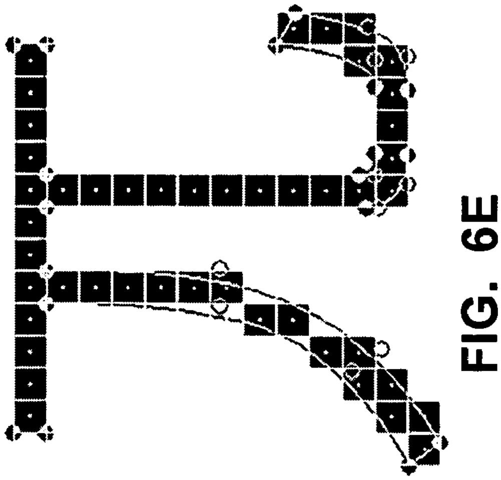
Figure 6B:
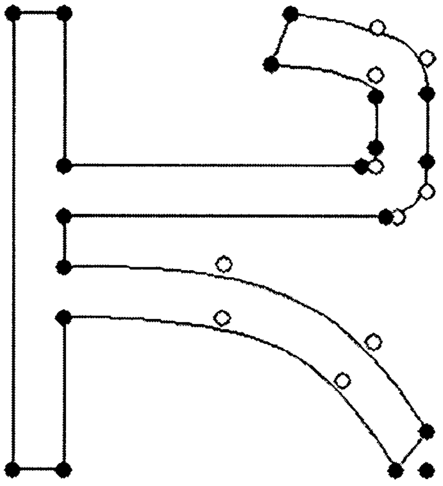
Figure 6D:
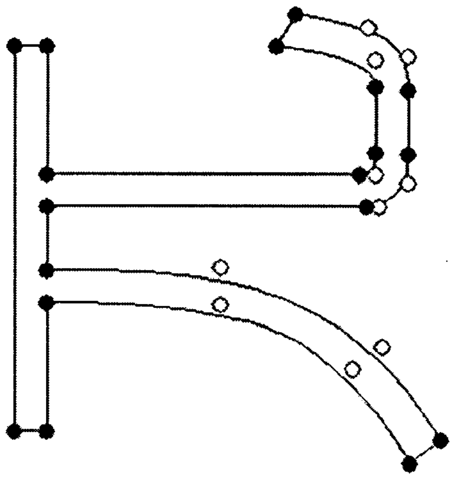
Figure 6A:
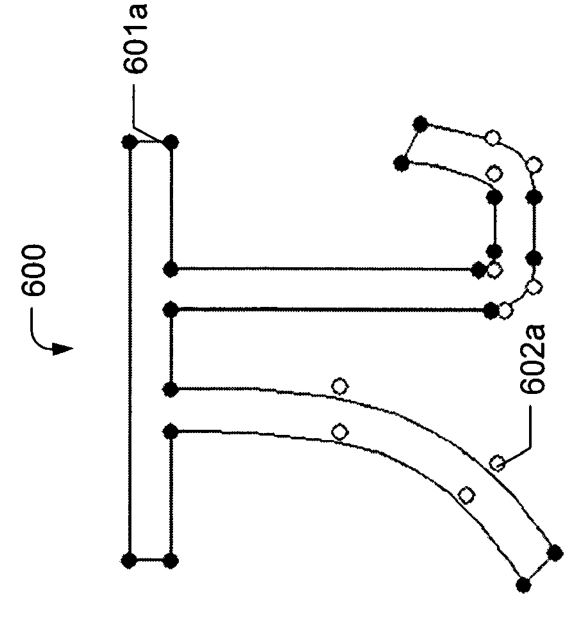

FIGS. 6A-6E illustrate the rasterization process of an outline-based description in general and shows how outline rendering and rasterization can produce different rendered glyph images for devices with different resolutions and different available display pixels. FIG. 6A represents the outline data (in design units) for glyph 600. In this example, the outline curves are represented in TrueType format, and the shapes of the curves are determined by a series of on-curve and off-curve control points. The solid "black" dots (such as 601*a*) represent the original on-curve outline data points from the font, and the "white" dots (such as 602*a*) represent off-curve control points for the outline. FIG. 6B and FIG. 6D show the outline data for glyph 600 mapped onto the rendering pixel space and modified slightly by the rasterizer for two different ppem sizes (10 ppem and 15 ppem, respectively). The on-curve outline data points are rounded to align with the rendering pixel space (in at least one of the horizontal or vertical directions), and the off-curve control points are interpolated between the nearest pair of on-curve points. Different rasterizers may perform different mathematical rounding and generate slightly different mapped results. FIG. 6C and FIG. 6E show the rendered and rasterized bitmap images for these two ppem sizes (10 ppem and 15 ppem, respectively). Typically, the pixels that have their center within the interior of the mapped outline are set to ON (or "black" in this example).

Certain problems can occur, however, when processing outline font data. As mentioned above, in mapping from the design units of the stored outline data to the device units corresponding to the resolution of a specific display device, rounding can occur. In such instances, particularly at low device resolutions and/or when few pixels are available for the rendered glyph, parts of the rendered glyph outline (such as strokes or stems) may appear too narrow or too wide, or may even completely disappear. Nearby parts of the original glyph shape may appear to run into each other, thus eliminating the space between the adjacent parts. Some fine details and features may be missing entirely from the rendered and displayed image. When a font is being designed, additional information (often in the form of hinting instructions) can be added to the stored font data to assist the rendering process so that more consistent results and higher quality output can be obtained for a range of devices with different resolutions.

Figure 7A:
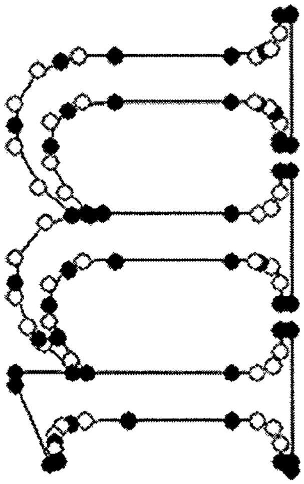
FIGS. 7A through 7H illustrate examples of pixel-hinting applied to outline-based font representation data.
Figure 7B:
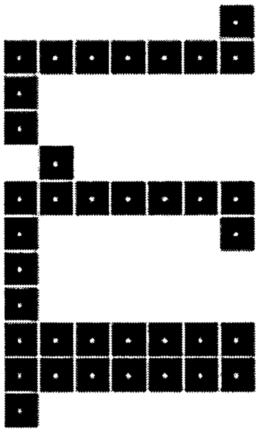
Figure 7C:
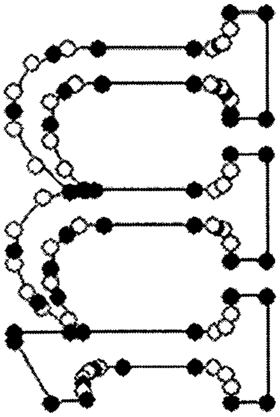
Figure 7D:
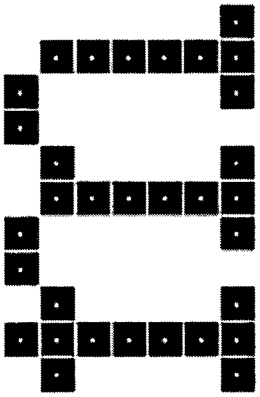
Figure 7E:
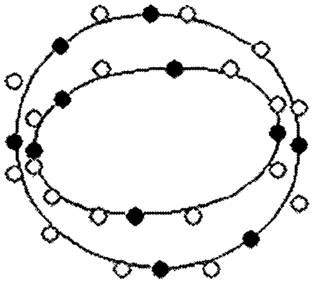
Figure 7F:
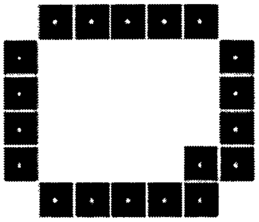
Figure 7G:
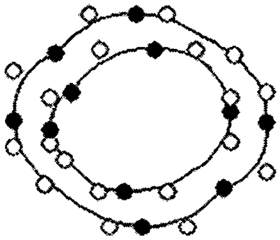
Figure 7H:
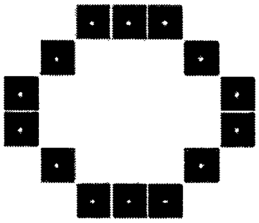

Pixel-hinting is one kind of hinting instruction that can be applied to outline data in a font (or font representation). FIGS. 7A-7H illustrate examples of standard pixel-hinting applied to the outline data for two glyphs to improve the quality of the rendered images at low resolution and/or where the available pixels for the glyph image are limited. FIG. 7A and FIG. 7E show the un-hinted outlines for the glyphs "m" and "o" respectively. FIG. 7B and FIG. 7F show the rendered bitmap results when these unhinted outlines for "m" and "o" are rasterized to bitmaps images of 16 ppem. In both cases, the quality of the resulting bitmap image is poor. The vertical stems (strokes) of the "m" have different widths; the serifs of the "m" are missing, incomplete, or inconsistent; the characteristic curved shape at the top of the "m" is flattened; and the characteristic oval shape of the "o" has been lost. In contrast, FIG. 7C and FIG. 7G show the mapped and hinted outlines for glyphs "m" and "o" respectively. FIG. 7D and FIG. 7H show the rendered result when the hinted outlines for "m" and "o" are rendered and rasterized to a bitmap image of 16 ppem. Note that for a given ppem, the hinting can modify the outline data such that a high quality rendered bitmap image will result even though the mapped outline itself might appear "distorted" as in FIG. 7C and FIG. 7G.

Additional problems may occur when rendering unhinted outline data (including mapping between design coordinate space and device coordinate space) especially at low resolutions and in cases where the glyph shapes are complex. Inconsistent results, irregularities, inconsistent rendering for repeated component shapes, and poor overall quality may result. Indeed, some rendered images may be unrecognizable.

Figure 8A:
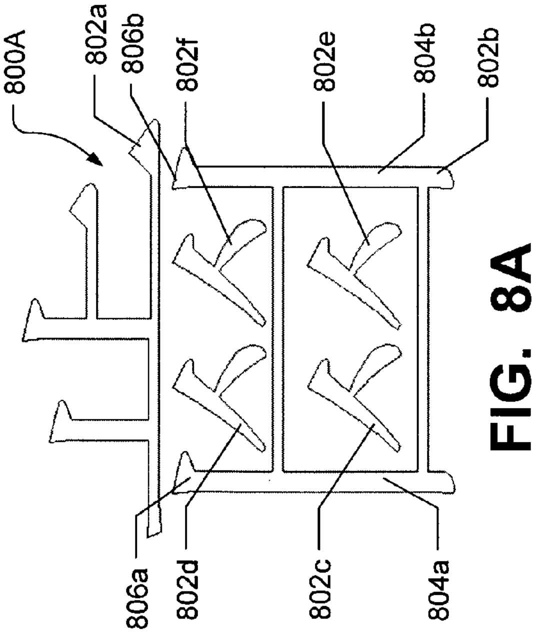
FIGS. 8A through 8D illustrate various issues relating to rendering unhinted outline-based font representations.

FIGS. 8A-8D illustrate some of the problems related to rendering unhinted outline data for complex ideographs over a range of resolutions and available ppem values (low, medium, and high). FIG. 8A provides an example of outline data for glyph 800A in design units. Glyph 800A can be considered to be composed of six instances of radicals: radicals 802*a*, 802*b*, 802*c*, 802*d*, 802*e*, and 802*f*. Some components of the glyph are designed to have a consistent appearance. For example, radicals 802*c*, 802*d*, 802*e*, and 802*f* all are designed to appear identical. Also, strokes 804*a* and 804*b* are designed to have identical stroke widths and identical appearance for the upper and lower stroke ending features 806*a* and 806*b*.

Figure 8B:
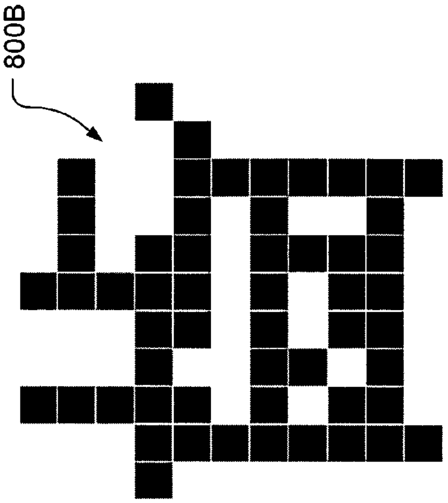

FIG. 8B shows a rendered image (800B) of glyph 800A rasterized at a relatively low 12 ppem. Pixels in 800B are turned ON ("black") or OFF ("white") depending on where the mapped outline of glyph 800A falls on the rendering pixel space. Irregularities (e.g., caused by mathematical rounding, etc.) in the mapping of the outline to the rendering pixel space have caused extremely poor rendering results. In addition, at this low ppem there are not enough pixels available to adequately represent all the information contained in the original glyph outline 800A. As a result, the quality of the rendered image 800B is poor, and the rendered image is hardly recognizable as representing the glyph 800A.

Figure 8C:
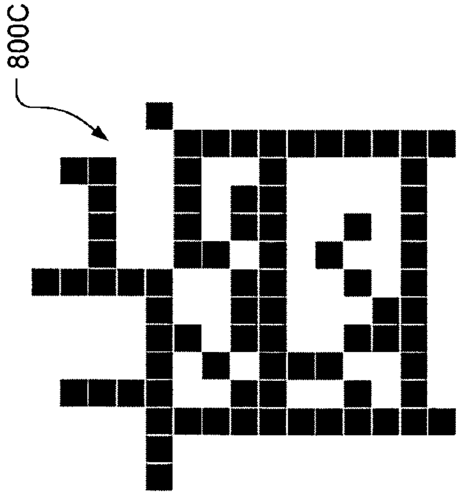

FIG. 8C shows a rendered image (800C) of glyph 800A rasterized at a middle ppem (16 ppem). Because of the complexity of glyph 800A, the rendered image 800C still has very low quality and shows extreme inconsistency in the appearance of repeated glyph elements.

Figure 8D:
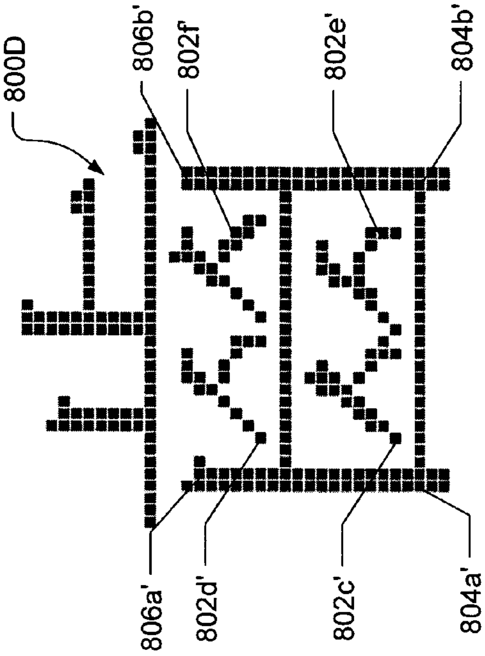

FIG. 8D shows a rendered image (800D) of glyph 800A rasterized at a high ppem (40 ppem). The rendered image 800D shows that even for relatively high ppem, inconsistent appearance, especially in the parts of the image that correspond to relatively small glyph elements and features, still occurs. In the example of FIG. 8D, the rendered images of radical components 802*c*', 802*d*', 802*e*', and 802*f*' are substantially different from one another even though they are intended to be identical. Similarly, the upper end features 806*a*' and 806*b*' of the vertical strokes 804*a*' and 804*b*' are not rendered consistently. Note that stroke 804*b*' has completely lost the details of its intended upper end feature 806*b*.

As mentioned previously, the currently specified text display size and the display resolution determine how many pixels (in the horizontal and vertical directions) will be available for rendering a desired glyph as a whole character shape. This also is the amount of available pixels for rendering a non-hierarchical glyph object. Then, in a hierarchical glyph representation, the amount of display pixels available for any one component of the whole glyph is determined by the amount of space that component occupies in the original glyph design. Further, the amount of space available for any sub-component is determined by the amount of space the sub-component occupies in the component design. For complex characters and ideographs, the amount of rendering space available (the number of available pixels) for individual components may be severely limited, even at relatively high device resolutions and large desired text sizes. This can lead to a number of problems as illustrated, for example, by the inconsistencies in FIG. 8D described above. Several of these problems are not well handled by existing font and rendering technologies.

Figure 9A:
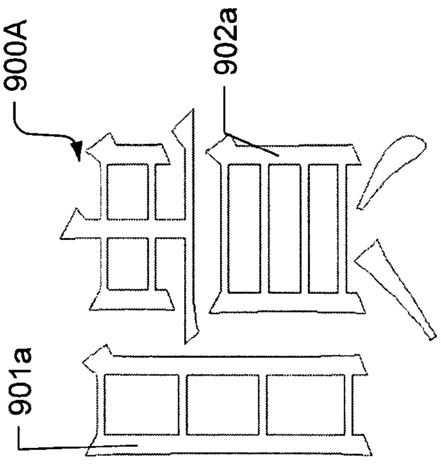
FIGS. 9A through 9F illustrate additional issues relating to rendering unhinted outline-based font representations.
Figure 9B:
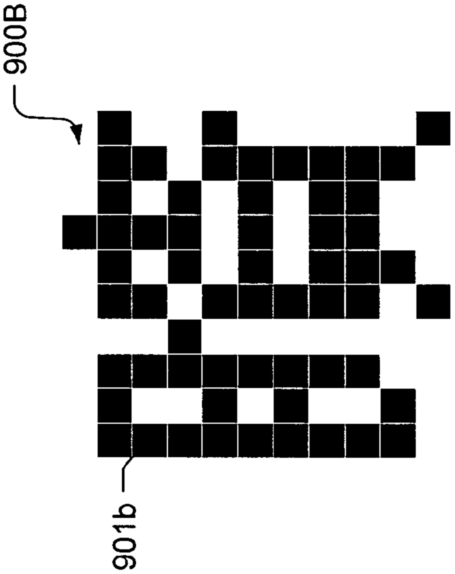
Figure 9C:
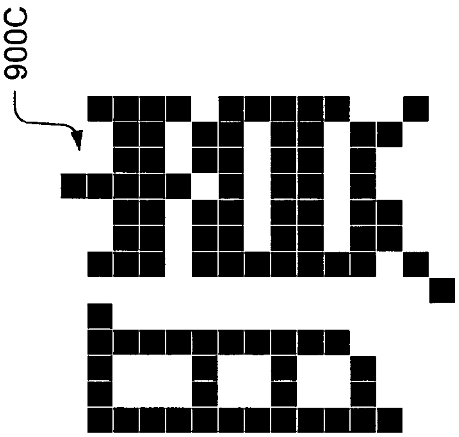
Figure 9D:
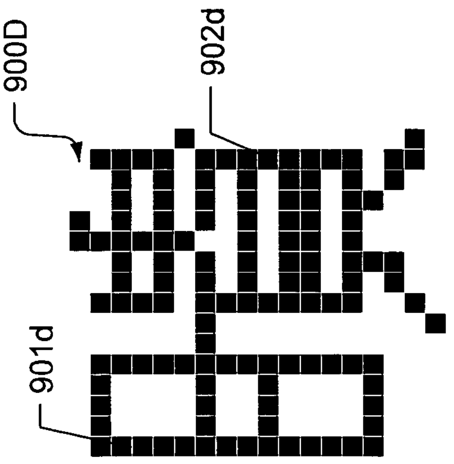
Figure 9E:
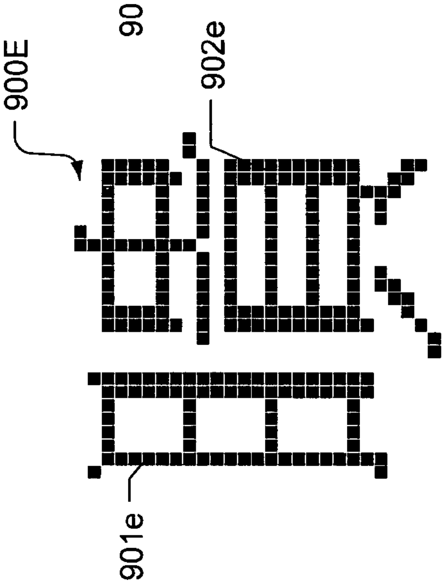
Figure 9F:
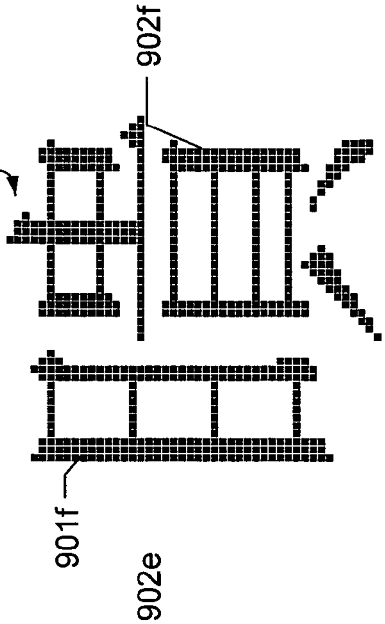

FIGS. 9A-9F illustrate additional issues and problems that may be encountered when rendering complex, hierarchically structured characters and ideographs. One problem relates to the fact that glyphs may contain unevenly sized instances of radical components, and the available pixels for small component instances may not be sufficient to render the component with high fidelity and acceptable quality, even at relatively high overall ppem. FIG. 9A shows an example of outline data (in design space) for glyph 900A. Radical components 901*a* and 902*a* represent two instances of the same radical. Although components 901*a* and 902*a* share a common overall appearance, component 902*a* is shorter and wider than component 901*a*. Because the radical contains four horizontal strokes, the vertical space available for rendering the component becomes critical. FIGS. 9B, 9C, 9D, 9E, and 9F show rendered images of glyph 900A at 12, 16, 20, 30, and 50 ppem respectively. Although radical components 901*a* and 902*a* are instances of the same radical and they are rendered at the same ppem in each of the separate examples, the four horizontal strokes of radical 901*a* can be rendered acceptably at all of the example ppem sizes (FIGS. 9B through 9F), while the four horizontal strokes of radical 902*a* are rendered properly only at the higher ppem sizes (FIGS. 9E and 9F). In FIG. 9D (at 20 ppem), radical component 901*d* has 14 pixels available in the vertical direction, while radical component 902*d* has only seven pixels available in the vertical direction (which causes the two middle horizontal strokes in radical component 902*d* to collide and leads to aesthetically poor results). FIG. 9B and FIG. 9C show even further degradation in rendered image quality.

FIGS. 9A-9F also illustrate problems that may occur with rendering unhinted outline data. For example, as can be seen in FIG. 9E and FIG. 9F, even at very high ppem values, vertical stroke components 901*e*, 902*e*, 901*f*, and 902*f* have inconsistent stroke widths when compared to other vertical stroke components, and inconsistent rendering patterns for various stroke ending features are evident.

3. Definition of "Trajectory-Based Descriptions"

Figure 10B:
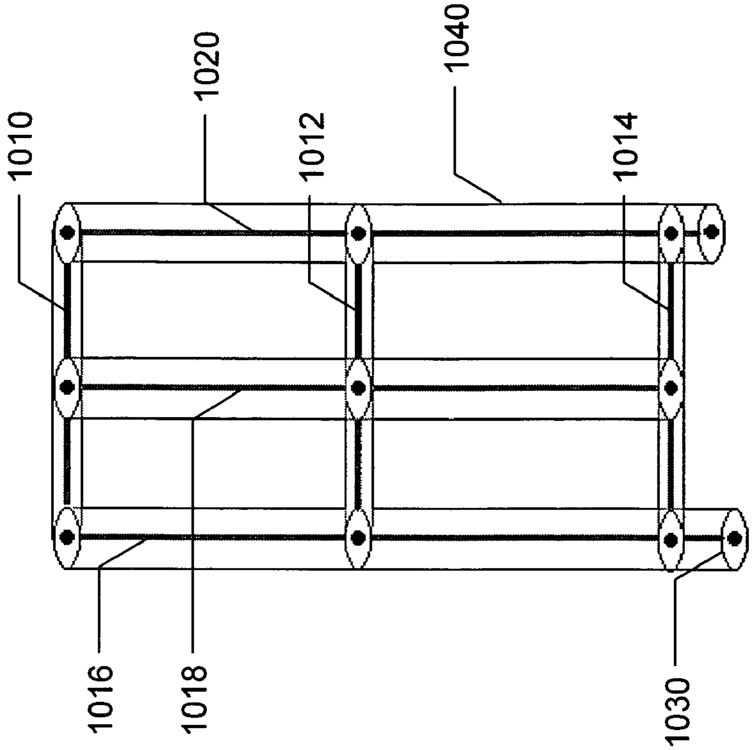
FIGS. 10A and 10B illustrate examples of trajectory-based font object descriptions.
Figure 10A:
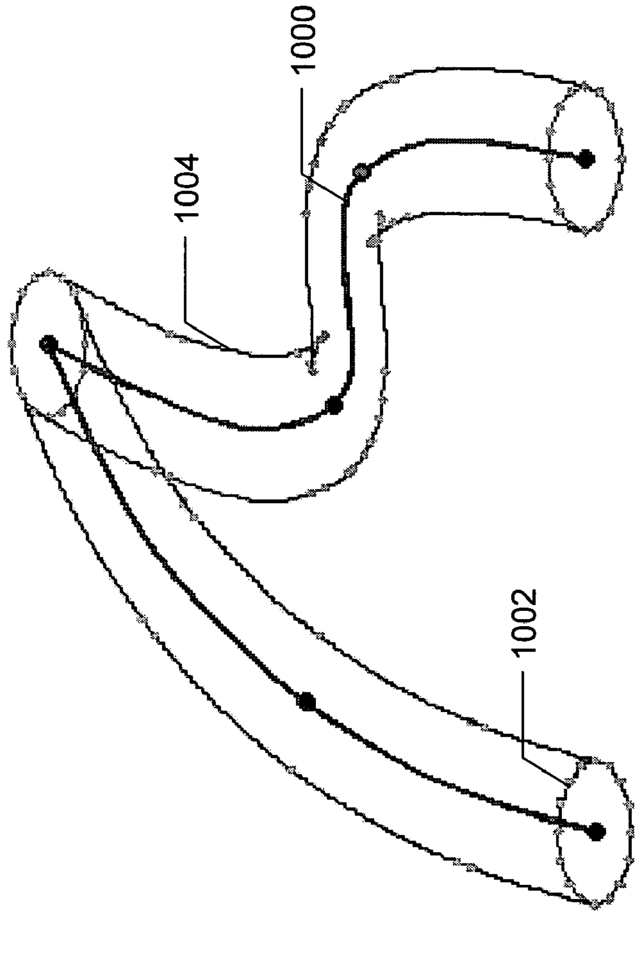

Trajectory-based descriptions provide another way (an alternative to outlines) to represent a font object's geometrical data. A trajectory-based description may be thought of as being defined by a brush moving along a sweeping trajectory. As illustrated in FIG. 10A, a brush (1002, akin to the shape of the end of a paintbrush) is a two-dimensional shape (an oval-shaped polygon with 16 vertices in the illustrated example), and a sweeping trajectory (1000) is a simple or composite curve defining a path that is swept by the brush 1002 when it is moved. (In the example shown in FIG. 10A, the sweeping trajectory 1000 is represented by an interpolation cubic BSpline curve). Sweeping the brush 1002 along the trajectory path 1000 results in a silhouette (1004) bounding the geometrical shape of an object. FIG. 10B illustrates a trajectory-based description of a glyph. Every stroke of the glyph is represented by a trajectory (straight segments 1010, 1012, 1014, 1016, 1018, and 1020 in this case). Taken together, all the trajectories swept by an oval-shaped brush (1030) result in a glyph's silhouette (1040).

The brush and sweeping trajectory are independent components of a trajectory-based description of a glyph component. That is, they can be modified independently. For example, the same trajectory can be swept by different brushes. While a variable brush (i.e. a brush that changes its shape while moving along a trajectory path) can be applied in order to describe an object's geometry, typically the examples of trajectory-based font representations that follow will use constant (invariant) brushes. The present invention, however, should not be construed as limited to use with constant brush shapes.

At design time, application of variable brushes can be used to advantage in the design process and the design of design entities. However, in at least some examples of the invention, a final design-time geometrical shape for a design entity generated in this way may be converted into another representation or description (such as an outline) before it is stored as an object description in a font or font representation.

a. Rendering Trajectory-Based Descriptions

In general during rendering of a font object, pixels that have centers belonging to (that is coinciding with) or within the region bounded by a silhouette are turned ON and form the resulting rendered image of the object. As in the case of outline-based descriptions, a trajectory-based description typically is designed in design space coordinates, and rendering involves mapping of the geometrical data into device space coordinates, accompanied by possible mathematical rounding and/or execution of some instructing code.

Figure 11:
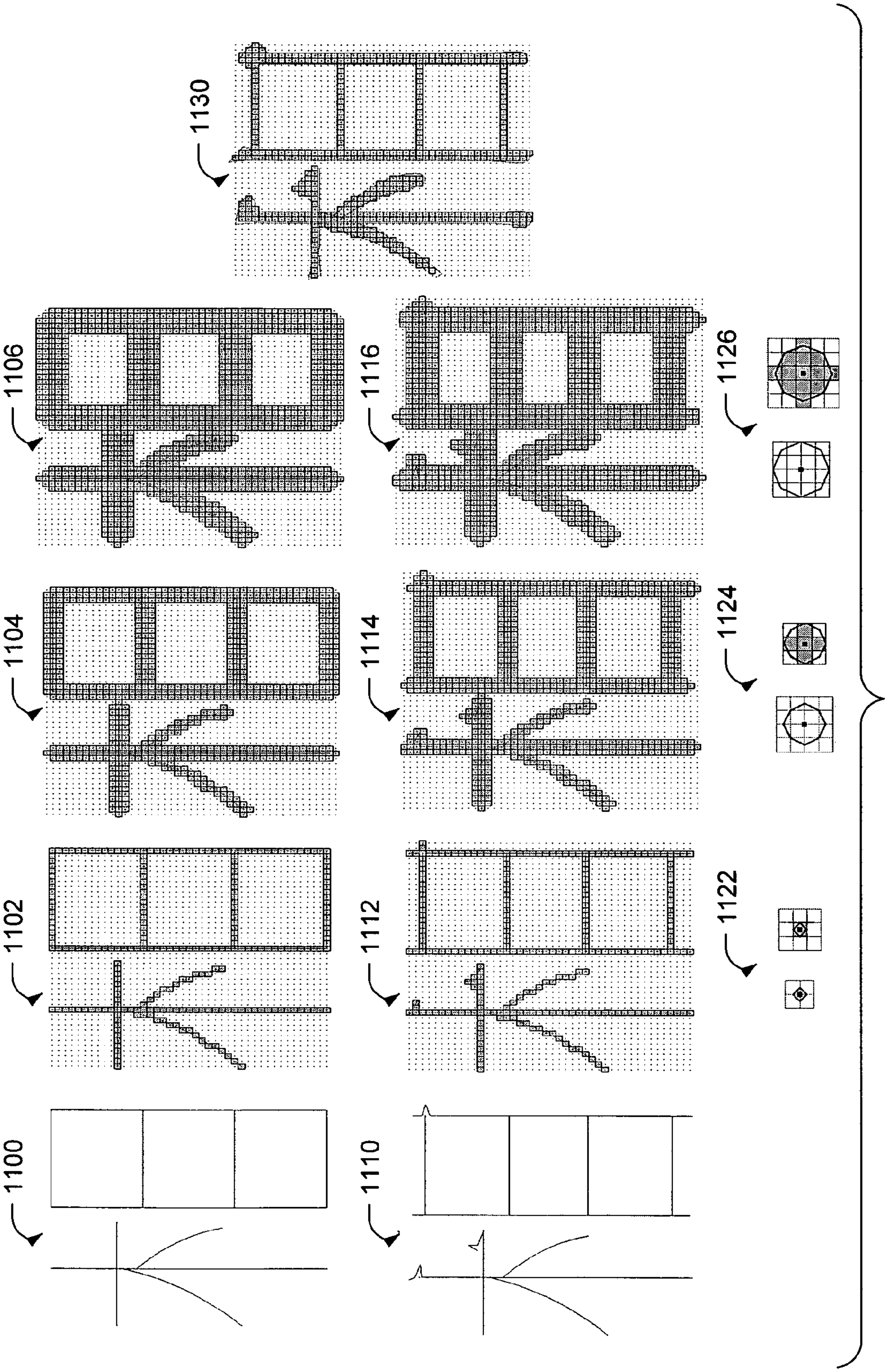
FIG. 11 illustrates example rendering results for glyphs represented by swept trajectories.

FIG. 11 illustrates rendering of a glyph that has geometrical data generated from a trajectory-based description. Every stroke of the glyph is represented by a trajectory, and the complete set of trajectories is shown at 1100. Sweeping this set of trajectories with three different brushes (1122, 1124, and 1126) results in three different rendered images 1102, 1104, and 1106 respectively.

Note that during the rendering process, a trajectory-based description (using a constant, invariant brush in this example) maintains stroke width in a much better manner than an outline-based description. For example, all horizontal and vertical strokes in the rendered images 1102, 1104, and 1106 have consistent widths. This characteristic of trajectory-based descriptions is extremely attractive when a small number of display pixels are available for the rendered image.

However, consistent-width strokes generated with trajectories and a constant brush result in somewhat lower quality rendered images at high ppems (as compared to outline-based renderings) because they are unable to adequately show detailed shapes for variable width strokes and/or for various enhancing features (such as endings or corners). Also, for a more sophisticated set of curves (e.g., glyph 1110), a sweeping trajectory description produces lower quality rendered images of the enhancing features, and it produces a rather uniform appearance for the strokes (as compared to a rendered image 1130, which is based on an outline description of the geometrical data).

Figure 12A:
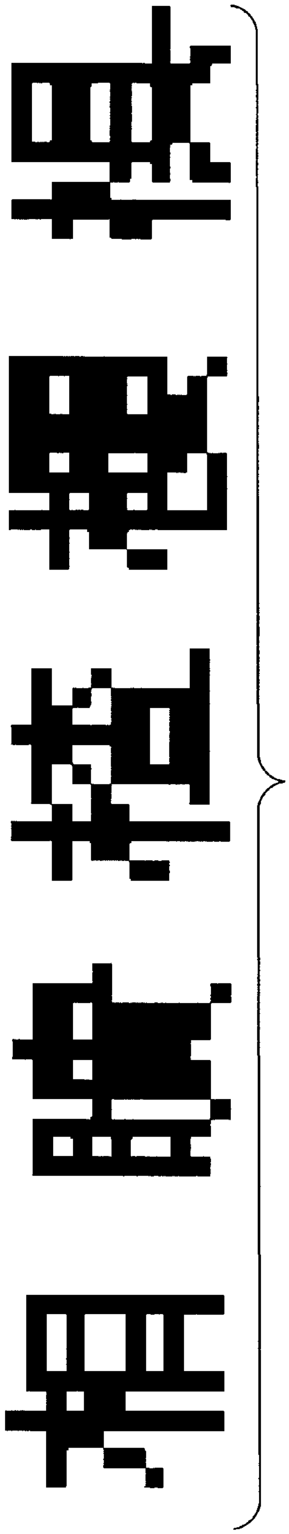
FIGS. 12A through 12C illustrate various quality differences when rendering font objects from trajectory-based font descriptions at various ppem levels.
Figure 12B:
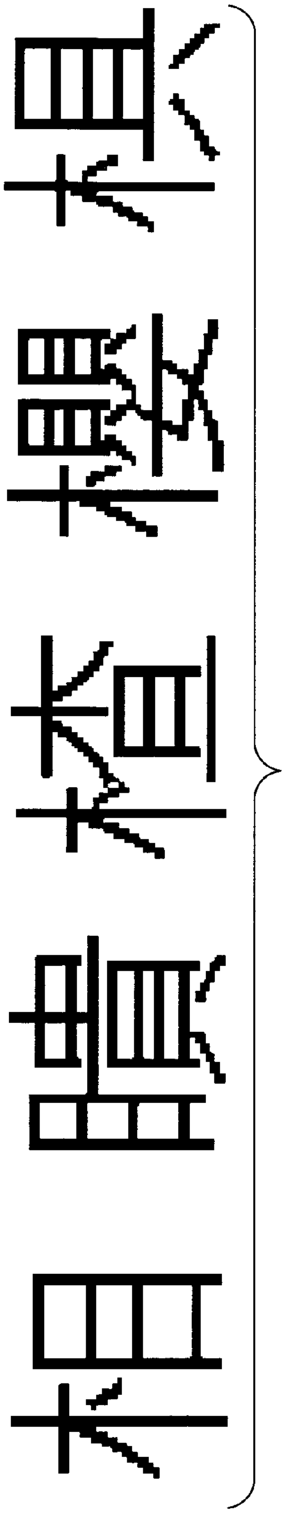
Figure 12C:
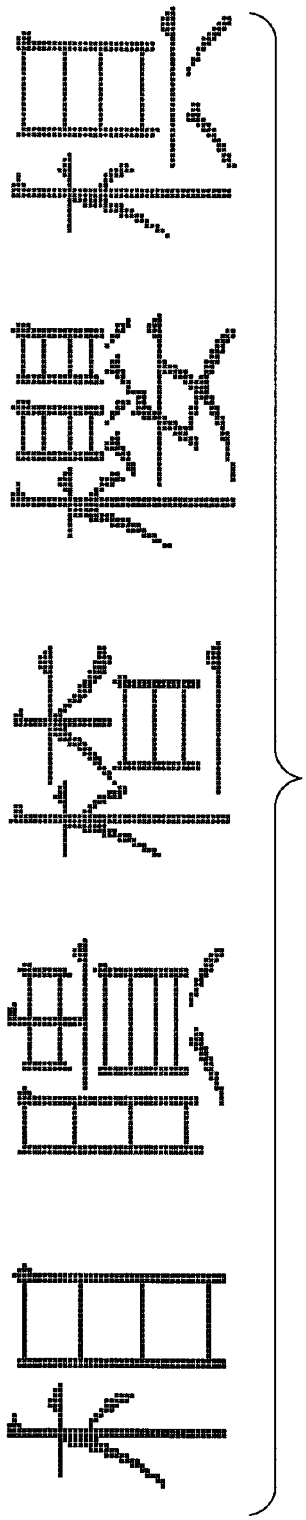

In general, currently existing trajectory-based font representations do not provide high quality rendering results. As shown in FIG. 12A, although the trajectory-based descriptions automatically maintain the stroke widths and in general prevent strokes from disappearing, difficulties and problems similar to those seen with outline-based fonts occur at low device resolutions and/or when few pixels are available for the rendered glyph. For example, different glyph elements may "run into each other" (or "collide"), thereby eliminating inter-element space and creating illegible or nearly illegible character forms that contain clusters or "clouds" of turned-ON pixels. Further, the shapes of strokes and stroke features tend to look distorted and unbalanced. At higher resolutions and/or in situations where higher numbers of pixels are available for the rendering, trajectory-based font representations are unable to support intricate and rich character designs and generally have a lower quality than outline-based font representations. This can be seen by comparing the rendered images of the same glyphs using trajectory-based descriptions and outline-based descriptions shown in FIGS. 12B and 12C, respectively.

Today, most available rendering systems apply uniform scaling to glyph outline data in order to change the size or extent of a whole glyph, or to change the size of glyph components in hierarchically structured glyph representations. Uniform scaling of this type also typically is applied to stored bitmap data. Uniform scaling is the only shape modification technique in wide use today. At rendering time, uniform scaling of glyph outline data can result in poor quality and incorrect results. Uniform scaling of outlines and stored bitmaps in conventional use today applies to all parts of the graphical information without consideration for proper handling of stroke widths, stroke endings, or enhancing features. Generally, stroke widths, stroke endings, and enhancing features should not change size uniformly to the same extent as the overall glyph changes size. In most cases, only the stroke extent (and not width, endings, or enhancing features) should scale.

B. Features of Fonts for Use on Electronic Devices

In order to be displayed on a "computer-related device," any font should have a computer-readable representation (i.e., the stored, object data and other information associated with a font), and the font representation should be supported by a rendering engine.

1. Relationship Between Elements of "Natural" Fonts and Elements of a Font Representation An "object" or a "font object" may be considered as any independent or self-containing structural element of a font representation, and such objects often correspond to entities in a "natural" font. "Glyph objects," "radical objects," and "stroke objects" (or their shorthand terms "glyphs," "radicals," and "strokes") are examples of objects or elements in a font representation that correspond to glyph, radical, and stroke entities of a typeface. Enhancing features of a stroke (such as ending features, serifs, and the like) also may be considered to be font objects.

Figure 13:
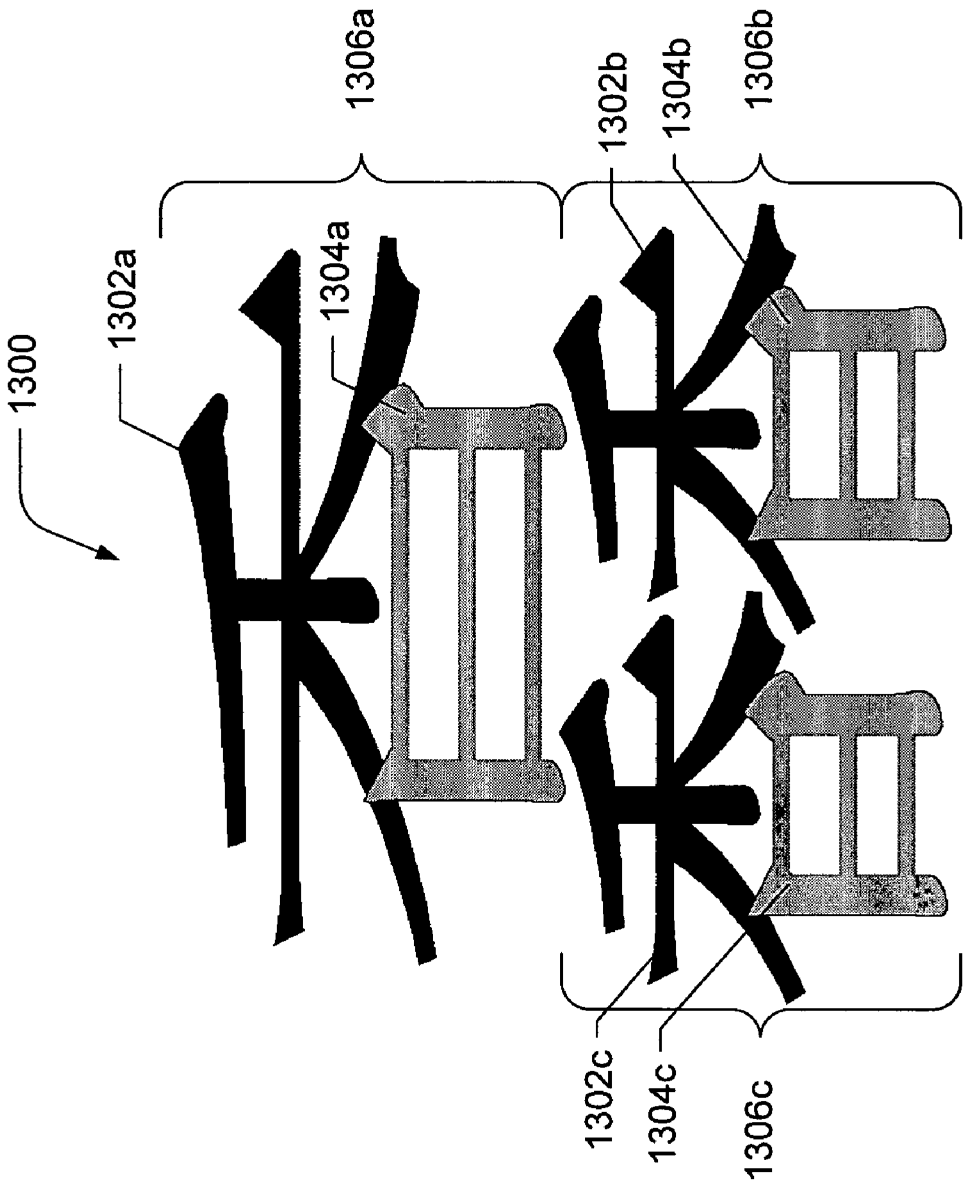
FIG. 13 illustrates examples of glyph components with componentized structures.

Although the objects used in a font representation may correspond to typeface entities, "entities," as described above, are not limited by any standard/linguistic classification of the entities. Font objects (such as glyph objects, radical objects, stroke objects, and the like, as well as their corresponding entities) are not uniquely identified; they can be identified differently according to design convenience. For example, as shown in FIG. 13, glyph 1300 can be designed to be composed of six components 1302*a*, 1302*b*, 1302*c*, 1304*a*, 1304*b*, and 1304*c*, such that every one of the components represents an instance of a radical (three instances of two radicals). Another approach is to design all strokes, e.g., the strokes included in components 1302*a* and 1304*a*, as parts of a single more complex component 1306*a*. (This might be a useful design, in at least some examples, because this more complex component 1306*a* actually appears as a part in multiple glyphs and might have specific behaviors). In this case, the glyph will be composed from three instances of the same component (components 1306*a*, 1306*b*, and 1306*c*).

2. Data Associated with Font Objects

Font objects may be described, at least in part, by data associated in some manner with the objects. Two major types of data are described in more detail below, namely: rules and attributes.

Rules are sequences of computer-executable instructions. Usually a rule is responsible for performance of a definite "complete task." Sometimes in this specification the term "routine" refers to a complete rule or to a sequence of instructions that form a part of a rule and perform a "sub-task."

More than one rule can be associated with an object. Rules can be conditional (rules that require some input data) or unconditional (rules that require no input data).

Rules may have the following structure: "parameters" (if any) (e.g., input values required in order to execute the rule); and "body" (e.g., a sequence of computer-executable instructions implemented/stored, for example, in any computer-readable media). The term "parametric values" also may be used to refer to particular input values provided to a rule.

From an implementation point of view, rules may be associated with objects in different ways. A rule associated with an object is not necessarily stored in a font representation together with other data associated with the object (although it may be). For example, a rule providing common functionality for several objects can be stored in a "general, global" part of a font representation, or it may be directly supported by a rendering engine. Most of the subjects discussed below are completely independent of a particular implementation; any way of "association" described below should not be construed to imply limitations to the present invention or associations relating to it.

The rest of the data associated with an object (i.e., anything besides rules) will be referred as "attributes".

As a more specific example, the glyph object represented at FIG. 7E may have an associated attribute responsible for its geometrical appearance (in this case, an outline data (description) in TrueType format specified in design space) and an associated rule responsible for run-time modification of the outline in order to achieve a better rendering result. The rule may require an input dependent on specific run-time information, for example ppem, and this input may be considered as a parameter for the rule. An example of a modified outline as result of the rule execution is shown at FIG. 7G.

3. Font Objects and Instances of Objects

A font object may be defined by information associated with an object in a font. An object may or may not have any "final" visual image. That is, some objects do not produce any display image.

An instance of an object may be defined by a font object together with a complete set of parametric values for all conditional rules associated with the object that should be executed under given conditions. An instance (instantiation) of an object typically produces, or contributes to, a visual display image or representation.

4. General Types of Font Representations and Levels of Generalization

Font representation approaches can be classified in various ways. Examples of variations in font representations that may be used in accordance with examples of this invention include:

- Structure: hierarchical or flat font representations, i.e. representations containing componentized objects, or simple (not componentized) font objects (described in more detail below).
- "Modifiability" of the objects: static or modifiable objects (described in more detail below).
- Type of geometrical description(s) of the font objects: for example, outline-based descriptions, bitmap-based descriptions, or sweeping trajectory-based descriptions (each described in more detail below).

The types of font representations listed above are independent. A particular font representation can be characterized by one type, as well as by any combination of several types.

A particular implementation type of a font representation approach may require, for example, completion of the following specification and development tasks:

- Specification of the possible set of the font objects.
- Specifications related to the data associated with the objects (including, but not limited to: specification of the mathematical representations of the associated geometry; specification of the particular "instruction language" for associated rules; specification of precise storage format of the objects, attributes, and rules; etc.).
- Development of a rendering engine that will support the chosen font representation(s).

Aspects of the present invention apply to different classes of the representations and different levels of generalization. For example, some aspects of this invention are not related to or do not require the presence of a hierarchical structure, but they remain applicable to the description of any font.

5. Hierarchical or Componentized Representations of a Font

A "component" or a "glyph component" corresponds to a reusable font object that typically participates in the representation of more than one glyph. Glyph components may include radicals, strokes, stroke endings, enhancing elements, or the like.

Componentized (or hierarchical) font representations typically correspond to "naturally structured," "regular" typefaces. Although almost any font can be designed to contain some componentized font representations "structured ideographic" fonts provide an opportunity to describe a majority of glyphs in a hierarchical manner based on a relatively limited number of basic components.

Figure 14:
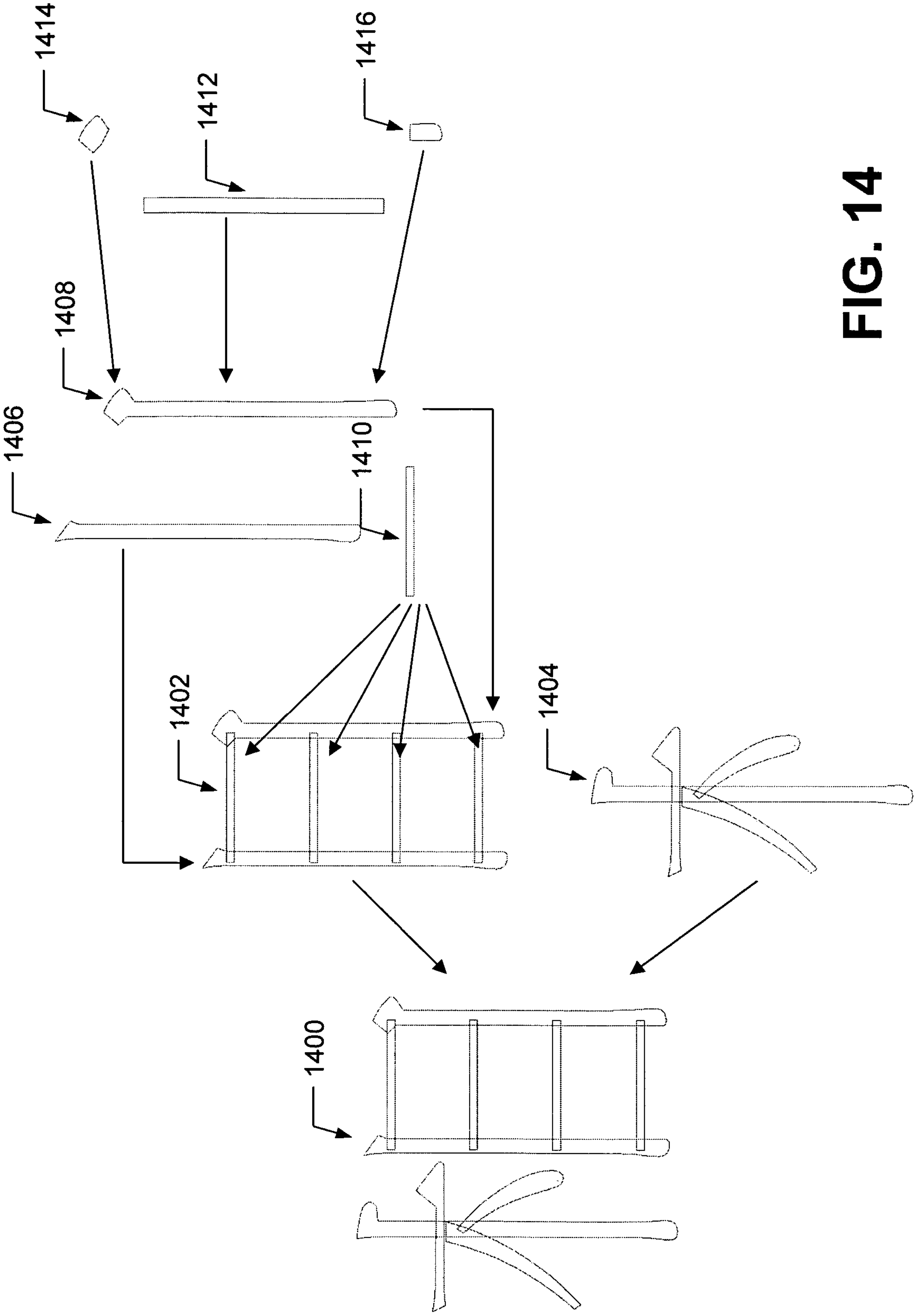
FIG. 14 illustrates an example hierarchical representation of a glyph.

In various examples illustrating aspects of the present invention related to hierarchical font representations, a hierarchical structure similar to that described below may be used. As shown in FIG. 14, glyph 1400 is composed from two radicals (instances of radical objects 1402 and 1404) situated side-by-side. Radical 1402 in turn is composed from six strokes (one instance each of stroke objects 1406 and 1408, and four instances of stroke object 1410). Stroke objects further can be represented as being composed from sub-strokes or stroke portions. For example, stroke 1408 can be composed from the (instance of the) main part 1412 of the stroke and from (instances of) two ending feature objects (1414 and 1416).

Data associated with a composite object and related to its composite structure and to the compilation process may include, for example: attributes and rules. These data types are described in more detail below.

- Attributes: One example attribute of a font object includes a list of IDs of the font objects that are used as components making up the current object. Another example attribute of a font object includes the geometrical data necessary for the assembly process. For example, data required for positioning of the components of the font object may be stored as an attribute of the font object.
- Unconditional compilation rule(s) associated with a component. Typically, some default rules are supported by a rendering engine and should not be explicitly associated with a composite object. However, any object can override the default compilation process by explicit specification of a particular compilation rule.
- Conditional compilation rule(s). For example, a rule for choice/elimination of one or another component under certain conditions. Such rules may be used, for example, as support for stroke substitution and/or reduction, as described below.
- Conditional or unconditional rule(s) responsible for positioning of the components and/or for computation of the parametric values for the rules associated with the components.
- During the compilation process, the rules will be responsible for the choice of the components as well as for the choice and invocation of the rules associated with the components, and for providing parameters for the rules.

Clearly, the presence or absence of a hierarchical structure does not influence the presence or absence of other kinds of attributes and/or rules. An object may contain various other kinds of data as well. For example, the hierarchical structure may include attributes and rules related to the geometrical description of the object.

A hierarchical font representation, in at least some examples, may provide various improvements and advantages, including improvements and advantages related to font storage size and quality of the rendering results, such as:

- Compactness. If designed properly, a large number of high-level objects (e.g., glyphs) can be composed from a relatively much smaller number of lower-level objects (e.g., strokes, radicals, enhancing features, stroke portions, etc.). Because the largest amount of data is associated with a smaller number of lower-level objects, this hierarchical structure can significantly contribute to compactness of the font representation (e.g., a reduction in the memory footprint of the font representation).
- Regularity. Regularity of components contributes to the reusability of the components, and it contributes to the regularization of the final appearance of the glyphs when rendered.
- Overall better quality of the rendering results. Having a limited number of components provides for the possibility of designing every one of the components more carefully. For example, the use of a limited number of components makes it feasible to carefully specify modification rules associated with the components (e.g., rules to "hint" the components, etc.).

6. Modifiable or Parameterized Font Objects

A modifiable font object is an object constructed such that instantiation of the object (at least under certain circumstances) will involve specification of conditional information. Reference will be made to modifications related to the geometrical appearance of an object. The modification may be performed by altering the geometry directly associated with the object, or modifications may be performed during a compilation process of a composite object.

It may be beneficial, in at least some examples, to use modifiable font objects. For example, the use of modifiable objects may:

- Contribute to improvement of the rendering results by adjusting the objects according to specific run-time information. For example, modifications can be based on knowledge of the desired ppem and/or on "traditional" pixel-hinting, etc.
- Extend the reusability of a font object by reflecting a set of the "natural" modifications corresponding to some "natural" font entity. Reusability of the font objects in turn contributes to compaction and regularization of a font representation and provides a possibility for more careful design by limiting the number of necessary font objects.

a. Examples of Modifiable Font Objects

Figure 15:
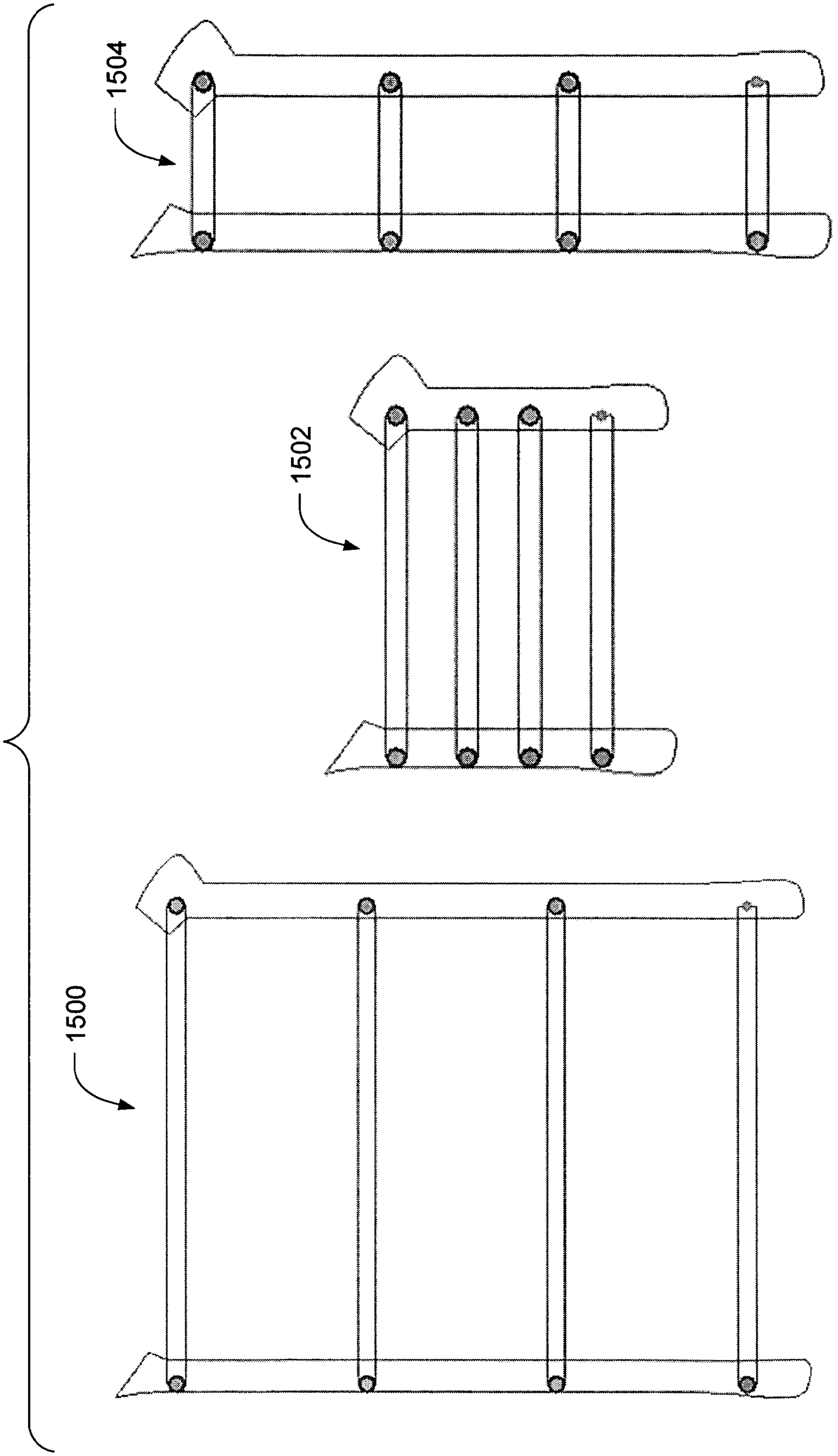
FIG. 15 illustrates an example of a modifiable radical object.
Figure 16A:
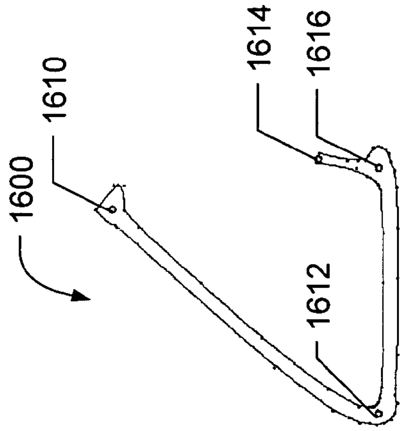
FIGS. 16A through 16D illustrate an example of a modifiable stroke object.
Figure 16B:
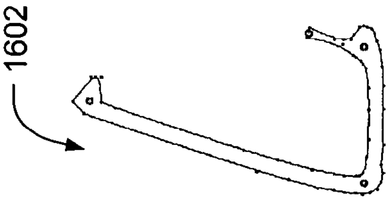
Figure 16C:
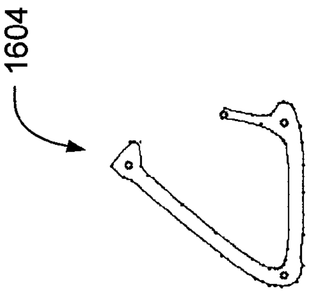
Figure 16D:
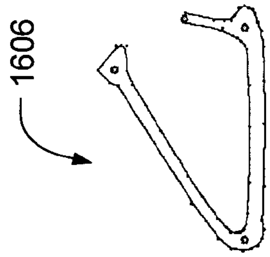

FIG. 15 illustrates an example of a modifiable radical object. As described above, structured ideographic fonts may contain dynamic rather than static entity components. The representation of a structured, hierarchical font may contain a modifiable radical object that will reflect natural modifications of the corresponding radical entity. It may be beneficial to consider radical representations 1500, 1502, and 1504 (in FIG. 15) as instances of the same object rather than different objects, because these representations share a substantial amount of common information, such as structural information regarding the stroke components and positioning rules for the components. For example, the up-most and down-most horizontal strokes can be placed at the same relative positions in the vertical direction with respect to the endings of the vertical strokes, while the two middle horizontal strokes may keep distances in the vertical direction from the up-most and down-most horizontal strokes. The desired behavior can be supported by a conditional modification rule associated with the radical object. The rule can require, for example, specification of the position and the horizontal and vertical extents of the radical. Instances 1500, 1502, and 1504 correspond to different parametric values provided to the modification rule.

FIGS. 16A-16D illustrate examples of modifiable stroke objects. Particularly, these figures illustrate four instances (1600, 1602, 1604, and 1606) of the same stroke object. A modification rule associated with the stroke object may be responsible for placement of various the key elements of the stroke object and for maintaining the smooth connection between the key elements. In this case, a modification rule might require parameters for the locations (anchors) of the key elements (1610, 1612, 1614, and 1616) as input parameters. An attribute associated with the stroke object and responsible for the geometrical description may include "initial" outline data and "initial" locations for the key elements in the design space. Every instance of the stroke is a result of execution of the modification rule associated with the stroke utilizing different parametric values (specific locations of the key elements).

Figure 17B:
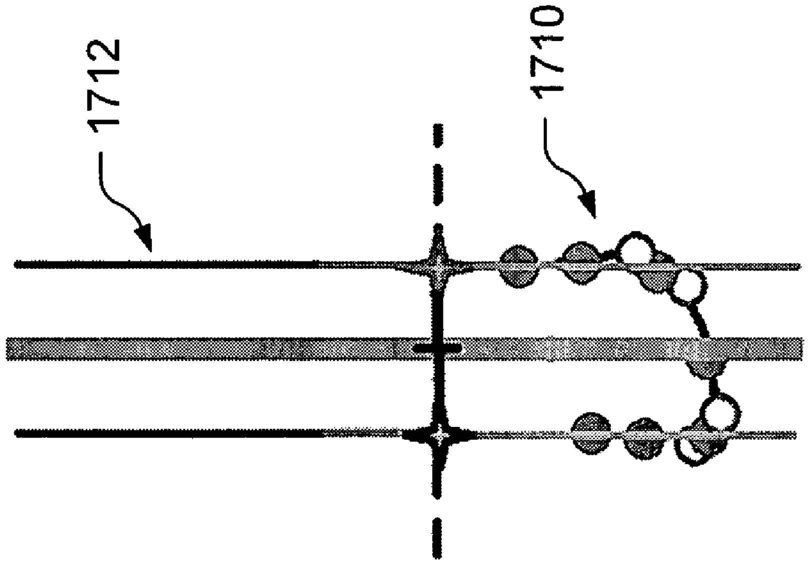
FIGS. 17A and 17B illustrate an example of a modifiable ending feature object.
Figure 17A:
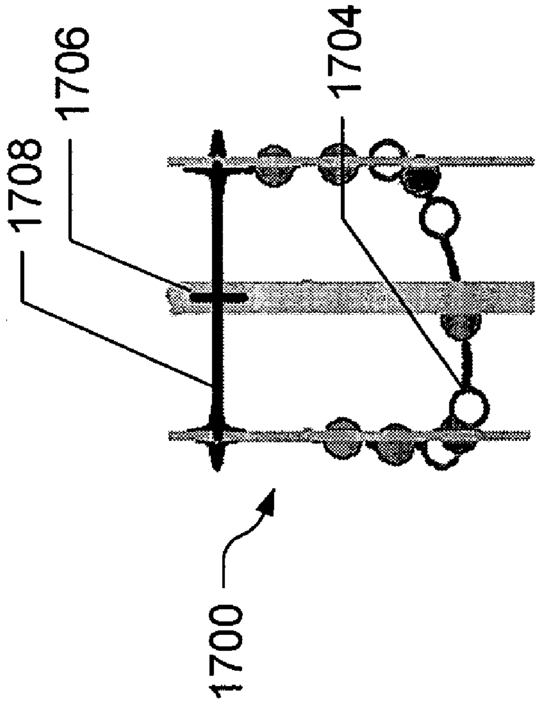

Stroke end features or enhancing features also may be modifiable in accordance with at least some examples of this invention. In the example shown in FIGS. 17A and 17B, ending feature (sub-stroke) 1700 is considered to be an independent font object. As shown in FIG. 17A, the ending feature object (1700) has an associated outline data (description) 1704 and initial values for the vertical midline anchor 1706 and width 1708. This ending feature can be instantiated to fit vertical strokes of various different widths. For example, a modification rule associated with the ending feature may require location of the midline anchor and width as parameters, and then when it is rendered, the shape of the ending feature's outline will be modified accordingly, based on the parameters. FIG. 17B shows an instance of the ending feature 1710 attached to a vertical stroke 1712.

7. Sources of Input Information for Conditional Rules

Various different sources of input information may be used to provide input/parametric values used by the conditional rules. Examples of these sources of information are described in more detail below.

Run-time information may be one source of information used by conditional rules. An example of this type of information may include the ppem of the rendering system and the like.

"Component context" (relevant for objects that can participate as components in composite objects): This is information accessible (known) at the level of a higher-level object in a hierarchical representation that contains (an instance of) the current object as one of its components and is related to the current object. For example, as shown in FIG. 15, the position and the vertical and horizontal extents of a radical in a specific glyph may provide "component context" type of input for a modification rule associated with a radical.

"Full context": This is a complete set of condition-dependent information (e.g., run-time input and "component context") used to instantiate an object under given conditions.

Figure 18B:
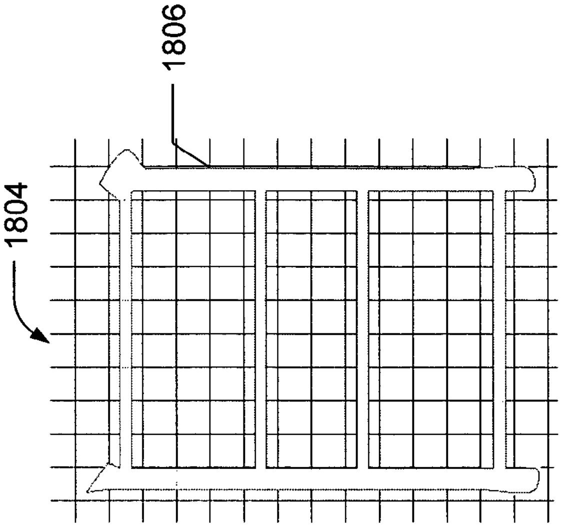
FIGS. 18A through 18C illustrate examples of pixel-hinting and shape-hinting modifications of geometrical data.
Figure 18A:
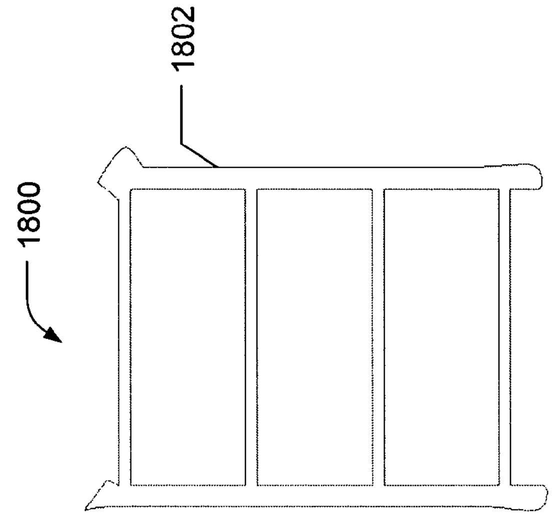

8. Pixel-Hinting and Shape-Hinting as Conditional Routines Responsible for Geometrical Modifications There are at least two major types of conditional routines often applied to geometrical data associated with an object or related to computation of the geometrical data provided as an input to the rules associated with an object's components. One is "shape-hinting" and the other is "pixel-hinting." If the primary purpose of a routine is to generate (or contribute to generation) of an instance that has a specific "new" shape, the routine is classified as "shape-hinting." For example, FIG. 18A shows a modifiable radical object (1800) and its associated outline data (1802) in design space. If the purpose of a conditional routine is to modify the outline data in order to produce an instance that has specified horizontal and vertical extents (for example, instance 1808 shown in FIG. 18C), then the routine performs shape-hinting of the radical object. The resulting outline 1810 representing the instance has different global characteristics than the initial outline 1802, but the resulting outline 1810 still preserves the overall appearance. The term "pixel-hinting" is used herein if the purpose of a modification is to adjust the data depending on run-time information in order to create a more legible, higher quality rendered image of the current shape. For example, if a purpose of a conditional routine is to adjust the outline's data such that it will produce a high quality rendered result of the outline 1802, then the routine is used for pixel-hinting the outline data.

For a given ppem, the routine may slightly reposition horizontal strokes such that every one of them will contain a row of pixel's centers and will be visible in the resulting rendered image. This routine involves local modifications of the outline. In particular, the final horizontal strokes may not be spaced evenly after application of the routine. However, as shown in FIG. 18B, outline 1806 ensures rendering of all four horizontal strokes, i.e. it creates a rendered image 1804 that properly reflects the shape of the initial outline 1802. Without application of the pixel-hinting routine, the two middle strokes may, in at least some instances, disappear in the rendered image (at this ppem) because they often would not be positioned so as to contain (intersect) the pixel centers. A possible shape deformation in this case is a side-effect rather than a goal. Pixel-hinting typically involves small local modifications of the geometrical data, adjustments to "fit" the pixel grid depending on the current run-time information. Some shape distortions caused by pixel-hinting can be significant, especially at low ppems. Pixel-hinting can help to regularize and improve the overall quality of the rendered image at any ppem, but it is extremely helpful and useful for generation of a legible rendered image at low/middle ppems. Pixel-hinting typically is responsible for preventing major features (e.g., strokes) from disappearing from the rendered image, for regularizing the appearance of the rendered elements (e.g., stroke width, enhancing feature patterns, and the like), and for adjustment of the distances between elements (e.g., in order to maintain minimal distance between adjacent elements, regularize spacing, and make the overall appearance of the rendered image more balanced).

Figure 18C:
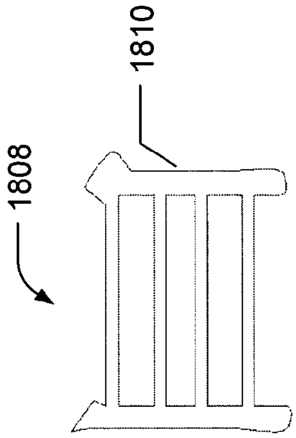

FIGS. 18A-18C illustrate at least some differences between "shape-hinting" and "pixel-hinting" routines. In order to simplify the explanation, these figures provide an example of a non-componentized representation of a radical object. For a componentized representation of a radical object (described for example in FIG. 20), the instance shown in FIG. 18C will be generated using "shape-hinting" while the instance shown in FIG. 18B will involve application of "pixel-hinting." However, the explanation will be slightly different (because the routines will involve computation of the parametric values for the rules associated with the stroke components rather than direct modification of the outline data associated with the radical).

An object is "shape-modifiable" if at least some of the conditional rules associated with the object perform shape-hinting (at least under some conditions).

9. Hierarchical Font Representation Using Shape-Modifiable Components

Different aspects of the present invention can be applied to font representations that have hierarchical structure objects and/or shape-modifiable font objects.

Aspects of the invention relating to designing a font may include (in addition to identification of the general implementation type for the font representation, the choice of mathematical representation(s) for geometry, the choice of instruction language, the choice of a storage format, and choice/implementation of the rendering engine):

Study (or determination) of the "natural" font entities, components, and their "natural modifications."

Identification of the desired level of componentization (for example, identification of whether the enhancing features should be designed as independent font objects or be part of higher-level objects (such as strokes)).

For every level in the hierarchy, identification of the types of the "generic" font objects, identification of general attributes and rules specific for every type.

For every level in the hierarchy, identification of the set of the font objects.

For every simple object (and optionally, for some composite objects), specification of the attributes related to the geometrical representation of the object (including "primary" and "auxiliary" geometry, i.e., geometry that explicitly provides input to the rendering routine (such as outline or trajectory) (primary geometry) and geometry that contributes to the compilation and/or modification process (such as anchor points) (auxiliary geometry)).

For modifiable objects, specification of the modification rules.

For composite objects, specification of attributes and rules responsible for the compilation of the objects. For composite modifiable objects (composed from modifiable components), this may include specification of the "hierarchical flow of control," e.g., specification which modification rules associated with the components should be invoked and how parametric values for these rules should be computed depending on the attributes and parametric values of the modification rule(s) associated with the object itself.

Storing a particular font representation typically involves preserving information specific for the font representation in a format corresponding to the general implementation type of the font representation. Not all information related to a particular font representation should necessarily explicitly be saved in "computer-readable media" associated with the font representation. For example, some default rules (applicable to all fonts or a category of similar fonts) can be supported by a rendering engine and need not be stored along with the font). Information associated with a font representation may include (but is not limited to) the following data.

(1) Attributes associated with specific objects, including attributes related to:

Geometrical description(s) of the object itself. For example, "primary" and "auxiliary" geometrical data. More than one set of data can be associated with an object.

Compiling (for composite objects). For example, for every component, the ID of the corresponding object, and information regarding positioning of the component. If an object has modifiable components, attributes associated with the object may include parametric values for the components. For example, in addition to position information, a glyph object may contain information regarding the vertical and horizontal extents of a modifiable radical component.

(2) Rules associated with specific objects, including rules related to:

Modification of an object (for modifiable objects). For example, shape-modification rule(s) that reflect a "natural behavior" of the corresponding entity, or rule(s) responsible for the pixel-hinting.

Compilation of an object (for composite objects). For example, rule(s) responsible for the choice of the components and choice of the rules associated with the components that should be executed during instantiation of the components. For composite objects that contain modifiable components, rule(s) for computation of the parametric values for the rules associated with the components based on the information accessible at the level of the object.

(3) Global attributes and rules, including: values, settings, and rules applicable to any large group (or groups) of the font objects.

Compiling, in at least some examples of systems and methods of the invention, may include: starting from the top-most level in the hierarchy (for every glyph object), providing parametric values for the rules associated with the components and instantiation of the components in the hierarchical manner. Compiling will be described in more detail below, e.g., in conjunction with FIG. 20.

Figure 19B:
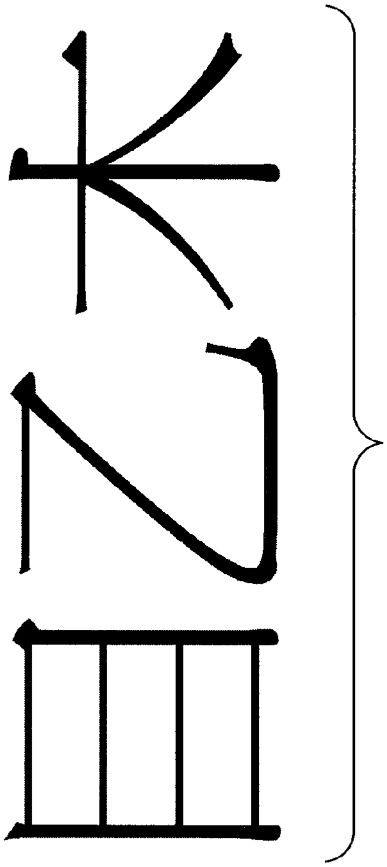
FIGS. 19A through 19C illustrate examples of sets of objects participating in a hierarchical font representation.
Figure 19C:
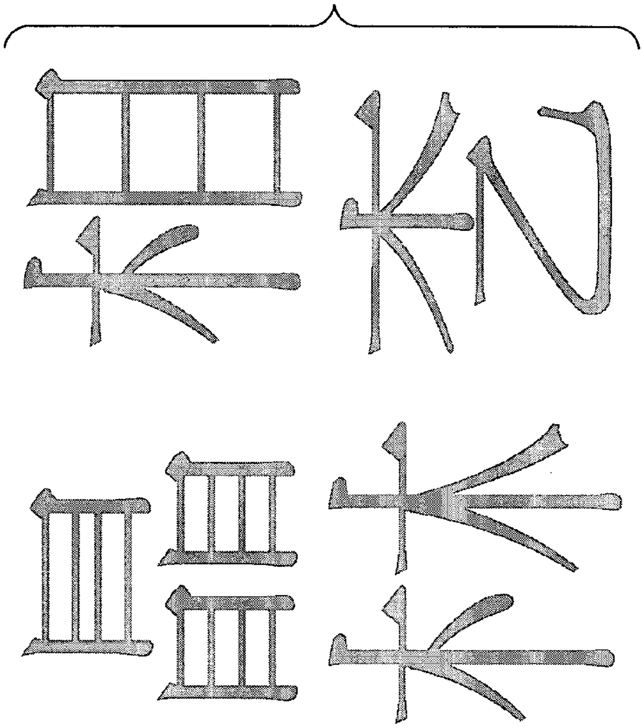
Figure 19A:
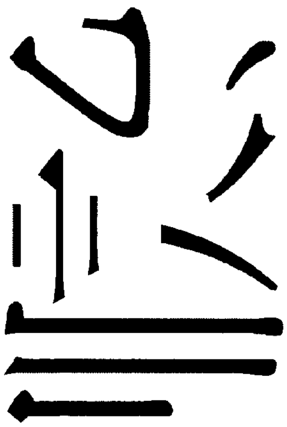

10. Examples of Sets of Objects Participating in a Hierarchical Font Representation FIGS. 19A, 19B, and 19C provide examples of possible sets of stroke, radical, and glyph objects, respectively, present in a font representation. Stroke and radical objects do not necessarily have any particular geometrical shape; specification of the parametric values may be required in order to instantiate an object (and define its shape). FIG. 19A and FIG. 19B show graphic examples of a variety of stroke and radical objects (respectively) in order to make visualization of these kinds of objects easier.

Figure 20:
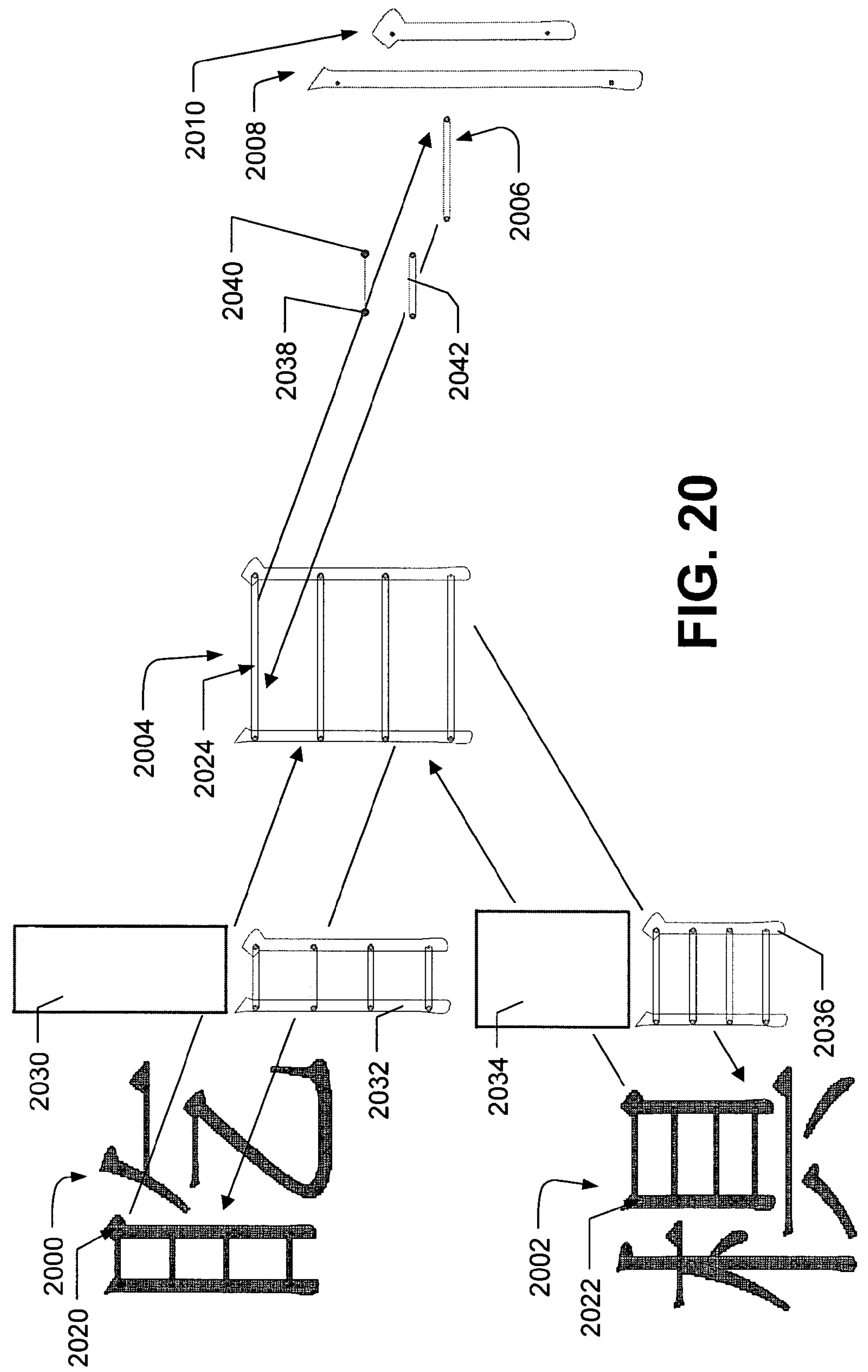
FIG. 20 illustrates an example of hierarchical coupling using hierarchical data associated with font objects.

11. Examples of Data Associated with Font Objects and the Process of Hierarchical Compiling FIG. 20 provides an example of the data associated with some font objects and a process of hierarchical compiling a glyph instance. This example will be used as a starting point for the following numerous, more sophisticated examples related to different aspects of the current invention.

In FIG. 20, reference numbers 2000 and 2002 represent two glyph objects. Reference number 2004 represents a radical object that participates as one of the components in both glyphs (2000 and 2002). Reference numbers 2006, 2008, and 2010 represent the stroke objects that participate as components in the radical object 2004.

A glyph object may have information or data associated with it regarding its componentized structure (e.g., an attribute including a list of IDs of the radical objects corresponding to radical components of the glyph) and information or data regarding positioning and size for every one of its radical components (e.g., an attribute including information regarding the vertical and horizontal extents of the radical components).

A radical object also may have information or data associated with it, e.g., information regarding its componentized structure (e.g., an attribute including a list of IDs of the stroke objects corresponding to the stroke components of the radical). A radical object also may have one or more associated conditional rules (e.g., conditional rules responsible for computation of the parametric values used for instantiation of the stroke components of the radical based on information regarding position and size (e.g., horizontal and vertical extents) of the radical obtained from the glyph object (e.g., also called "RadRule0" in this specification)).

A stroke object also may have information or data associated with it, e.g., an attribute including information related to the geometrical description of the stroke, such as the stroke's outline data in design units, a list of IDs of the stroke portion objects making up the stroke object, etc. Stroke objects also may include one or more associated conditional rules, e.g., conditional rules responsible for modification of the geometrical data according to provided parametric values, such as the parametric values associated with locations of the key stroke elements (e.g., also called "StrRule0" in this specification).

During compilation of a glyph, for every radical component of the glyph, information regarding its position and size (e.g., its horizontal and vertical extents) is provided as parametric value(s) to a conditional rule associated with the corresponding radical object, and the rule is invoked. For example, during compilation of glyph 2000 in FIG. 20, the position and dimensions (2030) of the radical component 2020 will be provided as input to RadRule0 associated with radical object 2004, and the rule then will be invoked.

During execution of RadRule0, parametric values used for instantiation of the stroke components of the radical will be computed, and the associated stroke conditional rules will be invoked. For example, stroke rule StrRule0 associated with stroke object 2006 may require the locations of the stroke's endpoints as input parametric values. During execution of the rule RadRule0, the values for the locations of the endpoints of stroke object 2006 are computed four times (once for each occurrence of the stroke object 2006 in radical 2004), and the rule StrRule0 is invoked separately for every one of the components. For example, for the topmost horizontal stroke 2024, the location of the endpoints 2038 and 2040 may be computed by offsetting some constant distances in the vertical and horizontal directions from the sides of the radical's "guiding frame" 2030. The locations of the endpoints for other instances of the horizontal strokes 2006 can be computed by execution of some corresponding appropriate code or rule.

During execution of StrRule0, outline data associated with the stroke object 2006 may be modified, if necessary, so that the stroke will be located at the required position and have the required length. In this manner, the stroke object 2006 is instantiated.

For every stroke component of the radical 2004, resulting geometrical data corresponding to the stroke instance is returned back to the radical. For example, for the topmost horizontal stroke 2024, resulting geometrical data 2042 is returned to the radical. In this manner, the radical is instantiated.

For every radical component of the glyph 2000, the resulting geometrical data corresponding to the radical instance is returned back to the glyph. For example, for the radical 2020, the resulting geometrical data 2032 is returned to the glyph, and all components of the glyph are instantiated. In this manner, the resulting geometrical data for the glyph is completely defined and ready for processing by a rendering engine in order to create a final bitmap image that is ready for display.

The above is a general description of a font representation and compilation process. In this example, conditional rules associated with the objects (e.g., RadRule0 and StrRule0) require only "component context" type information as their input. Those skilled in the art will appreciate, however, that the present invention is not so limited to the examples recited herein. Any conditional rule associated with any font object can require an input related to the run-time information. For example, a conditional rule associated with a stroke can "snap" positions of the key elements to the pixel grid or can modify a stroke width depending on the ppem in order to provide a better rendered image.

III. Geometrical Descriptions of Objects

In order to render font objects, the various objects (e.g., glyphs, radicals, strokes, enhancing features, etc.) must have geometrical data associated with them in some manner so that the rendering engine can be instructed to create the font object on the electronic display device or printer. The following describes examples of geometrical descriptions of various font objects useful in accordance with at least some examples of this invention.

A. Additional Terms

"Primary geometrical data," as used in this specification, is part of the geometrical data associated with an object. It explicitly participates (or may participate under certain conditions) in input provided to a rendering engine in order to create the resulting bitmap image. For example, outline or bitmap data associated with a glyph in a TrueType font representation are examples of primary geometrical data. For a hierarchical font representation, primary geometrical data typically is associated with the lowest-level objects only (e.g., the strokes or stroke portions).

Different types of primary geometrical data relate to the different ways the data is treated by the rendering engine while creating the rendered image. Some types of primary geometrical data useful in at least some examples of the invention include: outline-based geometrical descriptions; swept trajectory-based geometrical descriptions; and bitmap-based geometrical descriptions.

"Auxiliary geometrical data" is geometrical data associated with an object such that it is not "primary" data. "Auxiliary geometrical data" can be used for simplification of control. For example, the locations of the elements of a modifiable stroke or radical object are examples of auxiliary geometrical data. For a hierarchical font representation, "auxiliary geometrical data" may be associated with objects at any level of the hierarchy.

"Resulting geometrical data" is geometrical data that describes the appearance of an object's instance and directly provides an input to the rendering engine in order to create the resulting bitmap image. Any instance of any object usually has resulting geometrical data. This includes objects that have associated primary geometrical data and those that do not.

"Mathematical representation" is a particular mathematical representation of geometrical data (for example, piecewise linear curves, second or third order Bezier curves, or BSpline curves). Many aspects of the present invention are independent of any particular choice of the mathematical representation. However, a choice of a particular mathematical representation may influence the design possibilities, as well as design and rendering complexity.

"Geometrical description" of an object is the minimal complete set of the primary geometrical data associated with an object that is sufficient to provide complete information for generation of a rendered image of the object under specific conditions. The type of the geometrical description is the same as the type of the primary data included in the description. More than one geometrical description can be associated with an object. For example, in a TrueType font representation, if a glyph has associated outline data (in design space) and five bitmaps for rendering at 12 to 16 ppem inclusive, the glyph then is considered to have six geometrical descriptions: one outline-based and five bitmap-based. Even if the outline is instructed to collapse to a single point at 20 ppem and preserve its original shape at all the other ppems, the glyph has one outline description.

B. Mathematical Representations of Curves Used in True Type

Figure 21:
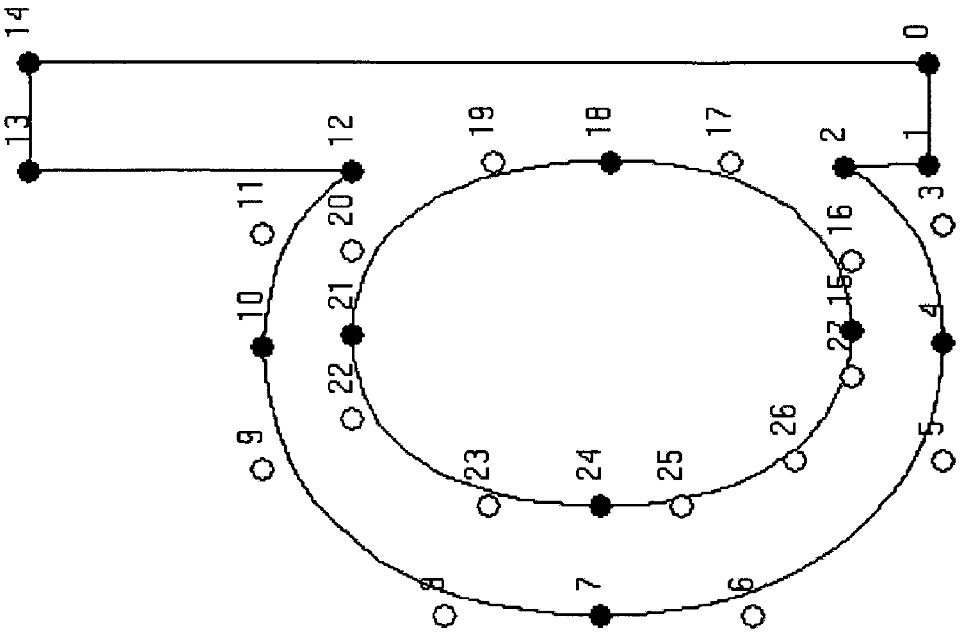
FIG. 21 illustrates an example representation of curves according to the TrueType convention.

According to a convention, curves that form a glyph's outline(s) in TrueType fonts have a mathematical representation as described in more detail below. A curve may be represented by a series of on-curve and off-curve control points (as illustrated in FIG. 21, where on-curve and off-curve control points are marked with small filled ("black") circles and unfilled ("white") circles, respectively). A mathematical interpretation of the control points is defined as follows:

Two adjacent on-curve points define a segment (e.g., pairs like (0,1) or (13,14) in FIG. 21).

If there is exactly one off-curve point between on-curve points, then these three control points define a quadratic Bezier curve (e.g., triples like (2,3,4) or (10,11,12) in FIG. 21).

If there are more than one off-curve control points between two on-curve points, then this sequence of control points defines a quadratic uniform non-rational BSpline (e.g., sequences like (4, 5, 6, 7) or (24, 25, 26, 27, 15) in FIG. 21).

C. General Remarks Regarding Geometrical Descriptions

Clearly, the type of a geometrical description and/or the presence of multiple geometrical descriptions associated with an object are independent of whether or not the font is a representation that has a hierarchical or a flat structure. For a hierarchical font representation, geometrical descriptions typically are associated with the entities at the lowest level of the hierarchy, although other associations are possible without departing from the invention.

As described below, at least one aspect of the present invention relates to the association of multiple geometrical descriptions with a font object, and the conditional choice of one of these descriptions at the time of instantiation. In this case, for a composite object, different components of a single object can be instantiated using different geometrical descriptions.

In the examples that follow, much of the description relates and corresponds to a hierarchical font representation (in many instances with geometrical descriptions associated with objects at the lowest level of the hierarchy). However, the presence of a hierarchical structure is not a requirement of the present invention and it should not be considered as a limitation for applicability of the approach related to the geometrical descriptions.

Outline-based geometrical descriptions and sweeping trajectory-based geometrical descriptions of font objects can be associated with both modifiable and static objects. Bitmap-based geometrical descriptions can be "naturally" associated with static objects only. Although it is possible to scale static bitmap descriptions to other sizes, the rendered results are almost always of poor quality. For this reason, where possible, aspects of the present invention will avoid the use of scaled (dynamic) bitmap descriptions for modifiable objects.

D. Multiple Geometrical Descriptions Associated with the Same Font Object and Contextual Choice of a Description The following describes example systems and methods according to the invention that combine outline-based geometrical descriptions and trajectory-based geometrical descriptions for the same font objects. This approach can be applied to any font representation, for example, starting from flat representations with static font objects and including hierarchical representations with modifiable font objects. Some aspects of the invention, e.g., for use with hierarchical font representations and/or modifiable font objects, are described in more detail below. The approach can be applied independently of a particular mathematical representation of the geometrical data. Some specific aspects related to a True Type-compatible representation are also described below.

One purpose of a geometrical description (and of the rules related to the geometrical description) of an object is to produce legible rendering results with the highest possible quality for all ppem, under a variety of rendering conditions, and for all appearances of the object. Another objective is keeping the overall required storage space small for the collection of all geometrical descriptions (and related rules) associated with all the font objects. Existing "structured ideographic" fonts are characterized by both low-quality rendered output and extremely large storage space requirements. Various aspects of the present invention will address these quality and/or storage space issues.

Independent of the underlying geometrical description, the resulting rendered images considered as having "good quality" may have different characteristics for different ppems or under different rendering conditions.

Three major classes of ppems are distinguished with respect to different characteristics of the rendered images. Ppem boundaries between the classes are approximate and can vary depending on a specific typeface design. However, the ppem values can be classified generally as follows:

Low ppem: approximately below 16 (typically in the range 9-15)

Middle ppem: approximately 16-30

High ppem: approximately above 30

Characteristics of high quality rendered images clearly depend on the number of pixels available for the rendering, and these characteristics may change dramatically from low to high ppems. The various characteristics listed below are common characteristics typically shared by a majority of glyphs. However, exceptions are possible depending, for example, on a specific typeface design. In general, the strokes (or "stroke-curves," i.e., the strokes that form a font object's shape) of a glyph may render with different degrees of detail depending on the pixel region available for the rendering and on the configuration of the region available for the rendering. These aspects of the invention may be used in any desired font representation, including, for example, ideographic fonts, hierarchical font representations, character-based font representations, and the like. The following characteristics may be taken into account by code associated with systems and methods according to the invention when rendering at various ppem classes in accordance with examples of the invention:

Low ppem: The rendered images of the glyphs are composed from a series of one-pixel, mono-width curves, as if painted by a one pixel wide brush using a trajectory as a centerline to guide the brush. Enhancing features are not visible.

Middle ppem: The middle parts of "stroke-curves" are one-pixel mono-width. Depending on a glyph's complexity, all or only some of the enhancing features may be visible, but usually they have an extremely simple form, such as one or two pixels turned ON.

High ppem: The middle parts of (at least some) "stroke-curves" become more than one pixel wide (either constant or variable width). Enhancing features are rendered with a greater level of detail and may form regions of pixels that are turned ON.

Figure 22A:
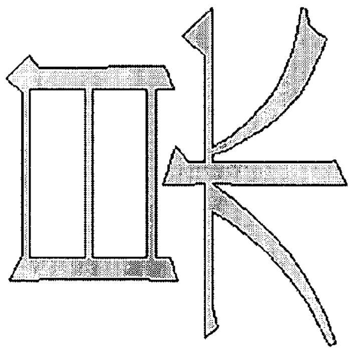
FIGS. 22A through 22E illustrate various characteristics of high quality rendered images for glyphs at different ppems.
Figure 22B:
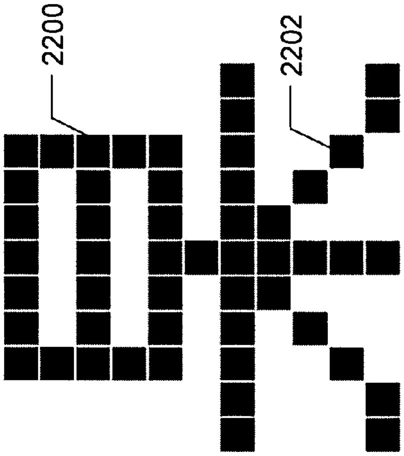
Figure 22C:
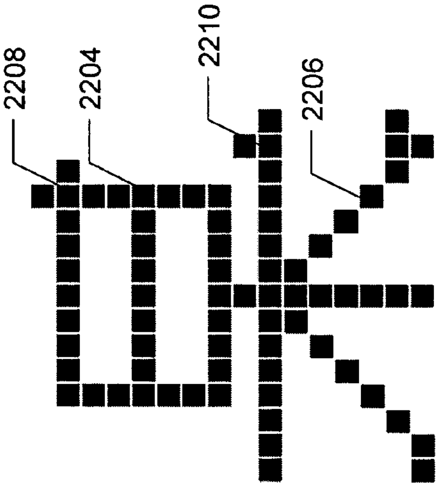
Figure 22D:
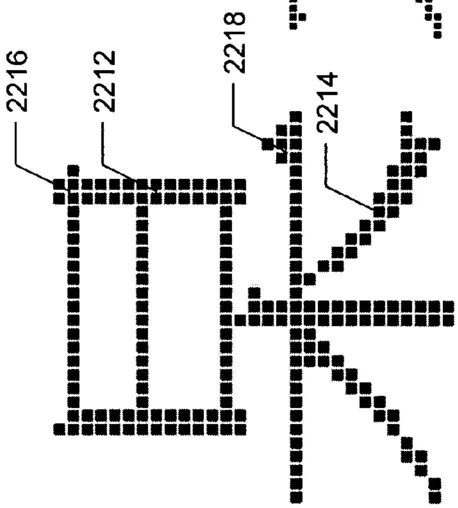
Figure 22E:
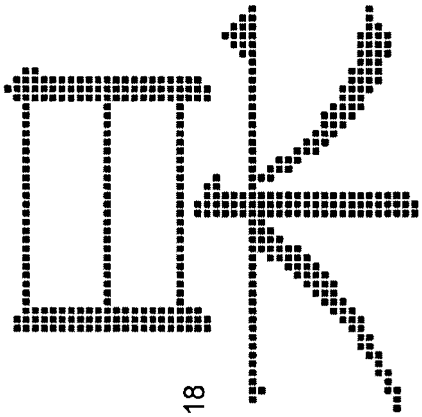

FIGS. 22A-22E illustrate examples of different characteristics of rendered images corresponding to the same glyph for different classes of ppems. FIG. 22A shows the glyph as it appears in a typeface or in design space. FIG. 22B shows the glyph rendered at low ppem. "Stroke-curves" (such as 2200 and 2202) are one pixel wide mono-width rendered curves. Enhancing features (such as stroke end features or widened portions of strokes) are not visible. In FIG. 22C, the glyph is rendered at middle ppem. As shown, the middle parts of "stroke-curves" (such as 2204, and 2206) are one pixel wide mono-width curves. Some of the enhancing features (for example, stroke end features 2208 and 2210) are displayed as one or two pixels turned ON. In FIG. 22D, the glyph is rendered at high ppem (close to the boundary between middle and high ppems). As shown, the middle parts of the "stroke-curves" (for example, curves 2212 and 2214) become more than one pixel wide. Enhancing features are displayed by the turned ON pixel regions (for example, end features 2216 and 2218). FIG. 22E provides an additional example of rendering at high ppem, a ppem even higher than that used in FIG. 22D. The rendered image has the same overall characteristics as the one shown in FIG. 22D, but even more details of various features in the glyph can be seen.

In order to provide legible, high quality rendering results, a geometrical description used in at least some examples of the invention will support the characteristics of the rendered image for those ppems where the description is used. However, no single type of the geometrical description will provide the best possibilities and output at all ppems. Different types of geometrical descriptions tend to produce better quality and more legible font objects at some classes of ppems and less at others, as will be described and shown in more detail below.

Bitmap-based geometrical descriptions typically are able to provide good rendering results, but they generally are not practical or actually useful above 20-22 ppems, because the descriptions are extremely expensive from a production point of view and require extremely large amounts of storage space.

Outline-based geometrical descriptions are able to provide good rendering results for high ppem. However, for low and middle ppems, outline-based descriptions typically require extensive pixel-hinting, for example, in order to maintain stroke widths and minimal separation distances. Hinting is extremely expensive from a design (and production) point of view, and it requires extra storage/memory space. In addition, for low and middle ppems (depending on a glyph's complexity), an outline-based description usually contains more information that can be reasonably displayed in a rendered image. Therefore, this extra information is not useful, but it takes up storage/memory space.

Simple trajectory-based geometrical descriptions provide a natural way to describe "stroke-curves" at low/middle ppems. However, these descriptions rarely produce high quality font objects at high ppems. For high ppems, application of a trajectory swept by a constant brush result in a "stick-like" stroke-curve appearance, even if the trajectory is swept by a brush more than one pixel wide. Generally, application of sweeping trajectories, swept by a variable width brush, while possible, may cause run-time performance issues, particularly for electronic devices having reduced or limited processing capacity.

Because a single font representation often is intended to be used under different run-time conditions, it advantageously will be able to provide legible, high quality rendering results over a wide range of ppems, from low to high. However, for most glyphs or font objects, there is no single geometrical description that is optimal for use at all possible ppems. In existing, currently available fonts, the following combinations of the geometrical descriptions typically are used:

- Outline-based font object descriptions are designed for and used at high ppems and sometimes they may be hinted for use at lower ppems. Bitmap-based font object descriptions generally are not used for ppems above 20 or 22. Font representations of ideographic fonts may contain bitmap-based descriptions for selected ppems only (e.g., to limit memory taken up by the bitmaps). Generally, the bitmaps have low quality design and do not cover the whole glyph set (and still the bitmaps generally occupy at least/about half of the memory space required for a font). In general, outline-based font object descriptions are not hinted for ideographic fonts because of the large number of glyphs, the high cost of hinting, and the resulting large file size. As a result, rendered images of glyphs produced-from outline-based descriptions may have poor (or extremely poor) appearance at low/middle ppems (and irregular appearance for structured ideographic fonts at high ppems).
- Trajectory-based font object descriptions typically are designed for and are used at high ppems and as a result, produce low quality rendered images for low/middle ppem (where they sometimes are substituted by bitmaps, exactly in the same manner as in "outline-based descriptions" described above). For high ppems, application of a swept trajectory by a constant brush tends to result in a "stick-like" appearance for the stroke-curves. Even if the trajectories are swept by a brush wider than one pixel and/or when the trajectories are used to describe enhancing features, the resulting images still tend to be "stick-like."

A problem common for both types of fonts is that both outline-based and trajectory-based geometrical descriptions are designed for high ppems and fail to produce rendered images of a high quality for low/middle ppems.

E. More Specific Examples

In accordance with at least one aspect of the present invention, a combination of trajectory-based and outline-based geometrical descriptions associated with the same font objects may be stored and used in the font, and at run-time, a choice of the "most appropriate" description for use may be determined, e.g., based on various run-time conditions, as will be described in more detail below.

In at least some examples of the invention, the ppem associated with the rendering at run-time will be considered as one parameter that may influence the choice of the description to be used in the rendering. A single trajectory-based description and a single outline-based description, optionally independently designed descriptions, will be associated with an object and stored as part of the font. Application of even a simplified approach according to the invention where ppem is the only run-time parameter considered will, in at least some instances, provide rendering results of high quality (or at least improved quality) at low and high ppem.

A more robust rendering scheme, which eliminates the limitations listed above and utilizes additional run-time parameters, may provide rendering results of high quality for a wide range of ppem (including middle ppem). Such a scheme is described in more detail below:

- For high ppems (when a large number of pixels is available for rendering a glyph), an outline-based description typically will provide the highest quality rendering results. Therefore, in accordance with examples of the invention, an outline-based description will be used to produce high quality rendering results when run-time parameters indicate that the rendering will be at a high ppem level or that a large number of pixels is available for the rendering.
- For low/middle ppems (when a smaller number of pixels is available for rendering a glyph), font designs or representations in accordance with aspects of the present invention may rely on and use an independent, stable trajectory-based description of a font object rather than attempting to leverage the outline-based description (attempted use of the outline-based description typically either provides low-quality rendering results at low and middle ppem or requires extensive hinting).

Choose an appropriate description at run-time depending, for example, on the ppem value, and then use the chosen description for generation of the rendered image.

Having both trajectory-based descriptions and outline-based descriptions associated with the same font object and using contextual choice of an appropriate description (e.g., based on run-time parameters such as ppem) allows maximal or at least improved "automatic" support of high-quality rendering results directly based on the properties of the description. For example, for low/middle ppem, a trajectory-based description:

Automatically maintains the width of the "stroke-curves."

Usually is more stable (as compared to an outline-based description) under mapping from design space coordinates to device space, because a trajectory-based description designed especially for low/middle ppems typically has lower complexity (e.g., contains a lower number of elementary curves, and the curves have lower mathematical complexity) than an outline-based description representing the same glyph element.

According to at least one aspect of the present invention, the various geometrical descriptions of a given font object may be designed independently with respect to one another. In this manner, every one of the geometrical descriptions may be designed so that it will provide the best possible rendering results for at least some range of ppems (or other run-time parameters), and that specially designed description then will be used under those conditions (e.g., code associated with the font will look at the relevant run-time parameters and determine which description should be used). High-quality design of a particular description becomes easier, and the rendered images have a more stable appearance because one description is not attempting to provide a universal solution at all ppem levels. Rather, each description is used only under a certain limited set of conditions. For example, knowledge of a maximum ppem at which a trajectory-based description will be used allows limiting a range of the scaling ratios between the design units and the device units. This information can be used explicitly while designing a trajectory in the design units. For example, a part of a trajectory representing an ending or a curvature of a trajectory at a corner can be designed in design units so that it will provide the desired rendering result for a whole range of ppems without additional adjustments (e.g., hinting) for a particular ppem.

Any rules associated with an object and related to the geometrical description(s) can be designed independently for the different descriptions, optionally and advantageously taking into consideration the conditions under which that description will be used.

However, in at least some instances, different geometrical descriptions, or the rules related to the descriptions, can share (or may require as input) common elements of data. For example, rules responsible for modification and/or positioning of a stroke object may require at least some of the same input (such as locations for the stroke's key elements), and this input may be used, in at least some instances, for both trajectory-based descriptions and outline-based descriptions of the stroke object.

The combination of trajectory-based descriptions and outline-based descriptions associated with the same objects in a font representation, as available in at least some examples of the invention, requires implementation of a rendering engine that is able to support both descriptions (and optionally any other description in the font). In particular, the rendering engine, in at least some examples of the invention, should support access functionality (that is, it should be able to access the data related to any one of the geometrical descriptions of any objects), should support rendering functionality (that is, it should be able to produce a bitmap image based on any type of the geometrical description), and should provide the ability to choose one of the descriptions based on run-time parameters or conditions.

The combination of trajectory-based geometrical descriptions and outline-based geometrical descriptions in accordance with aspects of the present invention increases the amount of information associated with an object and requires more storage space as compared to an outline-based description alone, but such a combination appears to be much more compact than any combination of descriptions that includes a significant number of bitmap-based descriptions. Typically, a trajectory-based description of an object requires approximately less than half as much data (or memory space) as compared to an outline-based description. For a hierarchical font representation, the overall storage size associated with the font does not increase significantly when the combination of trajectory-based and outline-based geometrical descriptions is used (as compared to outline-based descriptions alone) because the geometrical descriptions typically are associated with a rather limited number of components at the lowest level of the hierarchy.

As noted above, trajectory-based descriptions can provide high-quality rendering results at low/middle ppem, particularly when the trajectory-based descriptions are specifically and independently designed for use at low/middle ppem. This makes it possible to reduce significantly the number of bitmap-based descriptions present in a font representation (or even completely avoid bitmap-based descriptions, in at least some instances). Eliminating or reducing the number of complete bitmap-based descriptions significantly decreases the required storage size of the font representation without compromising the rendered font quality.

If certain limitations regarding the scope of a font's usage are known a priory (for example, if the font is supposed to be rendered at low ppems only or at high ppems only), having multiple geometrical descriptions provides a possibility to exclude some redundant information from the font representation (or to design a font representation containing only one type of the geometrical description) and may make the font representation even more compact.

The use of a combination of trajectory-based and outline-based descriptions for providing a font in accordance with aspects of this invention does not prevent inclusion and use of bitmap-based descriptions in the font. Although properly designed trajectory-based descriptions can reduce the number of bitmaps associated with a glyph (or even make use of bitmaps completely unnecessary), bitmaps still can be used, if desired, e.g., based on a font designer's preferences, particularly at low ppems and/or for glyphs of high complexity.

Figure 23A:
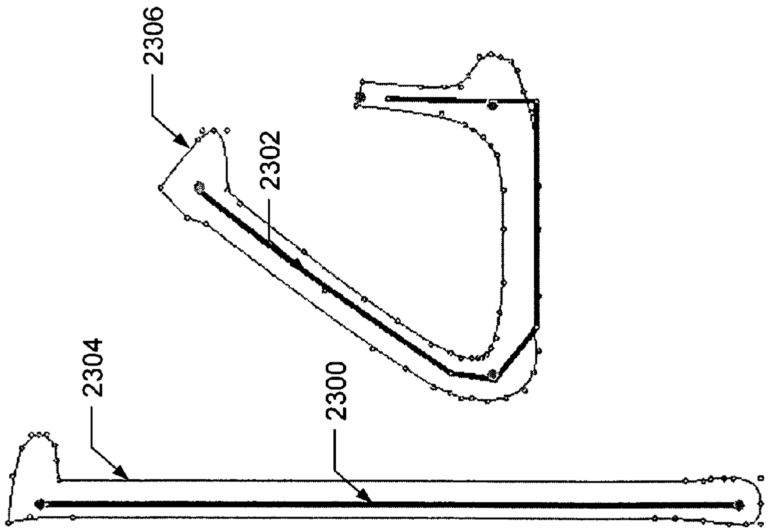
FIGS. 23A through 23C illustrate examples of trajectory-based geometrical descriptions and outline-based geometrical descriptions associated with various objects, and contextual choice of an appropriate description.
Figure 23B:
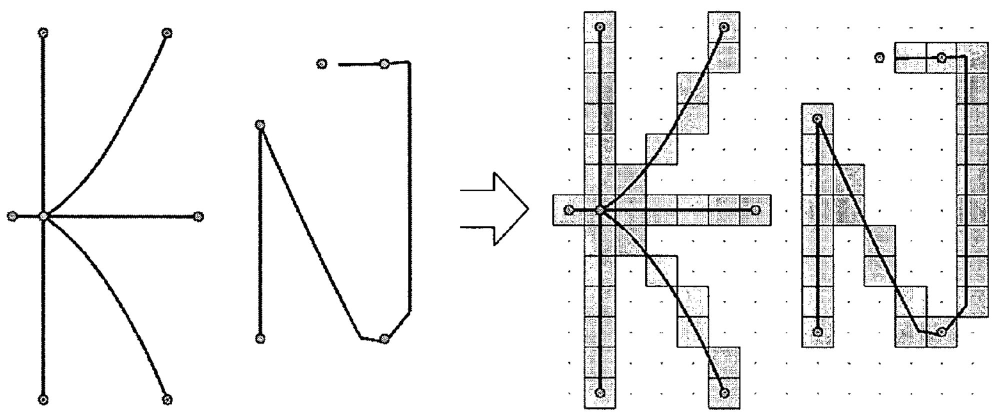
Figure 23C:
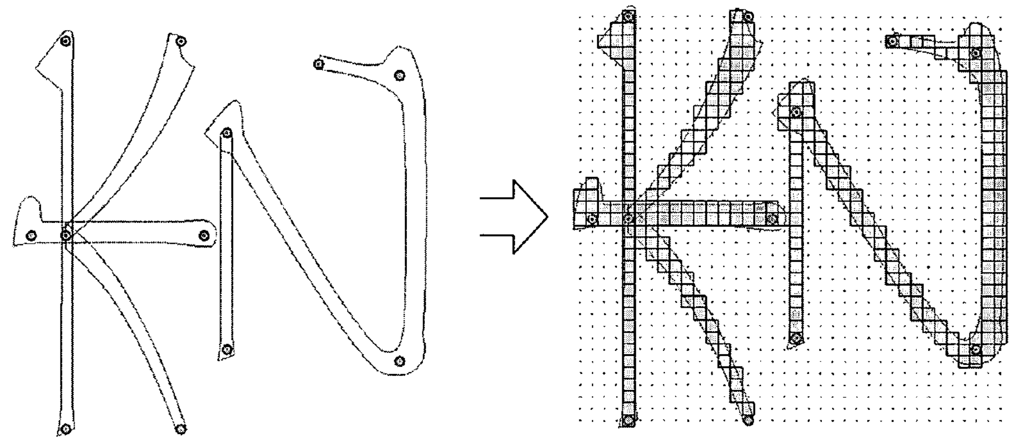

FIGS. 23A-23C provide examples of trajectory-based geometrical descriptions and outline-based geometrical descriptions associated with the same font objects, and of contextual choice of an appropriate description, e.g., based on one or more run-time parameters. FIG. 23A illustrates trajectory-based descriptions (2300 and 2302) and outline-based descriptions (2304 and 2306) associated with two (modifiable) stroke objects. The outlines have relatively high complexity, while trajectory 2300 is designed to be a simple segment and trajectory 2302 is a simple polygonal curve. FIG. 23B and FIG. 23C provide examples of the rendered images of the same glyph including these strokes at low and high ppems, using trajectory-based descriptions (FIG. 23B) and outline-based descriptions (FIG. 23C) of the strokes during compilation and rendering of the glyph. At both low and high ppems, the rendered images have high quality and an appropriate level of detail for the available number of pixels. Although the trajectory-based descriptions and outline-based descriptions may be designed independently, in this specific example, rules responsible for modification of the geometrical data require data relating to locations of the stroke's key elements as their input for both the trajectory-based descriptions and the outline-based descriptions.

F. Representation of Stroke-Enhancing Features by Swept Trajectories ("Augmented Trajectories")

Additional aspects of the present invention relate to representation of enhancing features of a stroke or other font object using swept trajectories. The use of such swept trajectories can be useful to provide some stroke enhancing detail (such as end features, serifs, and the like), under at least some rendering conditions, at middle ppems and higher. This approach can be applicable to any font representation that supports trajectory-based descriptions (independent of the presence/absence of a hierarchical structure, independent of the modifiability of the objects, and independent of a particular mathematical representation of trajectories).

At the middle ppems, while the middle or main parts of the "stroke-curves" still typically appear in a rendered image as single pixel mono-width curves, some enhancing features may become visible, usually as one or two turned ON pixels. Although the enhancing features still do not have enough pixel space available to them to be rendered with great detail, the quality of the rendered images can significantly benefit when those features are displayed (even if the display is limited to one or two turned ON pixels).

As at low ppems, a trajectory-based description still is able to support rendered images that may be modified to include enhancing features. The geometry of the enhancing features can be described by a trajectory swept by a one-pixel brush (e.g., like the remainder of the trajectory, at least in some examples). A trajectory-based description that supports visibility of the enhancing features may be referred to in this specification as an "augmented trajectory," as opposed to a "simple trajectory" (which refers to a trajectory-based description that does not support visibility or display of any enhancing features).

Figure 24D:
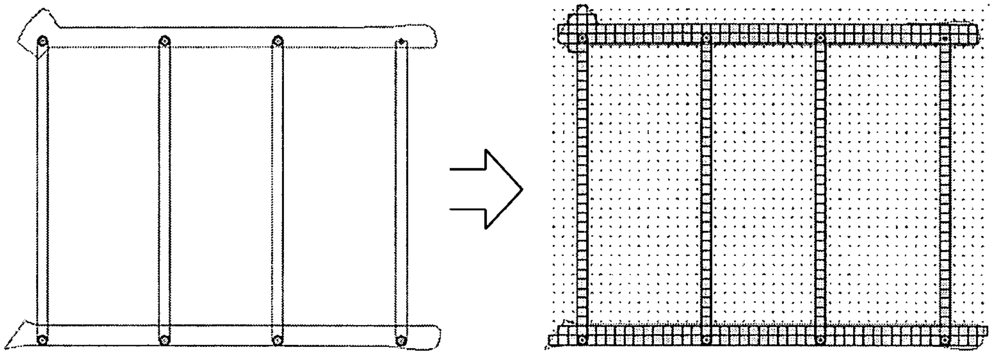
FIGS. 24A through 24D illustrate examples of representations of the same glyph using simple trajectory-based geometrical descriptions, augmented trajectory-based geometrical descriptions, and outline-based geometrical descriptions at different ppems.
Figure 24C:
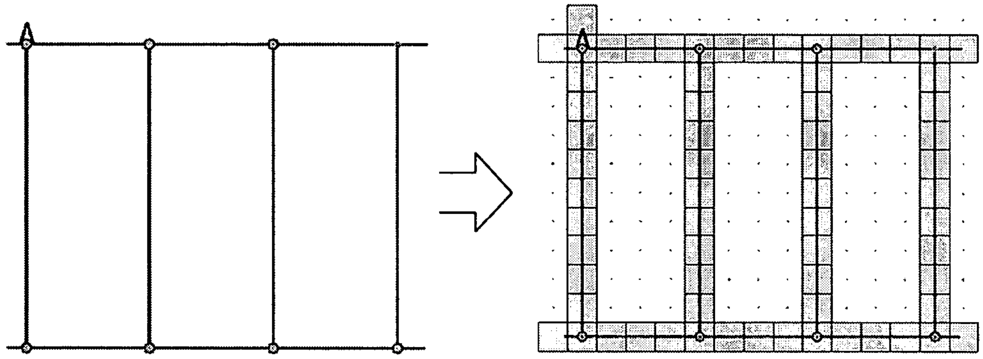
Figure 24B:
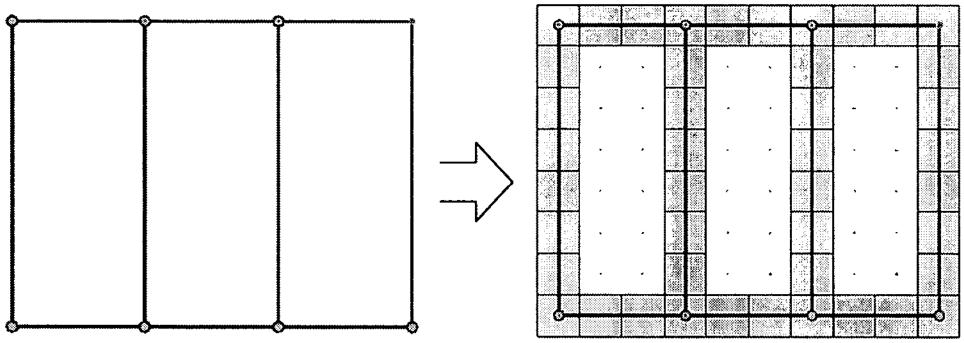
Figure 24A:
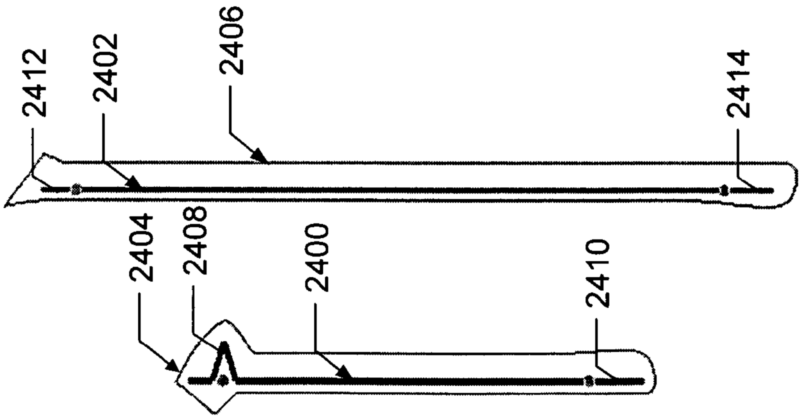

FIG. 24A illustrates examples of use of "augmented trajectories" (2400 and 2402) and outline-based descriptions (2404 and 2406) associated with two (modifiable) stroke objects. As in the case of the "simple trajectory" described in conjunction with FIGS. 23A through 23C, the outline-based descriptions have relatively high complexity, while the augmented trajectory-based descriptions are relatively simple polygonal curves or segments. Parts 2408, 2410, 2412, and 2414 of the trajectories shown in FIG. 24A are responsible for describing the enhancing features. FIG. 24B, FIG. 24C, and FIG. 24D provide examples of the rendered images of the same glyph at low, middle, and high ppems, respectively, using a simple trajectory-based description, an augmented trajectory-based description, and an outline-based description of the strokes, respectively, during compilation and rendering of the glyph. At all ppems, the rendered images have high quality and an appropriate level of detail for the available pixel space.

1. Relationship Between "Simple" and "Augmented" Trajectories

Theoretically, an object in a font representation may have two (or even more) independent trajectory-based descriptions. For example, a "simple trajectory" description can be used at low ppems and an "augmented trajectory" description can be used at middle ppems. As a practical matter, however, these descriptions may share a lot of common data. Therefore, rather than having completely separate simple and augmented trajectory descriptions, in at least some examples of the invention, a trajectory-based description of an object can be designed from the very beginning to support the enhancing features. In this case, a modification rule associated with the object can completely or partially disable the enhancing features (for example, by modification of a trajectory, e.g., by "collapsing" the parts of a trajectory responsible for visualization of the enhancing features) when there is not enough "pixel space" available to render a detailed image or when a uniform design should be applied to a set of objects. In this case, a "simple trajectory" description becomes a derivative form of the "augmented trajectory" description, which makes the font more compact. However, no specific relation between "simple" and "augmented" trajectories should be considered as a limitation to the present invention. "Simple" and "augmented" trajectories also can be designed independently, particularly if it makes it easier to create a high-quality (mathematically "stable") description applicable for smaller ranges of ppems (and therefore for smaller ranges of scaling factors between design space and device space).

2. Augmented Trajectories and the Font Structure

The possibility of representing at least some enhancing features of a stroke using a trajectory-based description is independent of the presence of a hierarchical structure. As with any other geometrical description, trajectory-based descriptions of the enhancing features can be associated with any appropriate font object (e.g., depending on a particular structure of a font) without departing from the invention. For example, as shown in FIGS. 24A-24D, a trajectory-based description of an enhancing feature (such as enhancing feature 2408) can be included as a part of a geometrical description associated with a stroke.

As another example, the "enhancing features" may be stored as separate "stroke portions" that can be included and called when the stroke is rendered under certain conditions (e.g., middle ppems) and that can be ignored or not called under other conditions (e.g., low ppems). An example was described above in conjunction with FIGS. 17A and 17B. If an enhancing feature is represented by an independent font object (e.g., in a hierarchical structure), the trajectory-based description of the feature will be associated with this object and will be used during instantiation of any stroke containing this enhancing feature as a component.

An enhancing feature also may be associated with or attached to a font object in any desired manner without departing from the invention. For example, this association or attachment may be accomplished if either data describing the enhancing feature is directly associated with the object or if it is associated with one of the (immediate or not immediate) components of the object (for composite objects).

3. Modifiable Augmented Trajectories

Figure 25A:
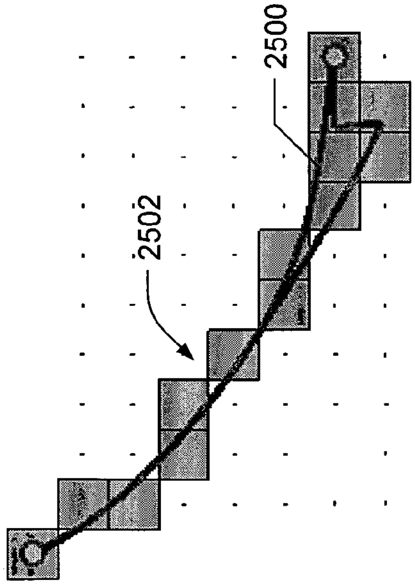
FIGS. 25A and 25B illustrate examples of trajectory-based descriptions including a modifiable stroke-enhancing feature.
Figure 25B:
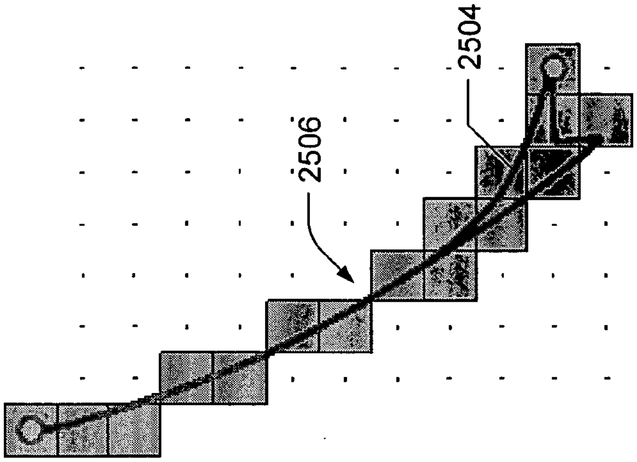

FIGS. 24A-24D show a static enhancing feature by an "augmented trajectory." The possibility of representing enhancing features using a trajectory-based description is independent of the modifiability of the object to which the enhancing feature is attached. Moreover, an "augmented trajectory" may be capable of describing modifiable enhancing features that will have different rendering patterns under different conditions. For example, FIGS. 25A and 25B illustrate a trajectory-based description of a modifiable enhancing feature that is able to change its shape and the resulting rendering pattern. In this example, the trajectory-based description of the ending feature (2500 and 2504) is associated with a corresponding stroke object (2502 and 2506, respectively). An associated conditional rule may be used to modify part of the trajectory responsible for visualization of the ending feature exactly in the same way as it would modify a "simple trajectory." As a result, the ending feature may change its shape and the rendering pattern when the input parametric values for the rule are modified, as shown in FIGS. 25A and 25B.

4. Augmented Trajectories Implementing a "Fill-In" Routine

Figure 26:
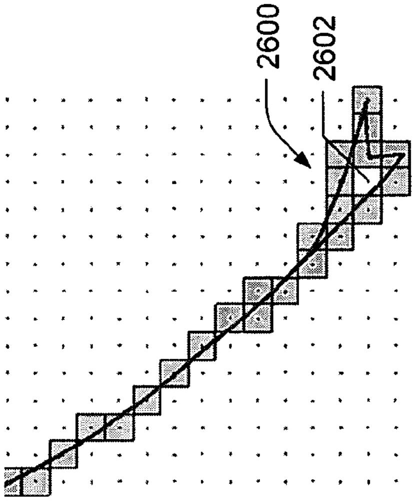
FIG. 26 illustrates an example "fill-in" routine used with trajectory-based geometrical descriptions in accordance with at least some examples of the invention.

As illustrated in FIG. 26, at certain ppem levels and/or for certain design configurations of an enhancing feature, a pixel region corresponding to the enhancing feature in the rendered image may contain interior pixels that are not swept by the trajectory. In FIG. 26, pixel region 2600 corresponding to the enhancing feature of a stroke contains an interior pixel 2602 that is not swept by the trajectory. Typically, this could happen at ppems above some threshold between middle and high ppems. However, to make a design easier (especially for modifiable enhancing features, when a proper rendering result should be achieved for any possible modifications, in addition to any ppem where the description is used), a proper rendering of the enhancing features represented by a trajectory-based description can be supported by a "fill-in" routine executed by a rendering engine. For example, for enhancing features, the routine or code associated with an enhancing feature may be responsible for "filling" the inner parts of the closed regions bounded by a trajectory (i.e., by turning "ON" pixels). In the example shown in FIG. 26, a "fill-in" routine will identify pixel 2602 and turn it ON in accordance with this example of the invention.

Other possibilities for supporting routines can exist, and the present invention is not limited by the example of a "fill-in" routine presented above.

G. Use of Multiple Geometrical Descriptions Associated with a Font Object and Contextual Choice of a Design As noted above, parameters or factors other than ppem may be relied upon to influence choice of a geometrical description for a particular font object rendering. Additionally, aspects of this invention may be extended for use at middle ppems and to modifiable objects. Finally, selection and use of different geometrical descriptions for different parts or components of an object may be described based on various "local" characteristics associated with the rendering. These aspects of the invention will be described in more detail below.

1. Extension to Middle PPEMs and Modifiable Objects

As demonstrated above, one of the possibilities for extending aspects of the present invention to the middle ppems is to associate "augmented trajectory" descriptions with the font objects. In this case, a general scheme (for design and choice of the geometrical descriptions) may include the following:

(1) Design "simple trajectory," "augmented trajectory," and outline-based descriptions to be applied respectively at low, middle, and high ppems.

For a hierarchical font representation, the descriptions may be designed for the objects at the lowest level of the hierarchy.

Different geometrical descriptions can be designed completely independently or can share some common data. For example, if a "simple trajectory" description is designed as a derivative from an "augmented trajectory" description of an object (as described above), then the object actually has one associated trajectory-based description, and the "simple trajectory" description is supported at instantiation time by a modification rule applied to the "augmented trajectory" (rather than by a separate description), e.g., by collapsing the enhancing features.

(2) For every modifiable object (if any) that has an associated geometrical description(s), design conditional rule(s) associated with the object and responsible for modification of the geometrical data.

Conditional rules associated with different descriptions can be designed completely independently or can share (or require) common data.

(3) At run-time, choose an appropriate geometrical description based on the ppem value (e.g., as illustrated in conjunction with FIGS. 24A-24D) and/or other run-time parameter data.

2. Additional Factors Potentially Influencing Geometrical Description Choice

Figure 27:
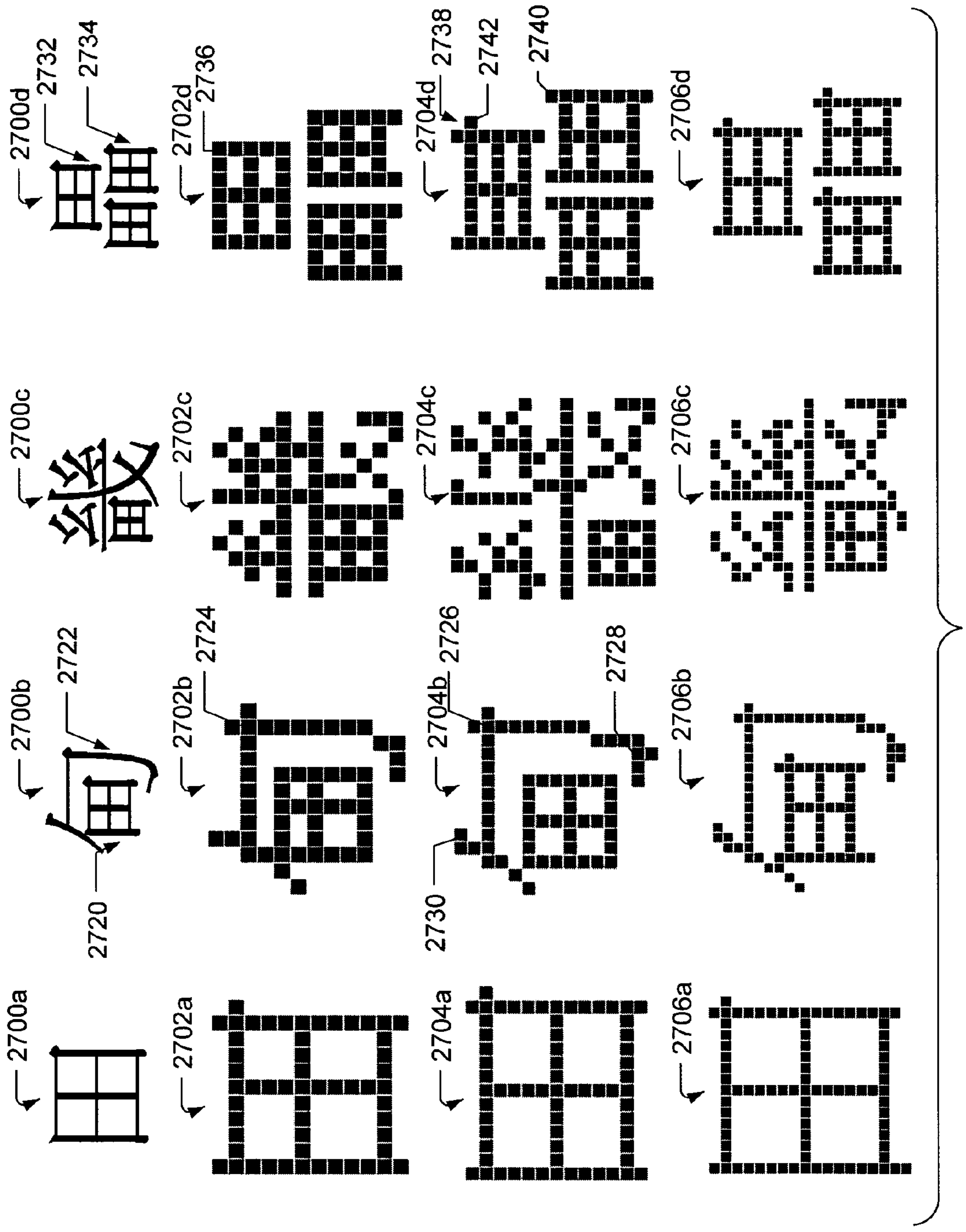
FIG. 27 illustrates examples of high quality renderings of radicals with different levels of detail depending on run-time information and space allocated for the radical in the glyph.

As described above, ppem (e.g., the number of pixels available for rendering of an entire glyph) typically has an important influence on the characteristics of a high-quality rendered image, and therefore, it may have an important influence on the choice of a specific geometrical description. Ppem, however, need not be the only factor taken into consideration when choosing a description. For example, even at the same ppem, it may be beneficial to have rendered images with different characteristics or rendered from different types of geometrical descriptions for different glyphs and/or for different portions within a single glyph. For example, FIG. 27 shows four glyphs (2700*a*, 2700*b*, 2700*c*, and 2700*d*) and their rendered images of "valid" quality for low ppem (2702*a*, 2702*b*, 2702*c*, and 2702*d*), middle ppem close to the boundary between low and middle ppem (2704*a*, 2704*b*, 2704*c*, and 2704*d*), and middle ppem in the mid-range of the middle ppems (2706*a*, 2706*b*, 2706*c*, and 2706*d*). All four glyphs contain one or more instances of the same radical (that is, the single radical in glyph 2700*a*, or radical 2720 in glyph 2700*b*, etc.), and the enhancing features of the radical are designed to be identical in all the instances. At the same ppem, "valid" rendered images for different glyphs (and for different instances of the same radical in a single glyph) may have different characteristics, depending on a glyph's complexity (density). Moreover, different parts of a glyph may be rendered with different levels of detail, e.g., based on the local characteristics of a glyph, as described in the examples that follow:

Although at low ppems, there usually is not enough pixel space for displaying enhancing features (instances of the common radical in the images 2702*b* and 2702*c* are rendered as six straight lines, without ending or corner features being visible), glyph 2700*a* has a very "sparse" structure and its rendered image 2702*a* has all the endings visible (as one or two turned ON pixels).

For a quite complex glyph, like glyph 2700*c*, the instance of the radical may appear rendered without any enhancing features even at middle ppems (e.g., 2704*c* and 2706*c*) when usually at least some enhancing features often become visible.

Even inside the same glyph, different radicals can be rendered with different levels of detail. For example, radical 2720 is much "smaller" (i.e. it occupies less space—comparing the bounding boxes of the radicals) than radical 2722. In the rendered images of the glyph for low and middle ppem (2702*b* and 2704*b*), radical 2720 is rendered without any enhancing features, while the rendered image of the radical 2722 has the corner feature 2724 visible even at low ppem and all enhancing features (2726, 2728, and 2730) visible at the middle ppem.

Moreover, even instances of the same radical inside the same glyph (at the same ppem) can be rendered with different levels of detail depending on the pixel space available. For example, glyph **2700*d* contains three instances of the same radical that differ by their horizontal and vertical dimensions, but all three instances of the radical have enhancing features designed to appear identically. However, at low and middle ppem (e.g., in the rendered images 2702*d* and 2704*d*), the upper instance of the radical (2732) and the lower instance of the radical (2734) have different enhancing features visible. Rendered at low ppem, the upper instance does not have enough allocated pixels in the vertical direction to display the enhancing features. (Although the right upper ending can be displayed as one pixel turned ON right next to pixel 2736, a design rule may require the ending to be shown by at least two pixels (such as in radical 2738), or by one vertical pixel (such as 2740), or that the ending is not shown at all). The lower instance of the radical, on the other hand, has enough pixels in the vertical direction to show the lower endings, even at the low ppem. For a middle ppem (rendered image 2704*d*), all instances of the radical have enough pixels in the vertical directions to show the enhancing features or "vertical parts" of the enhancing features. In addition, the upper instance has enough (pixel) space in the horizontal direction such that a "horizontal part" of the upper right ending is visible as one pixel turned ON (2742**), while the lower instance does not have enough pixels in the horizontal direction to turn this corresponding pixel ON.

What actually defines the "most appropriate" description for use in rendering all or a part/component of a glyph (for a given ppem) is the pixel region (e.g., the number and configuration of the pixels) available for rendering this specific glyph and/or part/component thereof. For example, (e.g., in a hierarchical font representation with modifiable objects) the same radical (or stroke) object, at the same ppem, may have different pixel regions available for its rendering when it appears in different glyphs (as an instance), depending on its component context. In such cases, run-time information (e.g., ppem) together with the component context of an object may be used as input information (e.g., in code associated with the font, glyph, radical, stroke, etc.) to influence the choice of the most appropriate description of the object for use in the rendering.

H. Additional Examples and Features of the Invention

Approaches in accordance with at least some examples of the invention may accommodate and include two further ideas that extend from the discussion above (e.g., in code associated with the font, glyph, radical, stroke, stroke portion, etc.):

Systems and methods according to at least some examples of the invention may enable contextual choice of a geometrical description for use in a given rendering based on a pixel region available for rendering of a specific part/component of a glyph, e.g., based on run-time information and local characteristics.

Systems and methods according to at least some examples of the invention may enable the possibility to use different geometrical descriptions for different parts/components of the same object.

Practically, these potential extensions mean that enable rules associated with objects and responsible for choice of the geometrical representation may be used to make a decision as to which geometrical representation to use for a specific rendering based on any appropriate factors, such as based on run-time input and component context.

In many cases, generalized information regarding a glyph's structure (rather than complete geometrical information) may provide fairly good input to and information relating to a decision-making rule. The ability to use generalized information allows making the rules to be more efficient and increases the scope of their applicability. More information regarding the possibility of using general glyph structural information as a means of control is described below.

An extended scheme of design and choice of the (primary) geometrical information useful in systems and methods according to examples of the invention may be described as follows:

(1) For every object that is supposed to have an associated geometrical description, design "simple trajectory," "augmented trajectory," and/or outline-based descriptions for the font object to be used respectively at low, middle, and high ppems.

Any additional geometrical descriptions or any subset of the geometrical descriptions listed above for any specific font object may be provided and/or used in a font representation without departing from the invention.

(2) For every modifiable object (if any) that has an associated geometrical description(s), design conditional rule(s) associated with the object and responsible for modification of the geometrical data.

(3) Design conditional rules associated with objects and responsible for choice of the geometrical description of an object and/or of its components (for composite objects). Those rules preferably will enable a choice of the geometrical descriptions for glyphs and their components that will provide the best possible rendering results under a wide variety of possible rendering conditions.

The rules need not necessarily and explicitly be associated with every object that has a geometrical description, for example, for at least the following reasons:

One or more global, default rules that support commonly used conditional choices can be designed, e.g., for an entire class of objects. In such a case, a specific object may have an explicitly associated rule only if it needs to override the default rule.

For a hierarchical font representation, in at least some example systems and methods of the invention, it may be decided that objects at a definite level of the hierarchy (for example, radicals) will always be responsible for the choice of the geometrical descriptions of all their descendant components (e.g., strokes and/or sub-strokes). In such an arrangement, objects lower in the hierarchy (e.g., strokes and/or sub-strokes) need not have any associated rules responsible for the choice of their geometrical representation. (A specific geometrical representation of such an object is accessed (and an appropriate modification rule is invoked) during execution of a rule associated with a higher level "ancestor" of the object).

(4) At run-time, for every object that has multiple associated geometrical descriptions, one of the descriptions may be chosen based on all appropriate information that is required by the conditional rule responsible for the choice and associated (explicitly or implicitly) with the object or with an "ancestor" of the object.

1. Multiple Geometrical Descriptions Associated with Objects and Conditional Choice of a Description FIG. 28 extends the example illustrated by FIG. 20 according to an extended scheme useful in at least some example systems and methods of the invention. The example of FIG. 28 describes the data associated with radical and stroke objects and compilation of a radical object.

In the same manner as the example described in FIG. 20, radical object 2800 contains six stroke components (one instance of stroke object 2802, one instance of stroke object 2804, and four instances of stroke object 2806).

At design time, attributes for the stroke objects may be defined, e.g., "simple trajectory" geometrical descriptions (shown as thin solid lines 2808, 2810, and 2812), "augmented trajectory" geometrical descriptions (shown as thicker dashed lines 2814, 2816, and 2818), and outline geometrical descriptions (2820, 2822, and 2824) are defined (optionally independent of one another) for every one of the stroke objects in the radical object 2800, and a conditional modification rule (e.g., StrRule0) responsible for modification of the geometrical data is defined for every one of the geometrical descriptions, e.g., based on input data relating to the location of key elements or points of the stroke elements.

In this specific example, the radical objects are assumed to be responsible for the choice of the geometrical descriptions of their stroke components, and a conditional rule e.g., RadRule1, responsible for the choice of a specific description is associated with the radical object. The radical rule RadRule1 makes a decision as to which geometrical description to use for each stroke (e.g., individually or as a group), e.g., based both on run-time information and on specific characteristics of the radical as a component of a particular glyph (component context). For example, RadRule1 associated with radical 2800 can make a decision based on the rectangular pixel region allocated for the radical at the current ppem in the current glyph. (The dimensions of the available region can be computed based on run-time information regarding ppem for the rendering and component information regarding the location and horizontal and vertical extents of the radical in design units). For example, one version of an appropriate rule can decide that all strokes should be instantiated using their outline descriptions for a ppem higher than 30, "augmented trajectory" descriptions for a ppem lower than 30 and if the pixel region allocated for the radical is at least 5 pixels wide and at least 9 pixel high, and "simple trajectory" descriptions otherwise. The radical 2800 also may have attributes and rules associated with it, including but not limited to those described above in conjunction with FIG. 20.

At run-time, during compilation of the radical, rules (e.g., RadRule0 and RadRule1) provide information regarding the chosen geometrical description and regarding the required geometrical modifications (2830) for every one of the radical's strokes. Data of the chosen geometrical description of a stroke is accessed and the modification rule (e.g., StrRule0) is applied. A stroke is instantiated and its resulting geometrical data (2832) is returned to the radical (2800).

2. The Resulting Rendered Image

FIGS. 29A-29D illustrate a choice of geometrical description during the rendering process of two glyphs (2900 and 2902) and the resulting rendered images. Both glyphs are composed from one or more instances of the same radical: glyph 2900 contains one instance (2904), while glyph 2902 contains three instances (2906, 2908, and 2910).

Figure 28:
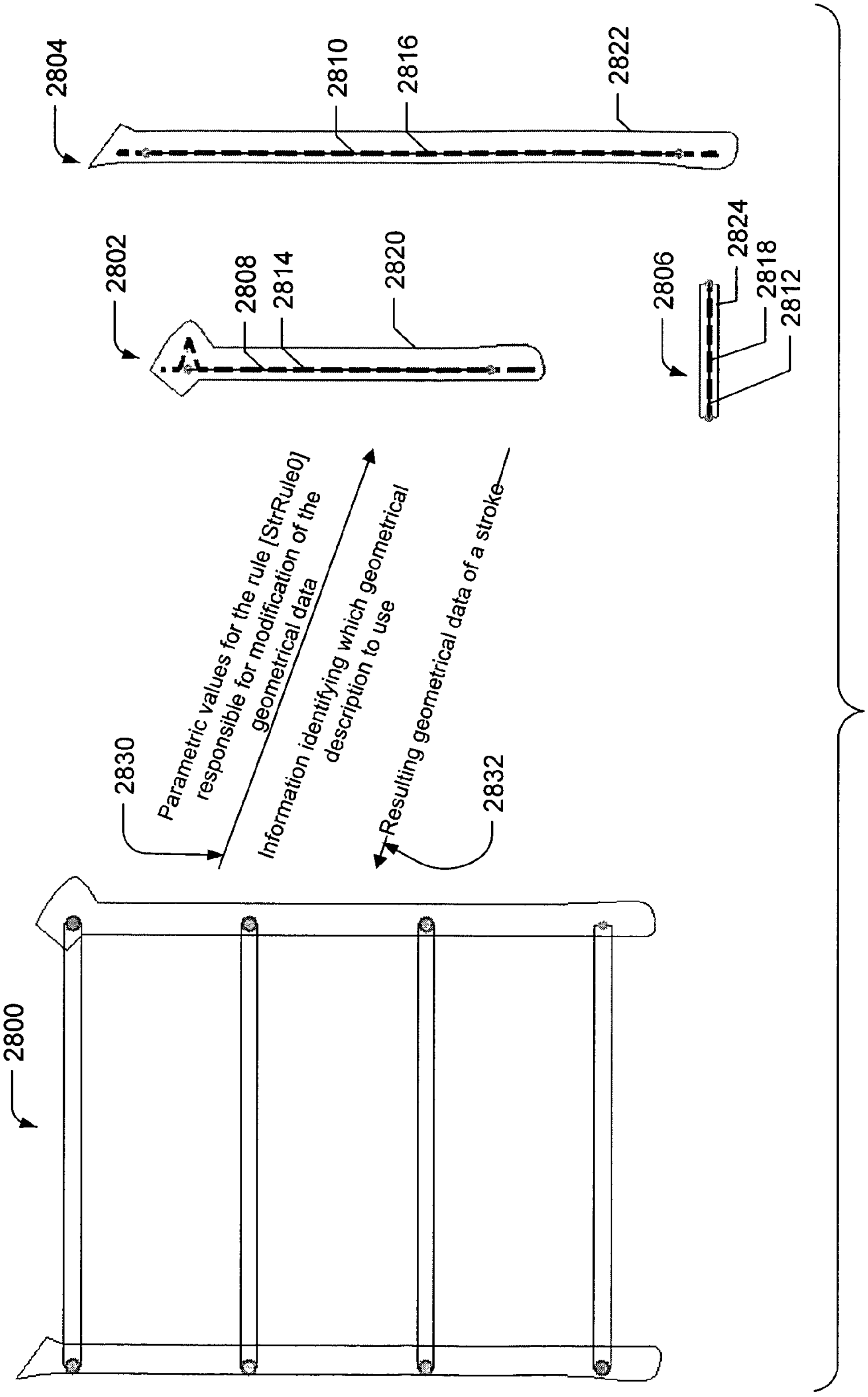
FIG. 28 illustrates examples of multiple geometrical descriptions associated with objects, and conditional choice of a description during compilation.

For the example illustrated in FIGS. 29A through 29D, the radical object has exactly the same composite structure and exactly the same associated rules as the radical described and shown in FIG. 28. Additionally, for this example, each instance of the rendered radical is intended to have an overall consistent appearance with all other instances of the rendered radical.

Figure 29A:
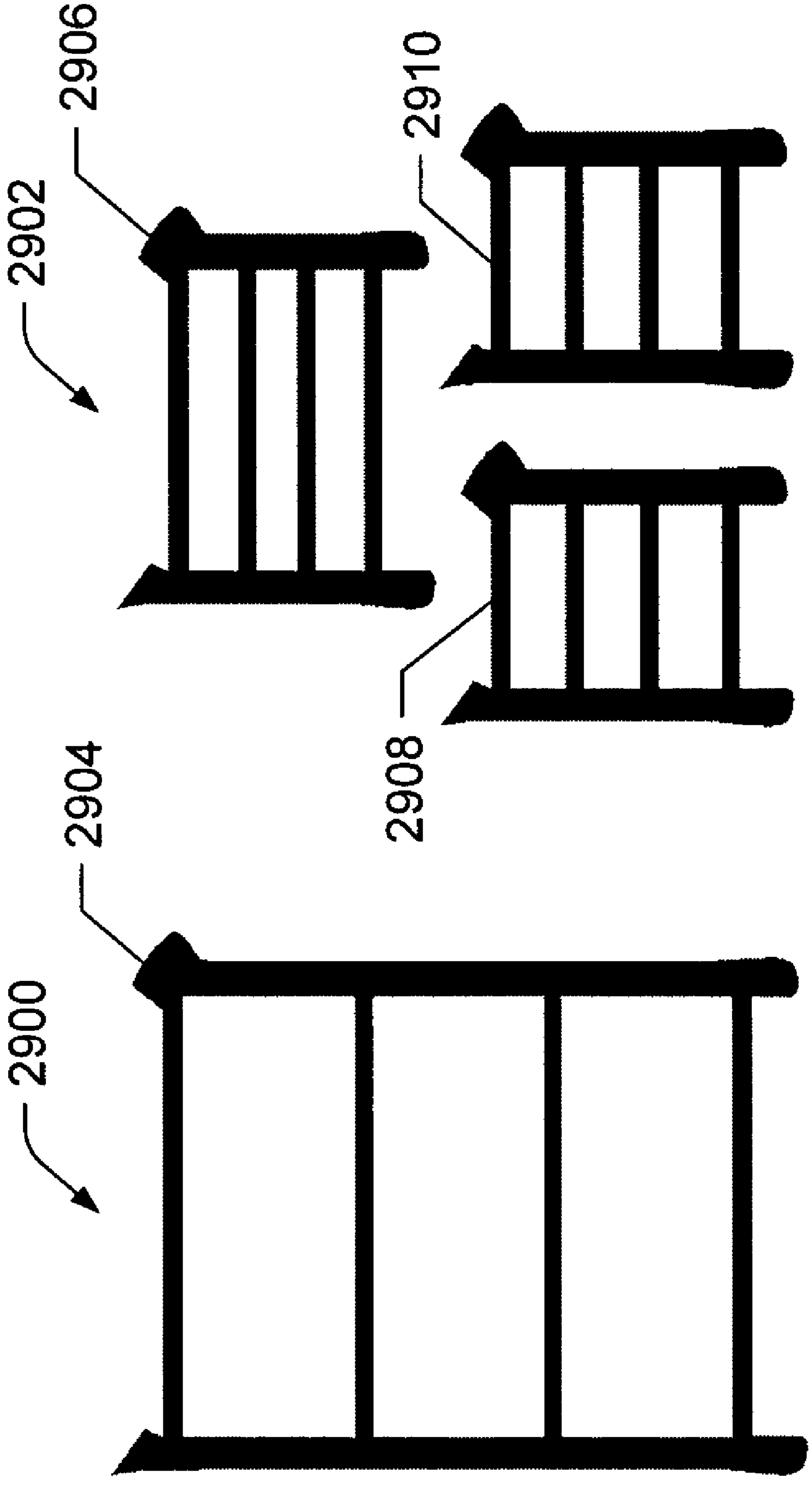
FIGS. 29A through 29D illustrate examples of resulting rendered images generated as a result of conditional choice from various geometrical descriptions.
Figure 29D:
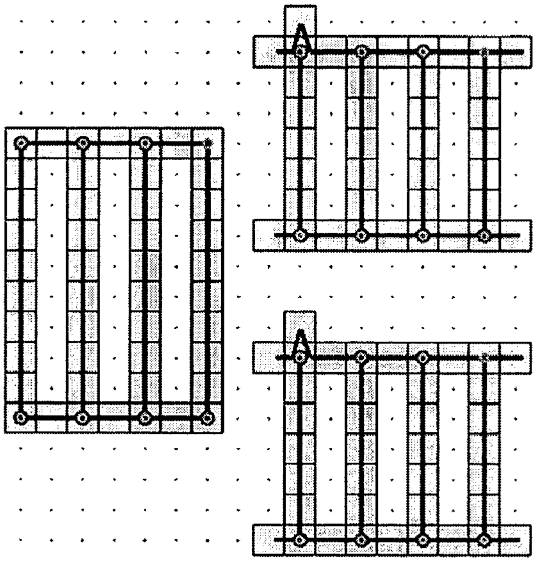
Figure 29C:
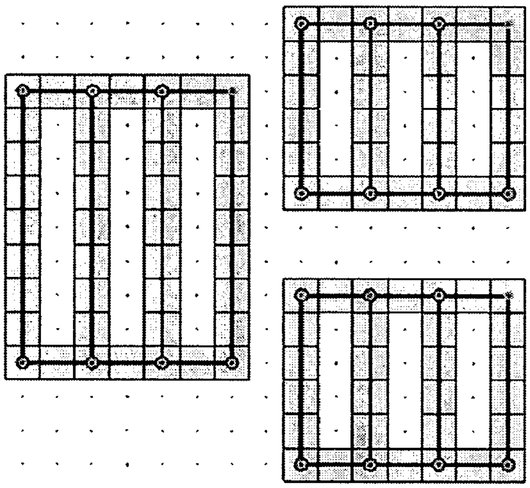
Figure 29B:
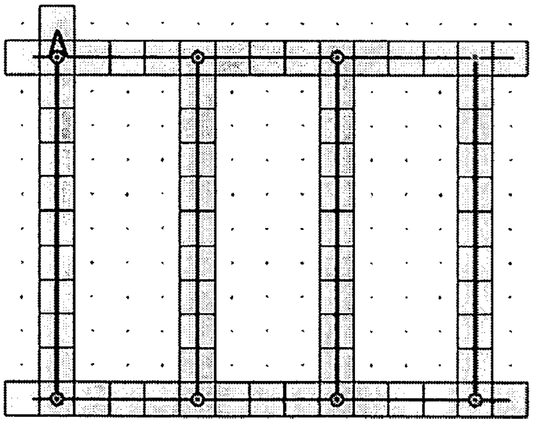

FIG. 29B and FIG. 29C show the glyphs 2900 and 2902, respectively, rendered at the same ppem. As illustrated, the different instances of the radicals receive different pixel regions allocated for their rendering (11×15, 9×7, 6×7, and 6×7 pixel rectangles are available for the instances 2904, 2906, 2908, and 2910, respectively). As a result, the instance of the radical in glyph 2900 is compiled using "augmented trajectory" descriptions of the stroke components (FIG. 29B), while all three instances of the radical in glyph 2902 are compiled using "simple trajectory" descriptions of the stroke components (FIG. 29C). Every one of the glyphs is rendered with an appropriate level of detail for its given available pixel region.

FIG. 29D illustrates glyph 2902 rendered at a ppem higher than the one used in FIG. 29C. In FIG. 29D, different instances of the same radical in the same glyph have different pixel regions allocated to it (10×7, 8×9, and 8×9 for the instances 2906, 2908, and 2910, respectively). Consequently, in FIG. 29D instance 2906 (which does not have enough pixels in the vertical direction to display the enhancing features) is rendered using the "simple trajectory" description, while instances 2908 and 2910 (which have enough pixel space to display all the enhancing features) are rendered using an "augmented trajectory" description. Every one of the glyph's components is rendered with an appropriate level of detail for its available pixel region.

I. A Mathematical Representation of Trajectory-Based Geometrical Descriptions in TrueType-Compatible Format As is generally known in the art, the TrueType/OpenType Specification defines an overall font file format and a number of different types of internal data tables. Each different table is designed to contain a different kind of information (for example: identification, indexing and access mechanisms, geometrical data, control instructions, rendering instructions, etc.).

The TrueType/OpenType Specification defines a number of required mandatory tables and a number of standard "optional" tables. In addition, this Specification is quite flexible, as it permits new tables to be added (without departing from the Specification) so that new features, capabilities, and extensions can be realized. A number of font vendors, equipment manufacturers, and software companies have defined their own TrueType-compatible data tables and data formats to support special, advanced and unique capabilities of their products.

Rendering engines typically and conventionally access the TrueType font tables and data for which they are enabled (including all the mandatory and required tables), and they generally ignore the tables and data they do not recognize.

Additionally, the TrueType Instruction Set (and the True Type Instruction Language capability) can be extended. Each instruction type has a unique "instruction code" (or "operation code") that is recognized and interpreted by the TrueType rendering engine. The TrueType rendering engine can be extended with the ability to recognize new codes and perform the associated mathematical operations and rendering operations.

Conventional font representations and rendering engines may be modified to use trajectory-based descriptions that are based on TrueType compatible mathematical representations. Trajectory-based font object representations may be added to a TrueType font in a number of ways. For example, one way is to add a new font table (for example, a new table called "traj") containing the trajectory data representation for each of the font objects that has a trajectory representation. Access to the individual font object trajectory data could be provided by the same indexing mechanism that is used for the "glyf" data table (for example, via offsets provided in the "cmap" subtables).

A second way to add trajectory-based font object representations to a TrueType font is to extend the "glyf" table itself to include not only the outline representations for font objects, but also to include the trajectory representations for font objects. This approach avoids the need to define a new table.

In either of the above examples (creation of a new table for trajectory representations or extension of an existing table (such as the "glyf" table) to include trajectory representations), the TrueType rendering engine may be modified and extended to be "aware" of the possibility that trajectory data could be present in the font, and the rendering engine may be modified and extended to access the trajectory representation (from the font table in which it is stored) rather than the outline representation or the bitmap representation under certain circumstances. Several different examples of these circumstances are identified and described in various aspects of the present invention.

As a more specific example, the rendering engine may be modified and extended with the capability (e.g., via code and functions) to interpret the stored trajectory representation (in the current display, system, and rendering context) and produce a trajectory-based rendered image of the font object.

Those skilled in this art know and will recognize that in the process of interpreting a trajectory representation, the rendering engine can mathematically "sweep" a selected geometrical pattern (for example a "brush" style pattern as described above) along a mathematical curve described by the trajectory data. This "sweep" operation fills (or turns "ON") the pixels of the rendered image that coincide with the path of the geometrical "brush" shape.

A mathematical representation of a geometrical description is "TrueType-compatible" if it describes curves using the same representation as curves of TrueType outlines. Such representations compatible with TrueType are conventional and known to those skilled in the art. TrueType is an open format, so that tables/data can be added, as generally described above. However, the font format/data itself will not be rendered without a rasterization engine that is able to read the data, interpret and execute the commands (e.g., rules) if the data contain any, and interpret the data itself, transforming it into resulting images by a set of rasterization routines. Therefore, to be used by standard applications, a modification of the TrueType format should be supported by modification of the standard rasterizer (e.g., a rasterizer used for standard Microsoft application programs).

For supporting trajectory data, the following (or similar) changes could be made:

(A) A new table may be added to the TrueType format, with trajectory data corresponding to the (subset or complete set of) characters, or a new additional interpretation of an existing table (for example, the "GLYF" table) may be provided and/or agreed upon. In the latter case, an additional flag may be added to the table to switch between different interpretations.

(B) A new routine may be added to the standard rasterizer (e.g., a rasterizer for standard Microsoft application programs), so that this routine will accept trajectory data and any additional necessary data (for example, brush data if a brush is not a default) and will produce a rasterized final image from such data.

In this manner, support for trajectory data with any mathematical representation can be added to the TrueType font format and rasterizer. However, adding support for trajectories with TrueType-compatible mathematical representations has advantages for the TrueType technology. As mentioned above, when the trajectory data uses TrueType-compatible mathematical representations, many agreed upon conventions regarding file format and existing functionality of a standard rasterizer (e.g., a Microsoft rasterizer) can be reused, therefore providing a quick and safe start for implementation of support of trajectory data. As more detailed examples, some of the reusable elements described above can be utilized as described below:

(A) The possibility for reusing parts of the rendering engine that are responsible for producing the rendered image out of the geometrical description (especially if a font representation combines trajectory-based descriptions and outline-based descriptions, as described above). Indeed, only the highest-level routines may need to be added to the rasterizer. All low-level routines, including file access routines and lower-level geometrical routines, typically can be completely reused. Moreover, for some of the possible implementations of trajectory rendering, an outline (or silhouette) of the region first may be created based on the trajectory description and then rendered using an outline rasterization routine. According to at least some examples of such an implementation, only a subroutine generating the outline (or silhouette) of the region out of trajectory data may need to be added (although some minor adjustments may be required to the existing outline rasterization routine).

(B) The possibility for reusing TrueType instructions (e.g., TrueType hinting language) as a language for the rules related to the trajectory-based descriptions. As is described in more detail elsewhere in this specification, hinting of trajectory data, in at least some instances, may be important for producing high quality rendering results. Currently, the conventional TrueType hinting language supports numerous operations executed on control points of outlines. Because interpretation of trajectories with TrueType-compatible mathematical representations of the control points can remain exactly the same as interpretation of current and conventional representations of outlines, a majority of the hinting instructions available in TrueType can be directly reused. This gives a possibility for providing fast hinting without significant modifications of the file format and/or functionality of a conventional rasterizer.

(C) The possibility for reusing parts of the TrueType font format. A font file format for outlines is well defined and established in the font arts. This same format can be used for trajectories with TrueType-compatible representations. An identification flag may be added in order to distinguish between outline and trajectory representations, e.g., an identification flag responsible for telling whether a contour is closed (for outlines) or open (for trajectories). Using the same format provides an easy opportunity to introduce trajectories into the TrueType font file format (e.g., no additional conventions are required) and supplies the same compaction possibilities (of the font size) that are currently applied to the TrueType outlines.

(D) In addition, a simple adaptation of font development/editing tools can be provided for the tools that currently support the TrueType outline format. These tools can be used for both designing/editing and hinting of the trajectory representations.

IV. Control and Conditional Rules Associated with Components

A. Identification and Parameterization of Modifiable Components and Their Influence on Font Quality As described above, representation of a font in a hierarchical manner using shape-modifiable components naturally fits "structured ideographic" fonts. However, a high quality font is not automatically achieved simply by imposing some hierarchical structure or by specification of some modifications associated with the font objects. Specification of appropriate modification rules associated with font objects may be important both for compactness of the representation and for high-quality of the rendering results. The better a modification rule reflects "natural" behavior of a font entity, the more reusable the font object, which results in fewer components (e.g., fewer objects at hierarchical levels other than at the highest level) and makes the font representation more compact and easier to manage. Additional issues that may be taken into consideration while providing a compact font representation include the ability to specify rules in a uniform manner (so that a uniform font format can be applied and less format-related information needs to be stored) and the ability to specify rules so that they require as few input parameters as possible (in at least some instances, this is important for the rules associated with the radicals as objects that usually require storing parameters in the data associated with the glyph objects). The quality of the rendering results also may directly depend on the modification rules associated with the font objects because the rules actually are responsible for providing the resulting geometrical data during the process of instantiation, i.e., geometrical data that is used as input for a rendering routine that creates a bitmap image when the font object is rendered. Some techniques and methods applicable to specification of the modification rules associated with specific classes of objects are described below.

In most of the examples provided below, a hierarchical font representation with shape-modifiable components and (at least) three levels of hierarchy (e.g., levels of glyph, radical, and stroke objects) are described. Although these examples contribute to simplifying the discussion below, it should be understood by those skilled in the art that these examples do not represent any required limitations on the present invention. Although the following describes approaches and techniques related to specification of modification rules associated with the objects and managing the overall control, the present invention is not so limited to any restrictions regarding a specific structure of the modification rules, order of their invocation, etc. Support by any appropriate kind and number of rules and/or their combinations associated with the objects in any appropriate way (explicitly or implicitly) should not present a limitation for the techniques and the approaches described below. Particular implementation examples are shown below for purely illustrative purposes.

B. Pixel-Hinting and Hierarchical Font Representations with Shape-Modifiable Components Pixel-hinting may be incorporated into a hierarchical font representation without departing from the invention, into both hierarchical font representations with or without shape-modifiable components.

1. Pixel-Hinting Applicable to Hierarchical Font Representations—Technique 1

Pixel-hinting can be supported by rules or routines associated with an object and responsible for modification of the geometrical data of the object. Typically, the rules are associated with the objects that have geometrical descriptions, e.g., with objects at the lowest level of the hierarchy. For shape-modifiable objects, shape and pixel-hinting can be combined in the same rules, if desired.

The following explanation extends an earlier example provided in conjunction with FIG. 28. In the considered example, rules (e.g., StrRule0) are responsible for modification of the geometrical data associated with the stroke objects (e.g., objects 2802, 2804, and 2806) shown in FIG. 28, and these rules require locations of a stroke's key elements as input values in order to specify a shape-modification. The rules may be extended to perform pixel-hinting, for example, by rounding of the input locations to the pixel centers depending on the current run-time input (prior to modifying the primary geometrical data of a stroke). In this case, parts of a trajectory or an outline rigidly attached to the guiding points are mapped consistently to the pixel grid for all occurrences of the given stroke in all glyphs (at the given ppem), and this in particular results in consistent rendering patterns of the enhancing features. In addition, when a stroke is instantiated using an outline-based description, the vertical or horizontal segments that bound the middle parts of the stroke from both sides are mapped consistently at the pixel grid, and this results in consistent widths (in pixels) of the middle part of the strokes in the rendered images. Pixel-hinting of the type described above should not be necessarily limited to the low/middle ppems. For example, pixel-hinting of this type can contribute to regularization of appearance of the repeatable glyph elements at all ppem.

Figure 30A:
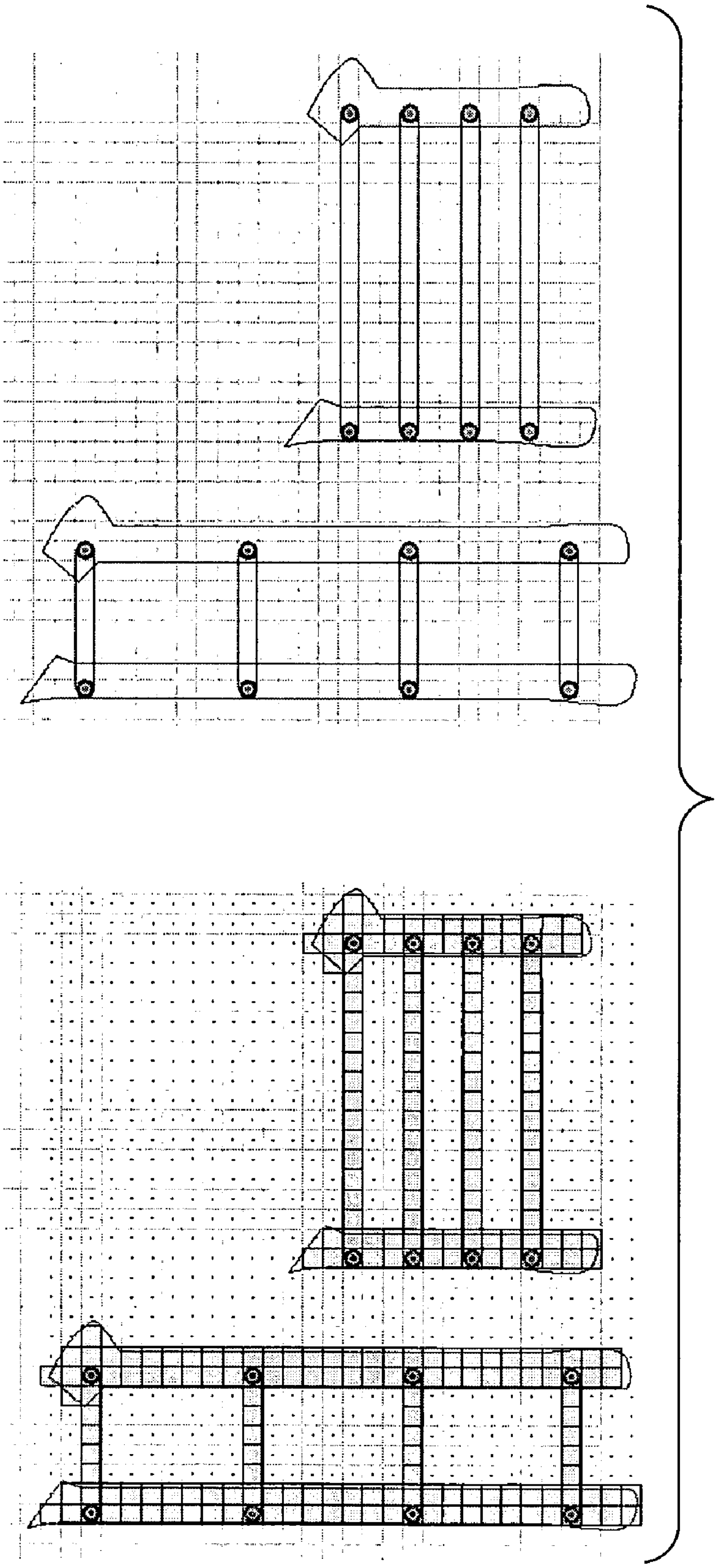
FIGS. 30A and 30B illustrate examples of pixel-hinting applied during compilation of a radical object.

FIG. 30A illustrates application of pixel-hinting according to this technique. Two instances of the same radical objects have consistent rendered images (e.g., consistent appearances of the enhancing features and the stroke widths) due to pixel-hinting as a part of the rules associated with the stroke components of the radical. For every stroke, a rule associated with the stroke object (e.g., StrRule0) receives locations of the stroke's key elements and rounds them to appropriate pixel centers prior to starting modification of the outline data. The rounding is applied independently for every stroke and results in a consistent mapping of the stroke's outline (both the enhancing features and the middle part of the stroke) to the pixel grid.

2. Pixel-Hinting Applicable to Hierarchical Font Representations—Technique 2

Pixel-hinting also can be supported by a rule associated with a composite object and responsible for computation of the parametric values provided to the (shape-modification) rules associated with the components. Those values can be directly adjusted according to run-time information. Application of this technique makes sense when a decision regarding possible improvement of the rendered image quality can be performed based on the common context of the components; a component alone does not have enough information in order to make a decision. For example, any decision that affects relative positioning of the components (including maintaining a specific distance between the components) can be naturally made at the higher hierarchical level object that contains the components. The following example demonstrates this technique applied during compilation of a radical from the stroke components. Another example of this technique is described below and relates to pixel-hinting of the "guiding frames" when a glyph is compiled from its radical components.

Figure 30B:
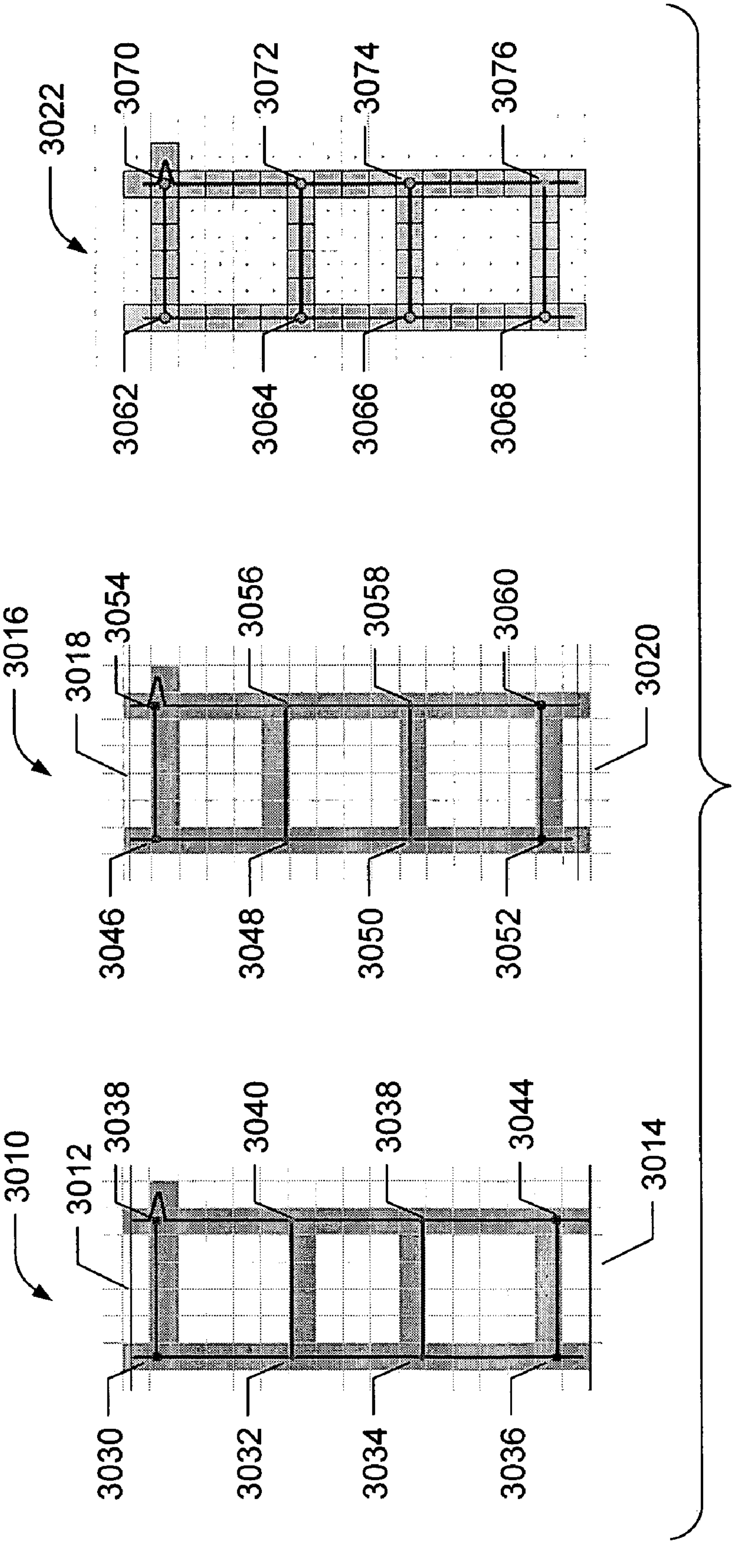

FIG. 30B illustrates application of pixel-hinting for controlling inter-stroke distances during compilation of a radical. In this example, a radical object directly pixel-hints parametric values for the rules associated with its stroke components. Without pixel-hinting, a rule (e.g., RadRule0 as defined in conjunction with FIGS. 20 and 28) will likely compute vertical positions of the horizontal strokes' endpoints (required as an input to the stroke modification rules (e.g., StrRule0)) as follows: given the upper and lower vertical extent of the radical (3012 and 3014 for the radical instances 3010 and 3018 and 3020 for the radical instance 3016), the rule RadRule0 will compute vertical positions of the endpoints for the upper horizontal strokes (3030, 3038 and 3046, 3054 for instances 3010 and 3016, respectively) and the lower horizontal strokes (3036, 3044 and 3052, 3060 for the instances

3010 and 3016, respectively) as constant distance offsets from the upper and lower vertical extents (3012, 3014 and 3018, 3020). The vertical locations of the endpoints for the two middle horizontal strokes (3032, 3040, 3034, 3038 and 3048, 3056, 3050, 3058 for the instances 3010 and 3016, respectively) typically would be computed to be precisely equidistance from the locations of the upper and lower strokes and equidistant from one another.

In this example, for the two pairs of the vertical extents (3012 and 3014 and 3018 and 3020), the vertical locations of the horizontal strokes will be computed, and the rendered results will look like instances 3010 and 3016, respectively. (In this specific case, the rendering results will remain the same independent of whether or not the rules associated with the strokes (e.g., StrRule0) will perform rounding of the endpoints' locations). As is easy to see, those rendered images, which occupy the same total number of pixels in the vertical direction, appear inconsistent in that they differ by the positions of the upper middle horizontal stroke. In some examples or some designs, it might be desirable to achieve more consistent results. However, the consistency depends on the relative positions of the strokes with respect to one another rather than on the appearance of a specific stroke. This means, for example, that a rule associated with the radical (e.g., RadRule0) is the one that should control the inter-stroke distances. This control can be performed, for example, by direct computation of the rounded (pixel-hinted) locations of the endpoints before providing them as the parametric values to the stroke rules. For example, as illustrated in FIG. 30B, a pixel-hinting routine can: (a) compute locations of the endpoints of the upper horizontal strokes (3062, 3070) and the lower horizontal strokes 3068, 3076) rounded to the pixel centers; (b) compute a (whole) number of pixels in the vertical direction between these two strokes; and (c) position the two middle strokes consistently (e.g., provide consistent pixel-hinted parametric values to the stroke rules). For example, it may be decided (and implemented as a rule) that whenever the number of pixels in the vertical direction between the upper and the lower horizontal strokes is one pixel less than would be required in order to position the two middle horizontal strokes equidistantly, then the two middle horizontal strokes will be positioned one pixel closer to one another than to the upper and the lower strokes (as is shown in the instance 3022 in FIG. 30B).

3. Advantages of Pixel-Hinting in Combination with Componentized Font Representations Pixel-hinting of the limited (relatively small) number of components allows significant improvement in the rendering results for the entire glyph set. Having a limited number of components also allows maintenance of consistency of the rules associated with pixel-hinting different components.

Pixel-hinting of shape-modifiable objects may be used, in at least some instances, to provide proper rendering results for different ppem and for all allowed shape-modifications of an object. This may increase the complexity of the pixel-hinting process (for each single shape-modifiable object).

C. Guiding Frames and Their Use to Control Radicals or Other Font Objects

The notion of "guiding frames" is described below. This description shows how a guiding frame-based control can contribute to description of radical behavior in a natural manner, to reusability of radical objects, to uniformity of radical control, and to improvement of the quality of the resulting rendered images. The techniques described below are applicable to fonts that, from a design point of view (not necessarily explicitly supported by the structure of the font representation), contain shape-modifiable radicals as reusable font components. Improved font compaction and performance results may be achieved, in at least some examples, if radical objects (as font components and specific means of control) will be explicitly supported by the format of the font representation and by the rendering engine. However, from a design (and resulting quality) point of view, the guiding frame-based control is independent of the actual font representation and can be supported by a non-explicit componentization into the radical objects, even by existing TrueType font representations using the TrueType hinting language. The guiding frame-based control is independent of the type(s) of the geometrical description(s) (e.g., trajectory-based or outline-based) used in a font representation.

Figure 31A:
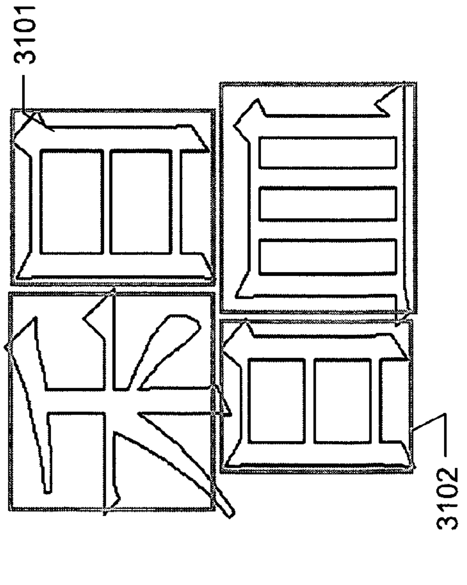
FIGS. 31A through 31F illustrate examples of "natural" radical entities as components of different glyphs and their guiding frames.
Figure 31B:
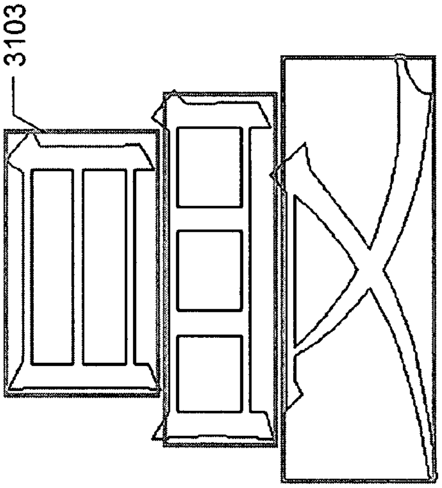

While studying the "natural" behavior (modifications) of radical entities as components of different glyphs, it can be observed that many radicals feature an overall rectangular "aesthetical appearance." For example, FIG. 31A shows a glyph composed from four instances of radicals. Visually, the glyph can be decomposed into four rectangular frames, each one "filled" with a radical, such that all frames together create a balanced appearance of the glyph. FIG. 31B provides another example of a glyph composed from three radicals with their frames creating another balanced pattern of the glyph. A radical typically has a stable, "predictable" behavior with respect to the corresponding frames. For example, frames 3101, 3102, and 3103 (in FIG. 31A and FIG. 31B) correspond to instances of the same radical. The radical behaves "consistently" with respect to the frames, although its behavior clearly is much more complicated than uniform scaling of the whole shape. For example, the relative positions of the strokes in the radical clearly are dependent on the dimensions of the frames, but the strokes maintain their width, and endings maintain their shapes, independent of the size or aspect ratio of a frame.

Figure 31C:
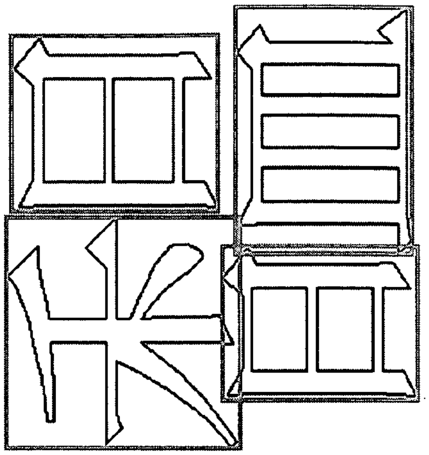

The term "guiding frame" is used in this specification to refer to a conceptual enclosing (or substantially enclosing) region that defines an appearance of a radical and serves as a reference for the radical's geometry. With respect to a font representation, a "guiding frame" is an auxiliary geometrical object that can be used to simplify the design. Neither the guiding frame(s) nor the number of guiding frames is uniquely defined for a radical; their choice depends on a font designer's preferences and typically will be consistent for different radicals and agree with the modification rules associated with the radicals. Although a guiding frame typically will adequately represent the vertical and horizontal dimensions of a radical, the decision as to whether it will completely contain all the features, including the enhancing features, of a radical can be made by an individual designer. For example, FIG. 31C shows the same glyph as in FIG. 31A, but in FIG. 31C, the guiding frames are chosen to be the bounding boxes of the radicals in a precise mathematical meaning of "bounding box" (in FIG. 31A, various end features of certain strokes extend outside the guiding frames).

Figure 31D:
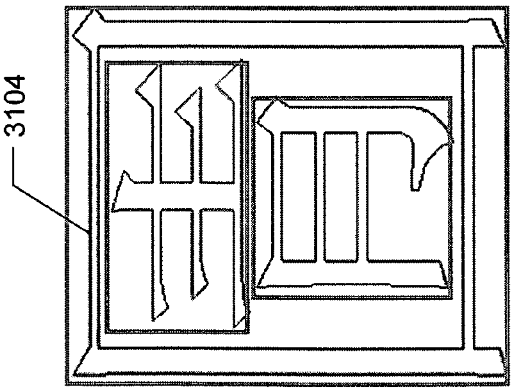
Figure 31E:
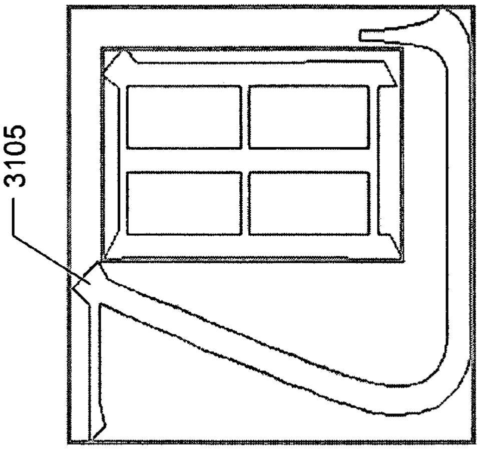
Figure 31F:
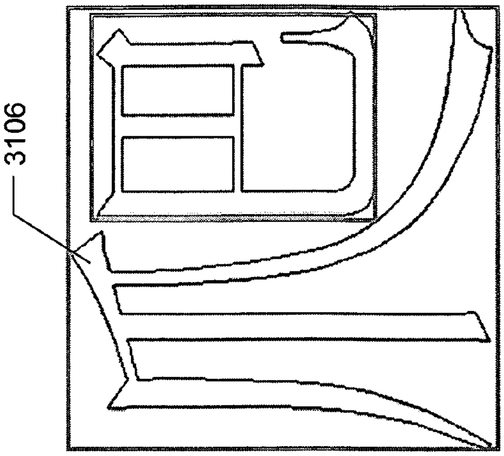

Radicals that participate in the glyphs shown in FIG. 31A and FIG. 31B feature a relatively simple behavior with respect to their guiding frames: they "fill" their frame independently of the presence and configuration of other glyph components. In general, the appearance of a radical can be sensitive to the presence and configuration of other radicals, but in many cases a radical still will "expect" a rectangular appearance of other radicals. A complete set of the guiding frames of radical components of a glyph is referred to as the "arrangement of the guiding frames." A radical component can use a complete set of information regarding the arrangement or only a part of the information (such as an external guiding frame of a radical itself) in order to configure itself in the context of a glyph. For example, the guiding frames of radicals 3104, 3105, and 3106 shown in FIG. 31D, FIG. 31E, and FIG. 31F, respectively, may "surround" (completely or partially) other radicals in the respective glyphs. Therefore, when rendered, these radicals should adjust their configuration, if necessary, such that the "internal" radicals will have enough space.

Figure 32A:
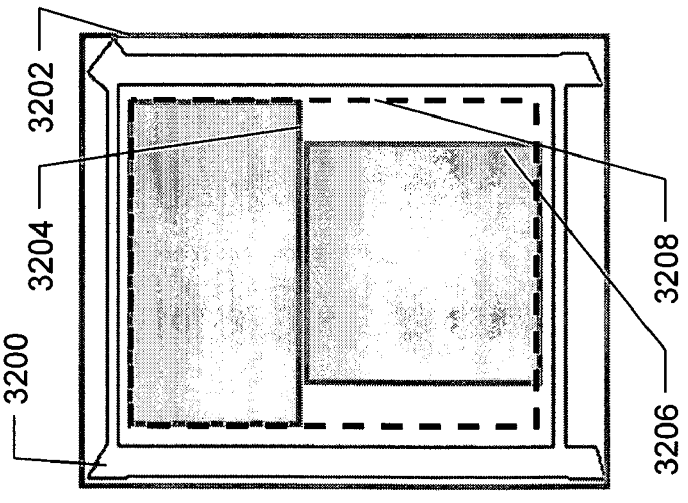
FIGS. 32A through 32C illustrate examples of radicals that may use information regarding guiding frames of other radicals to configure themselves.
Figure 32B:
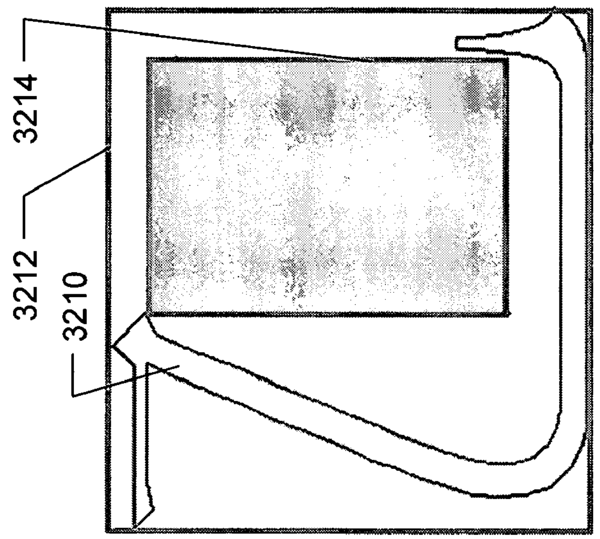
Figure 32C:
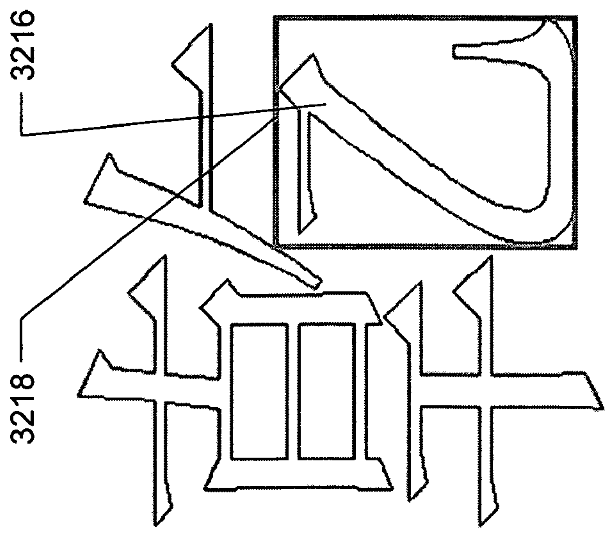

In some instances, more than one guiding frame may be required in order to describe a modification behavior of a radical. In many cases, external guiding frames of the internal radicals will provide enough information for the (external) radical to configure itself. For example, as shown in FIG. 32B, radical 3210 can configure itself based on information regarding its external guiding frame (3212) and the external frame (3214) of an internal radical, independent of the particular appearance of the internal radical that will "fill" the guiding frame 3214. For some radicals, the presence of internal radicals (and their guiding frames) is optional. FIG. 32C shows the same radical (3216) as radical (3210) in FIG. 32B, but in this instance, the radical 3216 appears in the glyph without any internal radicals. In this case, the instance of the radical 3216 will configure itself slightly differently with respect to its own external guiding frame 3218 (as compared to the instance 3210 of the same radical in FIG. 32B). Radical 3200 shown in FIG. 32A may be designed to configure itself based on information regarding its external guiding frame 3202 and external frames (3204 and 3206) of its internal radicals, or based on information regarding a cumulative (bounding) frame 3208 (which can be computed based on the guiding frames 3204 and 3206).

1. Extending Guiding Frames to Control Radical Components

Although a guiding frame-based control as described above may be especially applicable to radical objects (due to the "natural" behavior of radical entities), the same techniques can be applied to controlling the behavior of a radical's components (e.g., strokes and sub-strokes), if appropriate, without departing from the present invention.

a. External Guiding Frames and Bounding Boxes

Although one purpose of the "external" guiding frames is to provide information (e.g., for the radical itself and/or for other radical components of a glyph) regarding the external dimensions of the radical, the present invention is not limited by any requirement that the external guiding frame will necessarily coincide with a bounding box of a radical in precise mathematical meaning. Use of a true mathematical "bounding box" implies that all the geometry of the radical should belong on or within the interior of the bounding box. Bounding boxes in a precise mathematical meaning can be used as a particular kind of guiding frame; however, the term "guiding frame" is intended to accommodate a wider concept. In addition, the term "external guiding frame" is used instead of the term "bounding box" in order to avoid imprecision that can be caused by rounding (or hinting) during mapping of the geometry to the device space even in cases when an external guiding frame actually has the same dimensions and extent as a bounding box in the design space.

b. Additional Aspects of Control Using Guiding Frames

While designing and representing a font, the guiding frames of the radicals may be defined and used as a reference in order to define contextual behavior of a radical component. For example, a radical object's behavior in a font may be described independent of the details of a specific glyph context and still adequately enough in order to reflect the "natural" behavior of the corresponding radical entity. Radicals also may be made or designed independent (e.g., of the detailed characteristics of other radicals in a particular glyph) and in a reusable manner (e.g., to increase the number of glyphs where a radical object will properly reflect behavior of the radical entity).

"Guiding frames" help to describe the general modification behavior of a radical in a font using a minimal amount of information.

For example, guiding frame-based control enables a designer to make the modification rules associated with radicals more general (e.g., requiring less specific input with respect to a case when a rule would require complete information regarding a specific glyph). The use of guiding frame-based controls and rules increases the reusability of a radical and simplifies (e.g., makes more abstract) the information required for the rules associated with the radicals. Guiding frames also can reduce the number of the necessary radical objects (e.g., to help achieve font compactness), can help simplify specification of the modification rules, and can still allow configuring of a radical based on contextual information (e.g., to helping to achieve higher quality). Use of a limited number of radicals also provides a possibility to design the modification behavior of any specific radical more carefully, including the design of modifications such that the design will properly reflect the "natural" behavior of a radical (e.g., to provide quality modifications, as opposed to uniform scaling of a radical, for example) and pixel-hinting for low and middle ppem.

Guiding frame-based control also promotes memory space saving and font compactness by requiring a lower number of parameterization values for the rules associated with a radical (because the parametric values for the rules associated with the radical typically are provided separately for every glyph, the number of parameters required for a specific radical may significantly influence the required storage size). Guiding frame-based control also allows systems and methods in accordance with examples of the invention to encapsulate information and improve performance (e.g., less time necessary for obtaining and/or processing the input information by the radical rules as compared to the situation when a radical must receive complete information regarding a glyph).

For at least some guiding frame-based controls, however, proper representation of some glyphs may require passing more complete information to the rules associated with radicals than that provided by simple guiding frames. Such situations can be handled by rules associated with those glyphs without departing from the present invention (e.g., "exception" rules). In those cases, execution of a "default" rule (e.g., a rule that requires guiding frame(s) information as an input) associated with a radical might provide a basis for additional modifications necessary in order to configure properly an instance of a radical in a specific glyph.

c. Guiding Frames to Control Interactions Between Glyphs and Radicals

Figure 33:
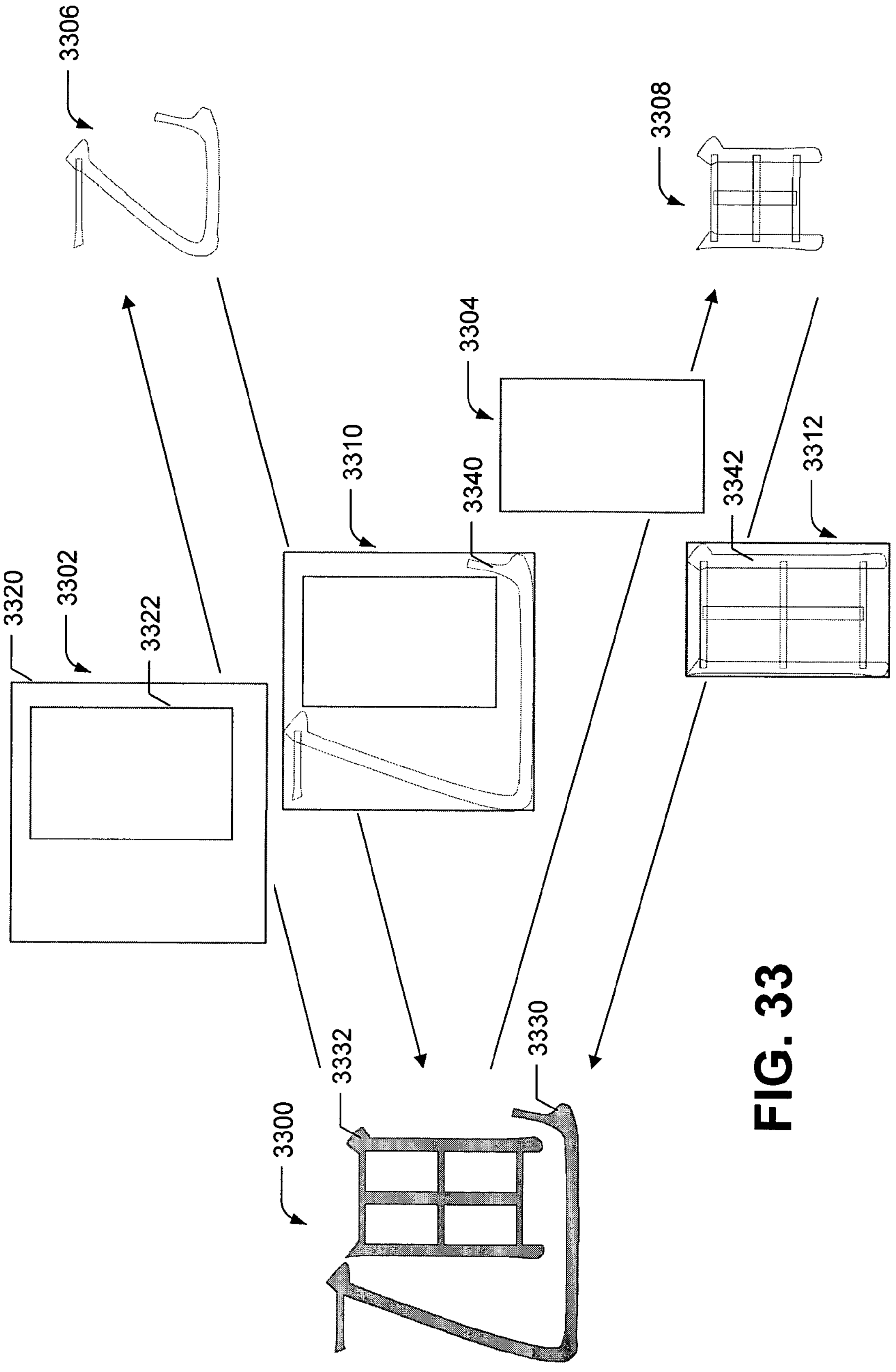
FIG. 33 illustrates an example of guiding frame-based control of interaction between a glyph and its radical components.

FIG. 33 illustrates an example implementation of the interaction between a glyph and its radical components in order to enable guiding frame-based control. The implementation is based on a scheme presented in conjunction with FIG. 20. According to this example implementation, a glyph object has associated information regarding guiding frame(s) for every one of its radical components, e.g., as an attribute. For example, the glyph object 3300 may have associated information regarding two guiding frames (3320 and 3322), which are external guiding frames for its radical components (3330 and 3332) that correspond to the radical objects 3306 and 3308, respectively. The radical objects 3306 and 3308 in this example have associated conditional rules (e.g., RadRule0) that are responsible for instantiation of the radical objects depending on the arrangement of the guiding frames for a given glyph (the rules expect information regarding an arrangement of the guiding frames as their input). At the time of compilation of the glyph 3300, information regarding an arrangement of the guiding frames is provided to every one of the radical components (for example, it might be agreed or a condition that a radical receives its own guiding frame information as the first parameter). A rule associated with a radical object "decides" which guiding frames to use in order to instantiate the object. For example, a rule associated with radical object 3308 may actually use only the information regarding the external guiding frame for the radical itself (3304), while a rule associated with radical object 3310 may use the information regarding the external guiding frame of the radical itself (3320), and it may check whether the arrangement contains a guiding frame of another radical within its own external guiding frame or that intersects its own external guiding frame in a definite manner. For glyph 3300, the guiding frames of both radical components (3320 and 3322) will be used by a rule (e.g., RadRule0) associated with the radical 3310. The conditional rules associated with the radicals will instantiate the radical objects according to the guiding frames information and return the resulting geometrical data of the instances (3340 and 3342) to the glyph object. (More details regarding an example implementation of the rules (e.g., RadRule0) are provided below). In general, the conditional rules (e.g., RadRule0) associated with the radical objects may receive information regarding positions and dimensions of the guiding frames in design or device units, and the rules may include shape-modifications and pixel-hinting routines where the guiding frames serve as the references.

d. Pixel-Hinting Using Guiding Frames

As one example of a possible implementation of radical rules, geometrical data of a radical component may be generated under a rule associated with the radical requiring that the radical receive information regarding the guiding frames and apply all the required geometrical modifications in design units. The final geometrical data in the design units later may be mapped into the device space in order to provide an input for a rasterization routine of the rendering engine. However, especially at low and middle ppem, "automatic" mapping and rounding of the guiding frames and/or of the depending geometrical data to the pixel grid may not provide a good rendering result. Such undesirable effects as overlapping of the radicals and/or lack of inter-radical space may easily take place. For glyphs (especially for relatively dense glyphs), it may be beneficial to adjust the guiding frames of radicals in the glyphs by a rule associated with the glyph object (e.g., a conditional rule (GlyphRule0), which may receive run-time information, such as the rendering ppem before providing the information to the rules associated with the radical components (e.g., to apply a pixel-hinting technique). Pixel-hinting of the guiding frames allows for making a (human) decision (at design time) regarding adjustments of the guiding frames based on the complete information accessible at the level of a glyph, such that it will help improve the overall balance of the resulting rendered image and maintain minimal (and consistent) distances between the radicals in the glyph. In many cases, this simple technique will not require a significant increase in the storage space (e.g., instead of the rules, a glyph can store information sufficient for the adjustments in a definite format (for example, by how many pixels should a guiding frame's position and/or dimensions be modified for a specific ppem) while the adjustments themselves can be supported by a rendering engine) and will allow a significant improvement in the quality of the resulting images. In addition to the benefits listed above, rounding of the guiding frames to the pixel grid before configuring a radical's geometry may provide a way of improving regularity of the rendered patterns corresponding to the enhancing features that are rigidly-attached (e.g., maintained at a constant distance) to one or more sides of the guiding frames. For font representations that feature multiple geometrical descriptions associated with the objects, pixel-hinting and/or rounding of the guiding frames to the pixel grid before passing the parametric values to the rules associated with the radicals provide those rules with more exact information regarding the actual pixel region available for rendering of a radical and contribute to a better choice of an appropriate level of detail to be displayed and of the geometrical description that should be used for the specific rendering.

Figure 34A:
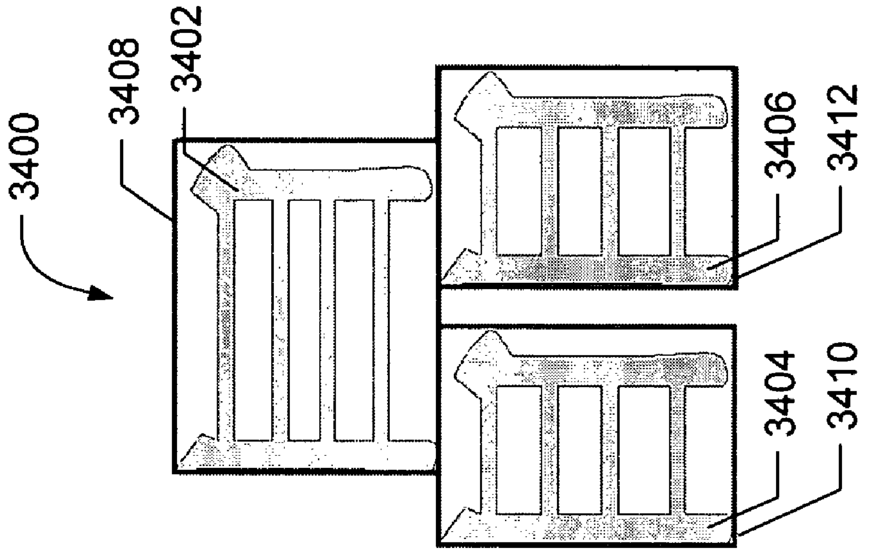
FIGS. 34A through 34D illustrate examples of pixel-hinting using guiding frames.
Figure 34D:
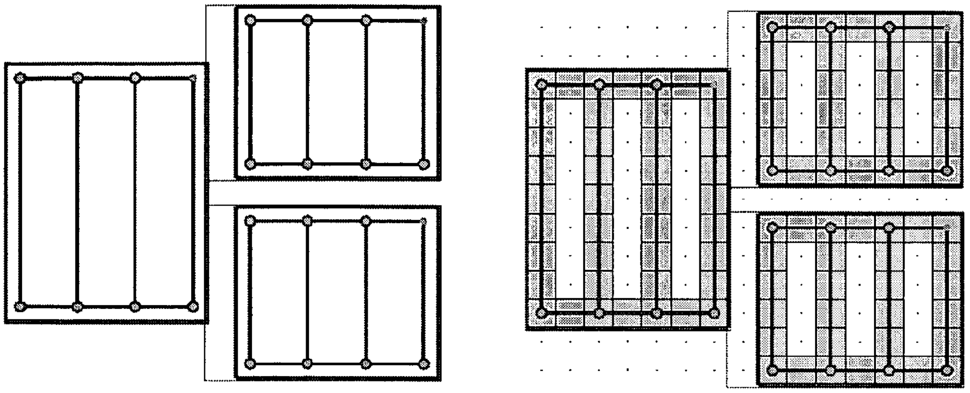
Figure 34C:
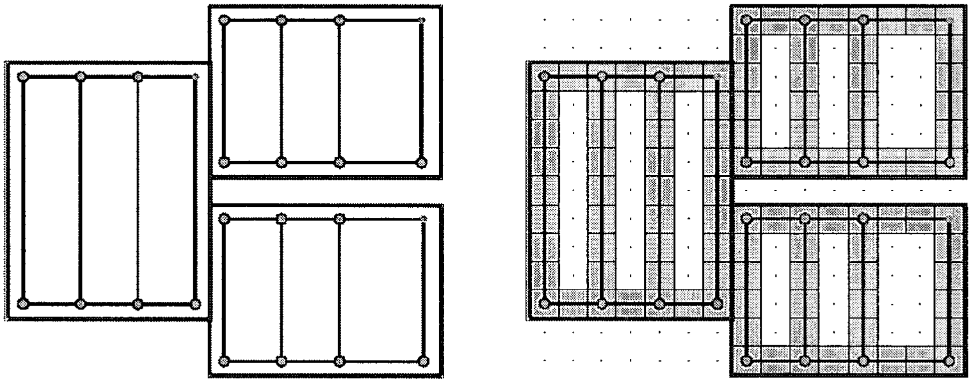
Figure 34B:
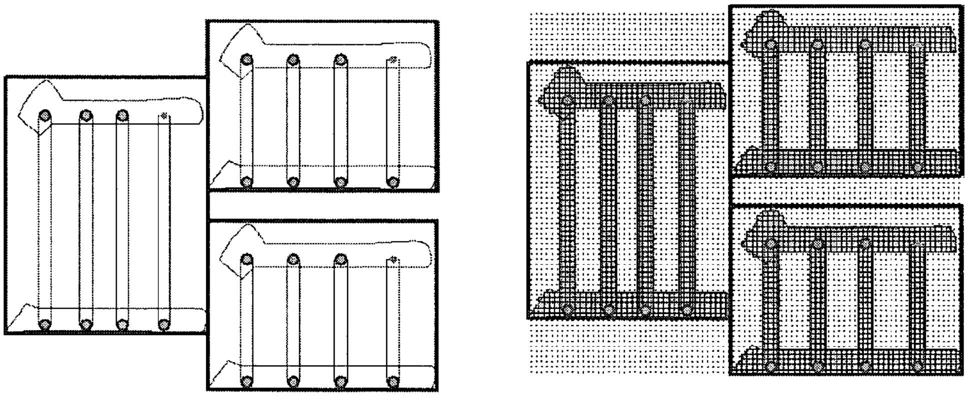

FIGS. 34A-34D provide examples of pixel-hinted guiding frames of various radical components under various rendering conditions in accordance with examples of this invention. In this example, glyph 3400 is composed from three instances of the same radical (3402, 3404, and 3406), and the guiding frame of each radical object (3408, 3410, and 3412) is defined as its bounding box. The glyph 3400 has associated information regarding the guiding frames of the radical components in design units. The arrangement of the guiding frames in design space is shown in FIG. 34A (as guiding frames 3408, 3410, and 3412). This arrangement of the guiding frames allows creation of proper rendering results for high ppems, as shown in FIG. 34B. Although the guiding frames intersect (e.g., the bottom side of the upper guiding frame 3408 intersects the top sides of the lower guiding frames 3410 and 3412), the rendered images of the radicals do not overlap (only the ending features of the radicals touch the guiding frames, which leaves enough inter-radical space in this particular glyph at this ppem level). However, at low and middle ppems, the radicals may not have enough pixels in the vertical direction in order to display the ending features. The radicals still will try to "fill in" their guiding frames, which causes the bottommost horizontal stroke of the upper radical and the topmost horizontal strokes of the lower radicals to touch one another such that no inter-radical space is left, as shown in FIG. 34C. In this situation, it may be beneficial to maintain a one-pixel distance between the radicals, for example, by applying a rule that "moves" the upper edges of the lower guiding frames 3410 and 3412 one pixel down, e.g., by a pixel-hinting routine associated with the glyph 3400 and applied to the lower guiding frames. In this case, during compilation of each lower radical instance, the radical object receives a pixel-hinted guiding frame and configures the radical accordingly. The resulting geometrical data and the rendered image of the glyph are shown in FIG. 34D. Notably, the image is more "clear," legible, and balanced as compared to the rendering without pixel-hinting shown in FIG. 34C.

D. Modification Rules Using Guiding Frames as a Reference

This example implementation relates to modification rules associated with a radical object and the use of guiding frames as a reference. The rules receive information regarding the arrangement of the guiding frames as their input and provide a possibility to specify a modification in the most general manner so that it will reflect the "natural" behavior of the radical entity (for example, different types of modifications can be applied to different parts or components of a radical, as opposed to the commonly-applied uniform scaling of the radical's overall geometry).

In what follows, the term "guiding points" will refer to points (e.g., actual, conceptual, or auxiliary points) that define locations of key elements of an object. For example, the "guiding points" can be associated with endings, corners, and sharp turns of a stroke. As another example, radical 3500 shown in FIG. 35A has eight guiding points (3520, 3522, 3524, 3526, 3528, 3530, 3532, and 3534) that correspond to locations of key elements of its various stroke components.

Figure 35A:
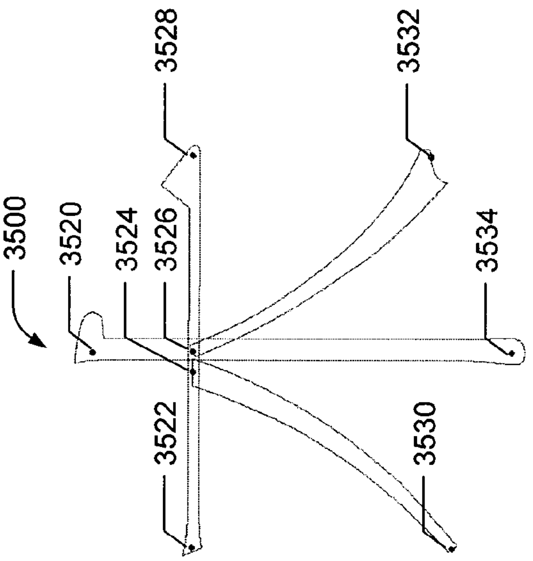
FIGS. 35A through 35F illustrate examples of modification rules associated with a radical and relating to guiding frame-based control.
Figure 35B:
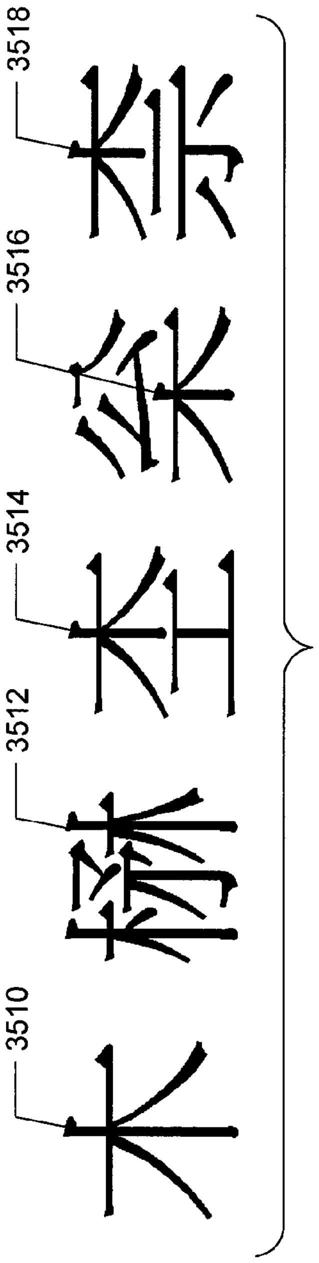
Figure 35F:
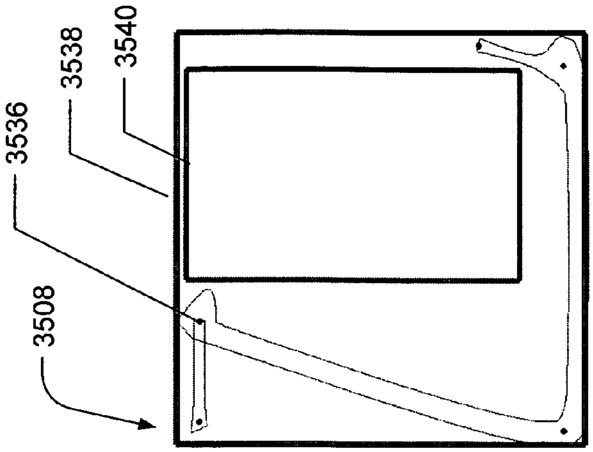
Figure 35D:
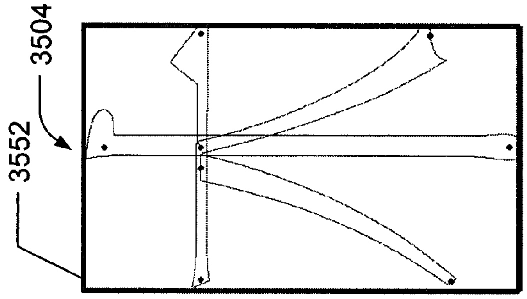
Figure 35E:
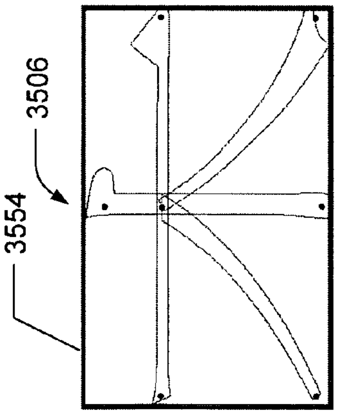

In accordance with some examples of the invention, key elements of a radical (e.g., guiding points of a radical) may be positioned based on information regarding the guiding frame(s) of the radical. For example, every guiding point may be attached to the guiding frame independently, according to a rule that is most appropriate for the specific guiding point. As a more specific example, the simplest common types of attachments include: (a) positioning a guiding point at a constant distance from a specific side of the guiding frame, and (b) keeping a definite (specified) ratio between distances from a guiding point to the opposite sides of a guiding frame. As illustrated in FIG. 35A, guiding point 3520 can be instructed (via a rule or code) to keep a constant distance in the vertical direction from the top side of the guiding frame for the radical (frame 3550 in FIG. 35C) and to keep a constant ratio of distances in the horizontal direction from the left and right sides of the guiding frame 3550. FIG. 35D and FIG. 35E demonstrate corresponding behavior of the guiding point 3520.

Figure 35C:
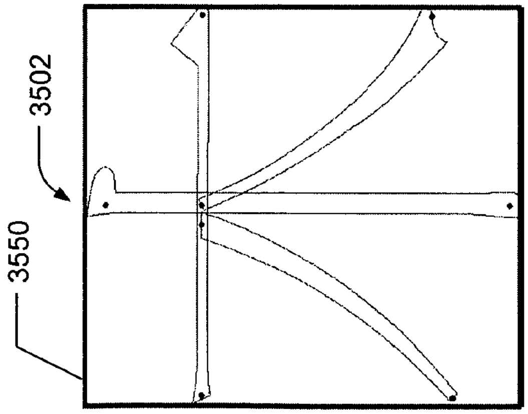

However, simple rules such as those described above are not always sufficient to properly or completely reflect a "natural" appearance of a radical entity in different glyphs. For example, as shown in FIG. 35B, the lower ending of the right inclined stroke of the radical 3500 (corresponding to the guiding point 3532) may be positioned significantly higher than the bottom side of the guiding frame in situations when the radical occupies the whole vertical extend of a glyph (as in instances 3510 and 3512). However, if the radical 3500 appears to be "stacked" vertically with another radical(s), this ending point 3532 typically will be positioned approximately at the same level as the bottom side of the frame (as in instances 3514, 3516, and 3518). In order to incorporate this behavior, guiding point 3532 can be instructed (via rules or code), for example, to keep a constant ratio of distances in the vertical direction from the bottom and top sides of the guiding frame or to keep a constant distance in the vertical direction from the bottom side of the guiding frame, depending, for example, on the aspect ratio of the guiding frame (as shown in FIG. 35C, FIG. 35D, and FIG. 35E).

A rule for positioning the guiding points of a radical or other font object also may use information regarding more than one guiding frame. For example, in the radical shown in FIG. 35F, the guiding point 3536 can be instructed to keep a constant distance in the horizontal direction from the left side of the guiding frame 3540 (if such frame is present), and to keep a constant distance from the right side of the external guiding frame 3538 otherwise, while all other guiding points of the radical 3508 can be "attached" to or associated with the external guiding frame 3538 in some manner.

Rules responsible for positioning guiding points also can incorporate pixel-hinting routines.

In at least some examples, a radical will have associated geometrical description(s), and in such cases, rules associated with the radical may be responsible for modification/positioning of the geometrical data depending on positions of the guiding points. If a radical further is decomposed into modifiable stroke components, then a rule associated with the radical may be used to compute positions of the guiding points (based on the guiding frame(s) information) and pass them as input to the rules associated with the stroke components, which then may be responsible for modification/positioning of the geometrical data. These examples should not be construed as imposing any limitations on the applicability of the present invention.

E. Enabling/Disabling Enhancing Features

In accordance with at least some aspects of this invention, enhancing features of objects (e.g., reusable font objects, such as ending features, serifs, and the like) may be selectively enabled or disabled, e.g., based on information regarding the pixel region available for rendering the object and/or the pixel region configuration.

Various examples and features of the invention can be applied to any font that contains reusable objects and supports visualization of the enhancing features. Examples of aspects of the invention are independent of a particular hierarchical structure. For example, radicals can have associated geometrical data or radicals can be componentized into strokes that contain the geometrical data. Enhancing features can exist as independent font objects or their visualization can be supported by geometrical data associated with stroke or radical objects. (Depending on a particular hierarchical structure, the inclusion of enhancing features may be supported in any desired manner, such as through shape-modification, by compilation rules, etc.). The approachability to enable/disable enhancing features is independent of the type of geometrical description (e.g., trajectory-based or outline-based) and is independent of the presence of multiple geometrical descriptions associated with the same object. However, for font representations that contain both trajectory-based geometrical descriptions (e.g., for low and middle ppems) and outline-based geometrical descriptions (e.g., for high ppem), the selective enablement/disablement is mainly applicable at ppems where the trajectory-based description is used (at high ppems where outline-based descriptions are used, the outline data typically will already have the enhancing features incorporated into the outline description of the font object).

Complete or partial disabling/enabling of the enhancing features may improve the quality of the rendering results especially at low and middle ppem, while still producing rendering images with appropriate level of details over a wide range of ppem.

As described above, it may be beneficial to display the same reusable font object with different levels of detail depending on the pixel region available for rendering the object. For example, the same radical in the same glyph may be displayed with enabled and/or disabled enhancing features depending on the ppem, and/or different instances of the same radical may be displayed with different levels of detail when they appear as components of different glyphs at the same ppem. Different enhancing features of the same object may be selectively enabled and/or disabled completely independently, or this action may follow some other universal rules designed for the font. For example, for a radical object, a rule may disable all enhancing features of one instance of a radical such that eliminating their visualization will result in increasing the vertical extent for other instances of the radical in the same glyph, and thereby facilitate enablement of all the enhancing features of the other instances of the radical.

Figure 36A:
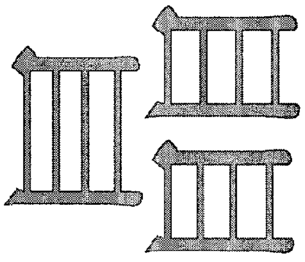
FIGS. 36A through 36H illustrate examples of complete/partial enabling/disabling of enhancing features.

FIGS. 36A-36H illustrate examples of enabling/disabling of stroke and/or radical enhancing features. The glyph shown in FIG. 36A is composed of three instances of the same radical object. The radical object has an associated rule that turns on/off visualization of the enhancing features depending, for example, on the pixel space available for the rendering. In this specific example, the radical is composed from the stroke components that have associated trajectory-based geometrical descriptions. The radical "decides" which enhancing features should be enabled/disabled depending on the pixel region available for rendering of the radical and passes the "turn on/off" flag as an input parameter to the rules associated with the stroke components. Enabling/disabling of the enhancing features is supported by rules associated with the stroke objects, and these functions are implemented as a modification of the geometrical data of a stroke.

Figure 36B:
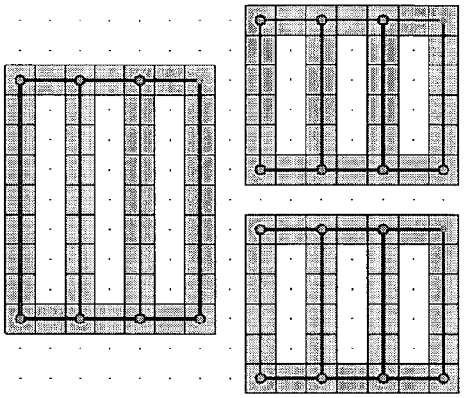
Figure 36C:
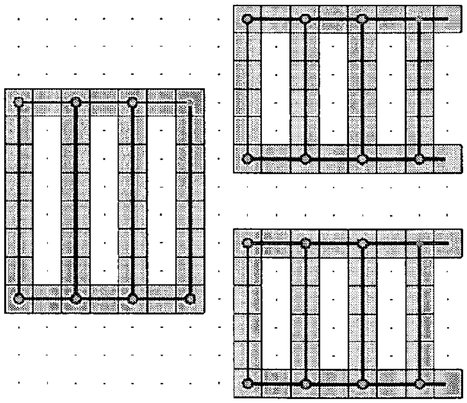
Figure 36D:
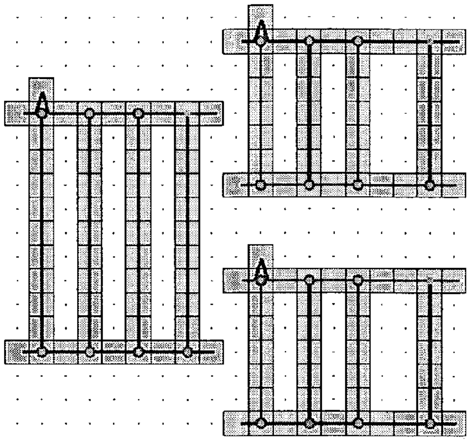

FIGS. 36B, 36C, and 36D show geometrical data (e.g., swept trajectories) and the resulting rendered image of the glyph for various different ppem. In FIG. 36B, none of the three radical components has enough pixels available in the vertical direction to display the enhancing features; therefore, all enhancing features are disabled in this example. For a slightly higher ppem (e.g., as in FIG. 36C), the upper instance of the radical still does not have enough space to display the enhancing features, but the lower instances of the radical have one pixel available in the vertical direction for rendering enhancing features. Therefore, for the lower instances of the radical in this example, the lower enhanced ending features are enabled and the upper ending/corner features remain disabled.

Figure 36E:
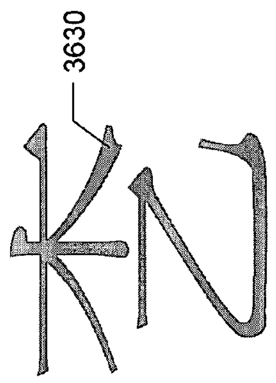
Figure 36F:
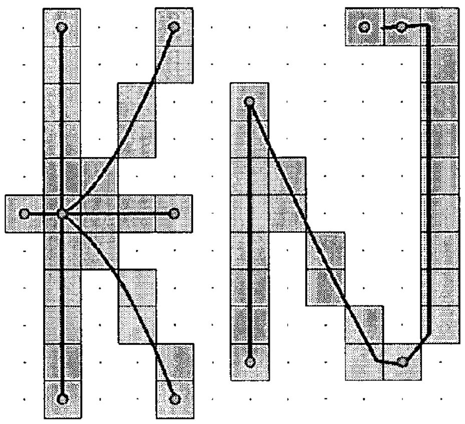
Figure 36G:
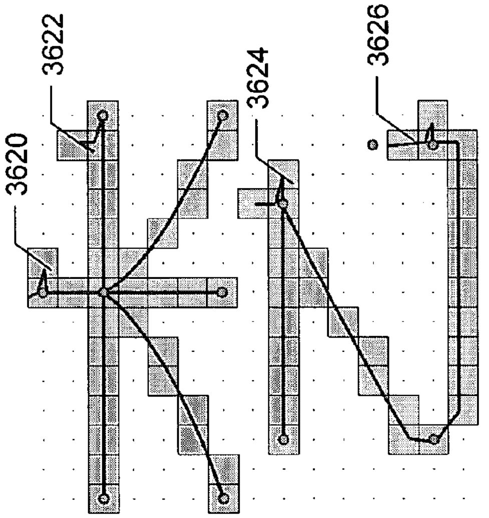
Figure 36H:
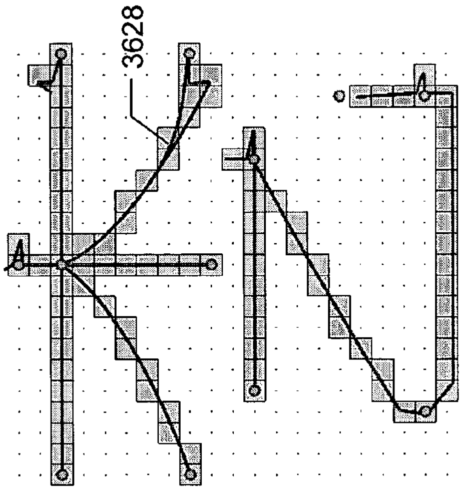

Different kinds of enabling/disabling of enhancing features for the upper and lower instances of a radical may be supported by the same rule associated with the radical executed under different conditions (e.g., where different pixel regions are available). For even higher ppem (e.g., as in FIG. 36D), all instances of the radical have enough pixel space available to display all the enhancing features, and therefore all the enhancing features are enabled. FIGS. 36F, 36G, and 36H illustrate additional examples of enabling/disabling of enhancing features. The glyph shown in FIG. 36E is composed from instances of two different radical objects. For a low ppem (e.g., as in FIG. 36F), all enhancing features of both radicals are disabled. For a higher ppem (e.g., as in FIG. 36G), all enhancing features of the lower radical instances (3624 and 3626) and almost all enhancing features of the upper radical (3620 and 3622) are enabled, but there still is insufficient pixel space for visualization of the ending feature 3630. This ending feature 3630 becomes enabled at a still higher ppem (e.g., as shown in FIG. 36H, ending feature 3628).

F. Stroke Reduction

In at least some examples of the invention, font quality may be improved by reducing the number of or eliminating certain strokes from a rendered object, based, for example, on the pixel region available for the rendering and/or the available pixel region configuration. This approach may be applied to any desired font representation, for example, to "structured ideographic" fonts and other fonts that contain radical objects as reusable components. Applicability of this approach is independent of any particular hierarchical structure of a representation and of the type of geometrical description(s) used for the modifiable objects. Applicability of the approach also is independent of whether or not componentization (into radical components) is explicitly supported by the format of the font representation.

Figure 37A:
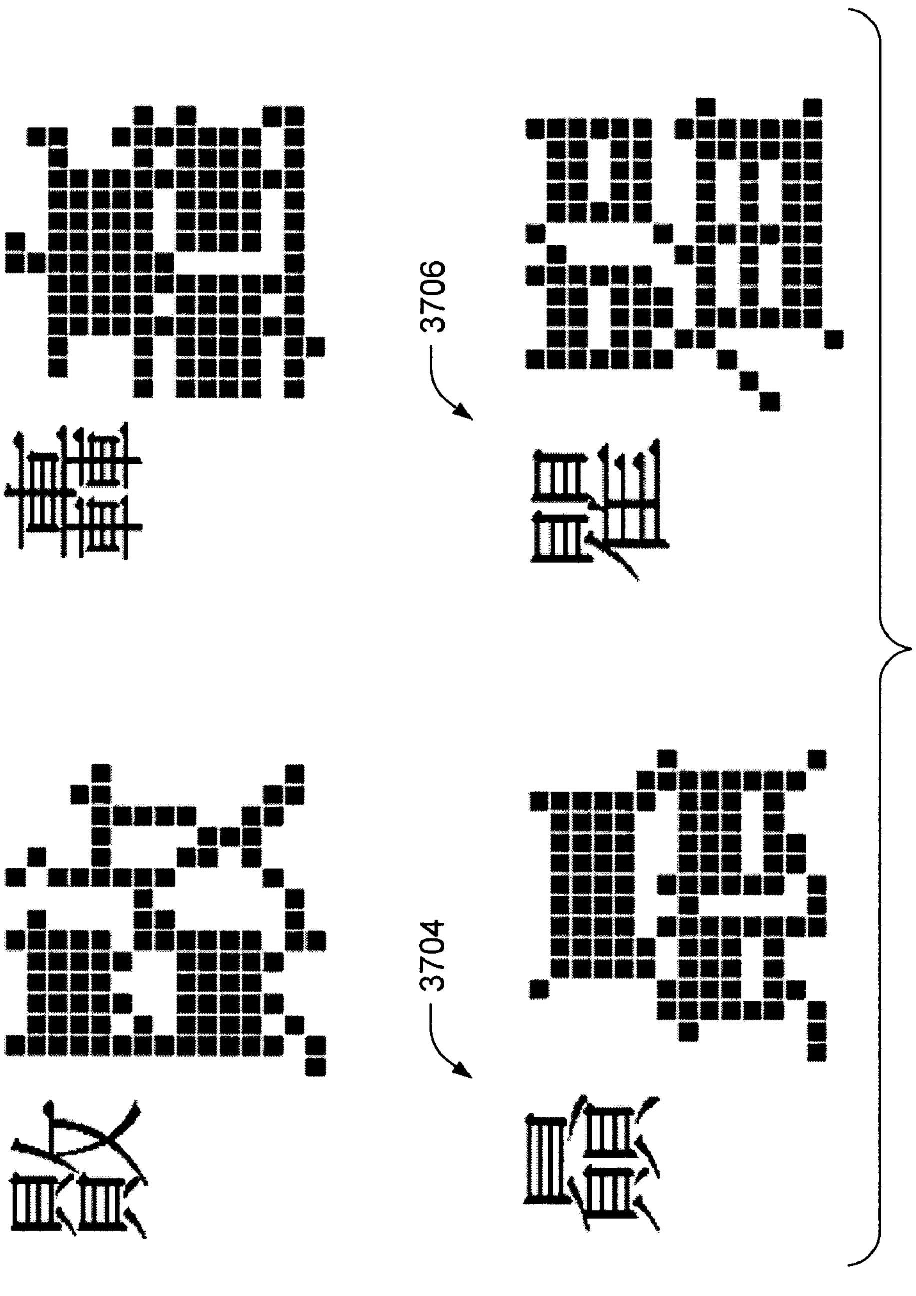
FIGS. 37A and 37B illustrate examples of stroke reduction for a radical object.

A radical component of a glyph does not always have enough pixel space available to provide a legible rendered image. FIG. 37A illustrates rendering results for several glyphs 3700-3706 (designed to look as they are shown in the smaller pictures) at middle ppem. It is a common situation (especially at low and middle ppems) that a radical component will have less pixels available in the vertical direction than it needs in order to display all the horizontal strokes, and therefore, the rendered image of the radical will not be able to maintain a minimal distance of at least one pixel between adjacent strokes. In this situation, rendering of a full representation of a glyph (or a radical) will unavoidably result in a non-legible image. The rendered image typically will have a very unbalanced, uneven appearance, and radicals frequently will be displayed as unrecognizable blobs and splotches of turned-ON pixels.

In this situation, in accordance with at least some examples of the invention, a "simplified" form (or several forms) of a radical can be specified as a "substitute" by the font designer in order to produce repeatable, legible rendered images. Simplification of a radical's shape typically involves stroke reduction (i.e., removal of one or more strokes from the rendered image) and/or (optionally) repositioning of the remaining strokes. Stroke reduction is not generally an arbitrary matter. Proper stroke reduction for many East Asian character/glyphs have been defined by several governmental standards bodies in East Asian countries, and standards have been established that define not only which strokes can (and should) be removed (or reshaped), but also the proper order of stroke removal (e.g., as fewer and fewer pixels are available at diminishing text sizes and lowered resolutions). The term "stroke reduction" is used generally in this specification for all or part of a process of simplification of a radical's shape that may involve removal of one or more strokes and/or may involve another "global" modification to the radical's shape. (In existing font technologies, stroke reduction is supported by manual design of static bitmaps for every glyph (i.e. separately for every appearance of a radical in every glyph) and for every ppem, or by storing "glyph alternatives" for each and every different case and having explicit knowledge of these "glyph alternatives" reside in the rendering software).

In accordance with at least one aspect of the present invention, simplification of a radical's shape (e.g., "stroke reduction") may be performed by (reusable) rules associated with (reusable) radical objects. This allows significant quality improvement in the resulting rendered images (when compared to rendering the complete versions of the radicals), significant reduction in the required design effort (when compared to using pre-stored bitmaps), and increased consistency of the rendered images.

Figure 37B:
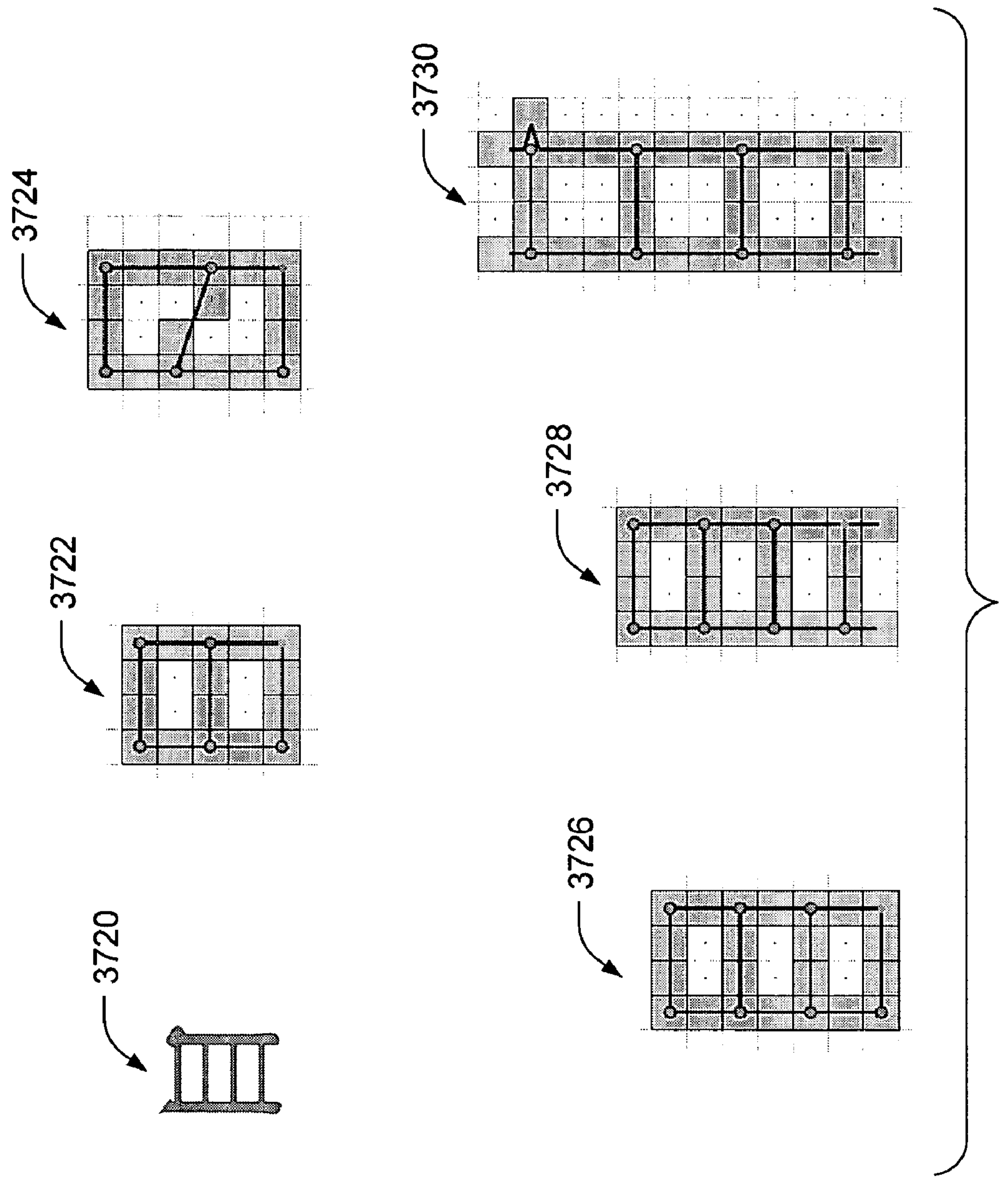

For example, radical 3720 (shown in FIG. 37B) may be instructed (by an associated conditional rule) to have different appearances (also shown in FIG. 37B) depending on the pixel region available for rendering the radical 3720. Under this example rule, if the number of pixels available for the radical 3720 in the vertical direction is less than seven, stroke reduction will be performed. Instances 3722 and 3724 illustrate application of a possible stroke reduction rule when five and six pixels, respectively, in the vertical direction are available for rendering the radical 3720. In this particular implementation, the radical 3720 is a composite object, composed from two vertical stroke instances and four instances of a horizontal stroke. The stroke reduction is supported by a compilation rule associated with the radical (e.g., a rule mandating use of three instead of four instances of the horizontal stroke when less than seven pixels are available in the vertical direction) and by a rule that is responsible for computation of positions for the "guiding points" of the stroke components (used as input parametric values for the conditional rules associated with the strokes). If a radical has enough pixels in the vertical direction to render all the horizontal strokes, then the middle strokes are positioned approximately at ⅓ distance from the upper and lower strokes. In situations when stroke reduction is required, the middle stroke will be positioned approximately at ½ the distance (or perhaps by design not horizontally at all, as in the instance 3724). This implies that the rule for computation of the vertical position for the left and right ends of the middle stroke(s) should handle this situation separately.

Although the above proposed approach for stroke reduction may be naturally applied to font representations that describe radicals as composite objects, the applicability of this approach actually is independent of whether the radicals are represented as composites or simple objects. For example, for font representations that contain radicals as the lowest-level components with associated primary geometrical data, stroke reduction can be supported by rules responsible for modification of the geometrical data of the radicals rather than by rules responsible for compilation. That is, the geometrical data associated with a radical can be “artificially” deformed to eliminate a stroke.

The appearance of stroke reduction also can be accomplished in other ways. For example, in some cases, stroke reduction can be accomplished by application of a shape modification rule associated with stroke components of a radical such that one or more strokes are positioned to the same location under certain contextual conditions.

Figure 38A:
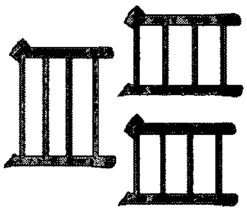
FIGS. 38A through 38H illustrate examples of geometrical data and rendered images for a compilation involving stroke reduction for various radical components in a glyph.
Figure 38B:
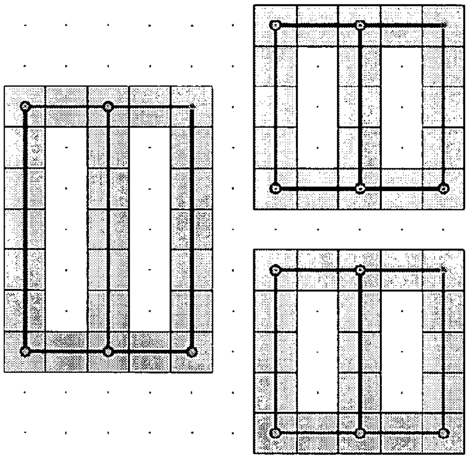
Figure 38C:
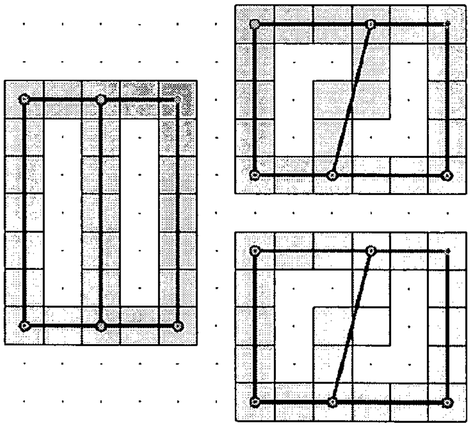
Figure 38D:
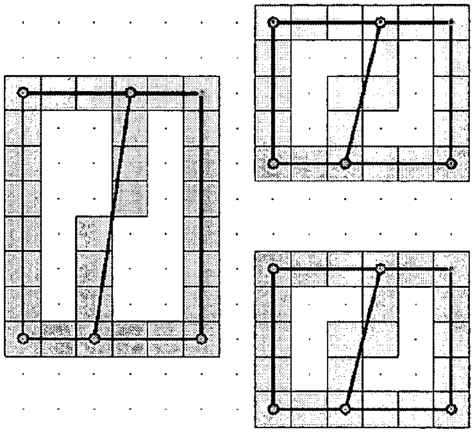
Figure 38F:
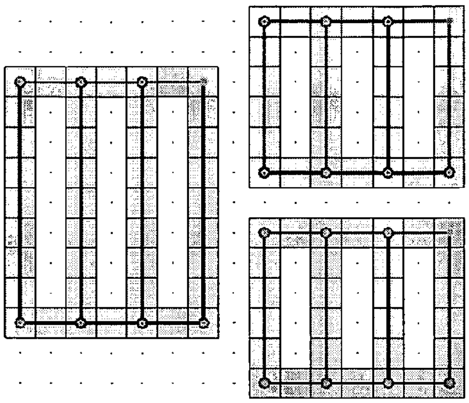
Figure 38H:
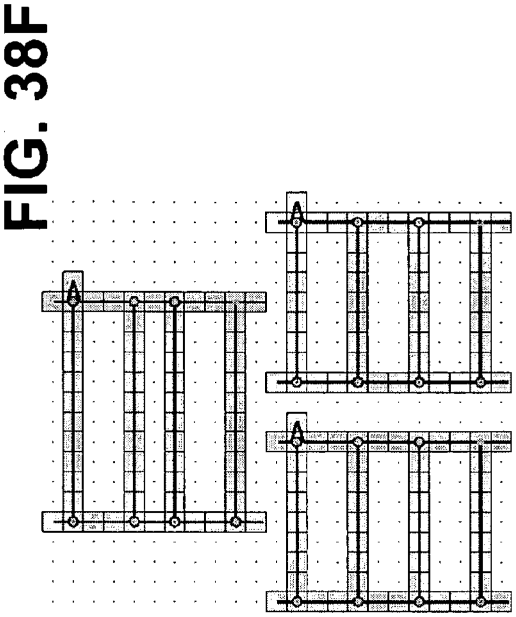
Figure 38E:
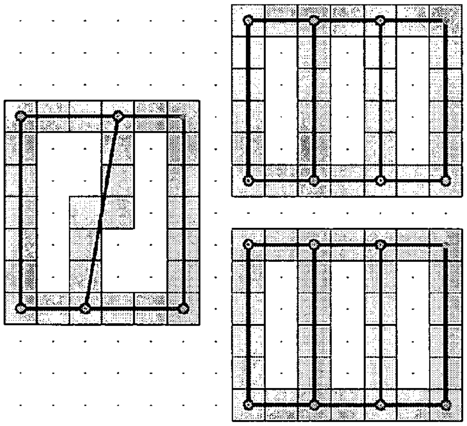
Figure 38G:
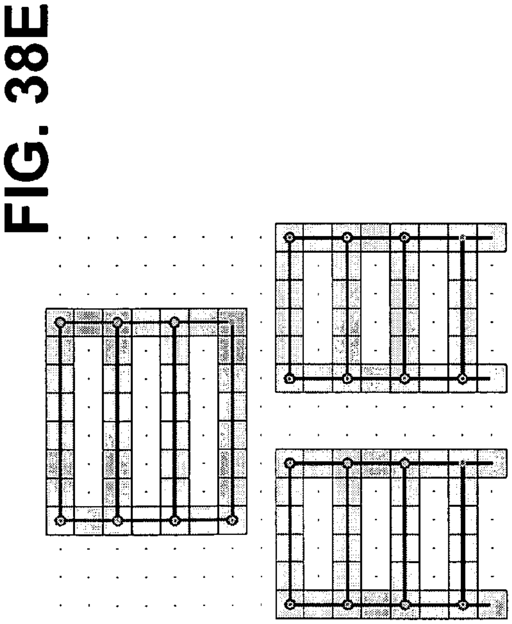

FIGS. 38B-38H illustrate examples of rendered images of the glyph shown in FIG. 38A for different ppem in accordance with at least some examples of this invention. The glyph is composed from three instances of the same radical object (as described in conjunction with FIG. 37B). Stroke reduction is applied to all instances at the ppems shown in FIGS. 38B, 38C, and 38D and to the upper instance at the ppem shown in the FIG. 38E. Although different kinds of stroke reduction are applied to the upper and lower instances of the radical in FIG. 38C, in this example, the stroke reduction is executed by the same conditional rule associated with the same reusable radical object (but applied under the different conditions for rendering the individual radicals). The same remains true for every ppem in this example. In particular, for the ppem shown in FIG. 38E, the conditional rule applies stroke reduction for the upper instance of the radical only. Therefore, stroke reduction rules can be applied to individual radicals, on a radical-by-radical basis, even within a single glyph. Application of stroke reduction results in high quality rendered images of the glyph for the complete range of low/middle ppems.

G. Stroke Substitution

In accordance with at least some examples of this invention, one stroke or stroke ending may be substituted for another stroke or stroke ending in a rendered glyph or radical (or other font object), for example, depending on glyph specific information relating to the font object (e.g., based on contextual positional information relating to a radical in a glyph). This approach can be applied to any font representation without departing from the invention (e.g., “structured ideographic” fonts and fonts that contain radical objects as reusable components). Applicability of this approach is independent of the particular hierarchical structure of a font object representation and/or of the type of geometrical description(s) used for the modifiable objects (e.g., trajectories, outlines, etc.) Applicability of the stroke substitution approach in accordance with examples of the invention also is independent of whether or not componentization into the radical components is explicitly supported by the format of the font representation.

Figure 39A:
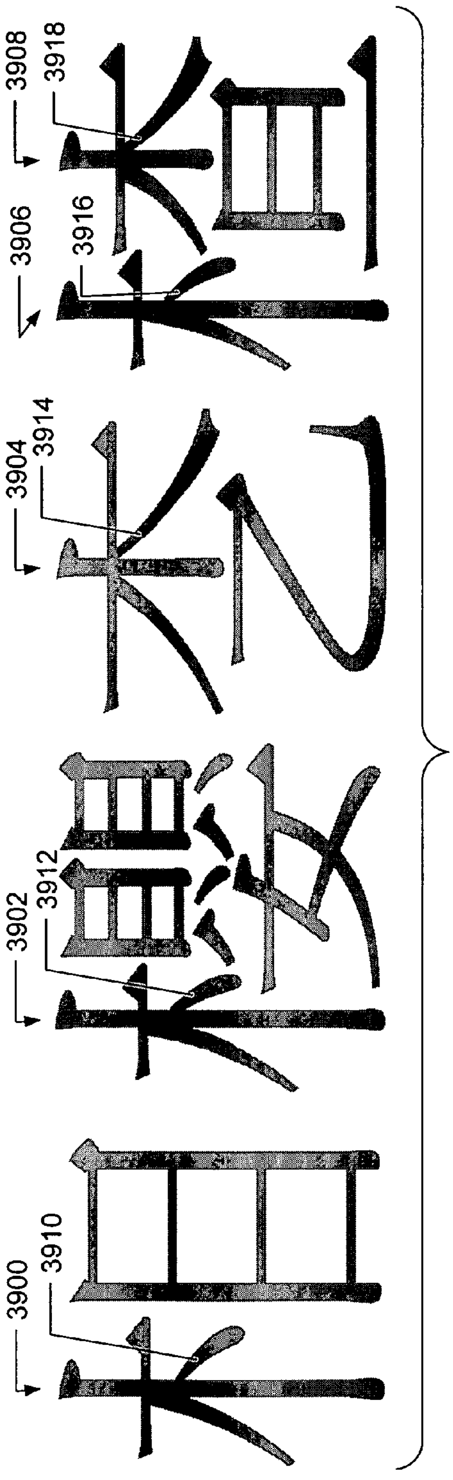
FIGS. 39A and 39B illustrate examples of stroke substitution based on glyph context.

Some radical objects may appear consistently different as components of different glyphs. For example, certain strokes of a radical may have different shapes depending on the location of the radical within a glyph. As illustrated in FIG. 39A, the right inclined stroke 3910 of radical 3900 can appear differently depending on whether the radical 3900 is the rightmost component of the glyph (compare 3916 and 3918). If the radical is the rightmost component of a glyph (like radicals 3904 and 3908), then the stroke is relatively long and has a wide lower ending (like strokes 3914 and 3918). If the radical has another glyph component (such as another radical) to the right side (as for radicals 3900, 3902, and 3906), then the stroke is shorter and has a rounded lower ending (like strokes 3910, 3912, and 3916). The appearance of the stroke differs so significantly in these two situations that, in at least some fonts in accordance with the invention, the stroke may be described by two different stroke objects that substitute for one another depending on the context of the radical component in a specific glyph (rather than being described by a single modifiable stroke object).

Figure 39B:
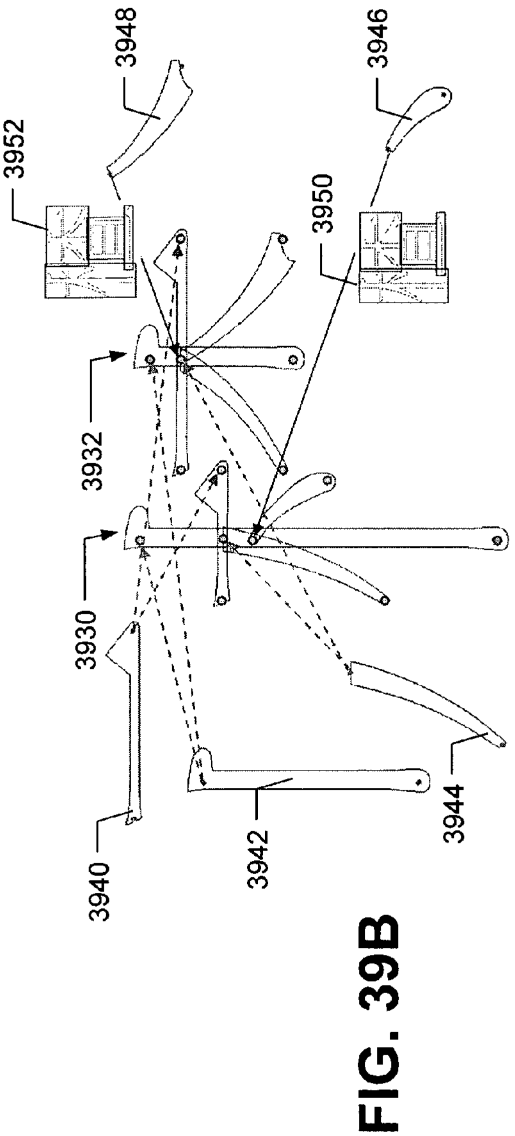

Stroke substitution in accordance with examples of the invention may be performed by a conditional rule associated with a radical object. For example, FIG. 39B illustrates an example implementation of stroke substitution for a composite radical object composed from shape-modifiable stroke components. A conditional rule associated with the radical object can receive information regarding the arrangement of the guiding frames in a specific glyph and can decide (based on this information) which stroke component to use in a particular instance of the radical. As illustrated, instances of the stroke objects 3940, 3942, and 3944 always will participate as components for any instance of this radical. In addition, stroke 3948 will be selected if no other guiding frame is located in the glyph to the right side of the guiding frame of the radical (as in the case of radical instance 3932 and the corresponding guiding frame 3952). Otherwise, stroke 3946 will be selected (as for the radical instance 3930 and the corresponding guiding frame 3950). For every one of the selected stroke components, a rule associated with the radical computes input parameters associated with the stroke objects (for example, locations of the guiding points) and passes the parameters to the rules.

Similar to the case of stroke reduction, stroke substitution in accordance with examples of the invention may be applied in the most natural way to composite radical objects composed from stroke components. It also may be applied to the simple radical objects by deformation of the geometrical data associated with the radicals. In this case the stroke substitution will be supported by a modification rule rather than by a compilation rule.

Support for the stroke-substitution functionality may be considered less significant or critical than support for the stroke reduction functionality, because the radical still will consistently appear in any specific glyph, independent of the run-time information. Also, instead of support of the stroke-substitution functionality, a font representation may contain two (slightly) different radical objects so that any specific glyph can reference either one of the radicals as its component. This approach increases somewhat the number of font objects and results in repeatability of some parts of the rules associated with different font objects, but it may decrease the complexity of the design and compilation for glyph and radical objects that otherwise would involve application of stroke substitution rules.

H. Implementation Rules Based on TrueType Hinting Language

If geometrical data associated with font objects has a True Type-compatible mathematical representation, then rules associated with the objects can be naturally supported by the TrueType hinting language. Such implementation allows reuse of significant elements of currently existing TrueType font format and the TrueType rendering engine. If a font representation makes use of some of the proposed approaches, then a TrueType hinting language (TrueType instruction set) can be extended to provide direct support for some basic operations. Such extension will allow improved run-time performance, help reduce font size, and help reduce the design complexity of a font representation. Extension of the TrueType instruction set typically should be accompanied by a corresponding extension of the rendering engine functionality. For example, some basic operations that may be added to the TrueType instruction set can be related to: managing multiple (trajectory and/or outline-based) geometrical descriptions associated with an object (including support for choice of and access to the geometrical data); guiding frame-based control (including, for example, support for pixel-hinting of the bounding boxes and guiding frames standard methods of attachment of the guiding points and/or primary geometrical data to a bounding box and/or guiding frame; standard methods of attachment of the geometrical data to the guiding points); stroke reduction/stroke substitution; and complete or partial enabling/disabling of the enhancing features of a font object.

The following provides more specific examples of how the TrueType hinting language may be extended to support the various hinting approaches described in the application.

More specifically, the TrueType instruction language (including hinting instructions) can be extended with new instruction codes (or operation codes) to support various hinting approaches, including those described above. The new codes can specify additional mathematical operations that can be applied to the stored font object representations and the intermediate stages of the rendered image.

Similarly, the rendering engine also may be modified and extended with the capability (e.g., via code and functions) to recognize the additional operation codes and to perform the specified mathematical operations.

A more specific example is a new "stroke-reduction" hint instruction that can be applied to one or more horizontal strokes of specific font object representations to guide (or "instruct") the rendering engine as to which strokes can be removed (or ignored) in a context where not enough pixels are available in the vertical direction to distinctly render every horizontal stroke of the font object. The rendering engine capabilities would be extended to look for and recognize a new "stroke-reduction" instruction code (e.g., under conditions of "low available pixels"), and it would then "assemble" the appropriate rendered image from the remaining component parts.

V. Example Data Structures

As described above, at least some examples of the present invention provide geometrical data for rendering font objects from plural independently designed font object data sets, such that different font object data sets may be used for compiling and rendering a font object, depending on various run-time conditions such as: desired text size, rendering device size, rendering device resolution, individual glyph density or complexity, available ppem for the font object, available pixel region configuration for the font object, contextual information, and the like. In at least some examples of the invention, a font representation will include at least trajectory-based geometrical data and outline-based geometrical data for the same font objects. These geometrical data sets may be independently designed, specially targeted for predetermined run-time conditions.

Figure 40:
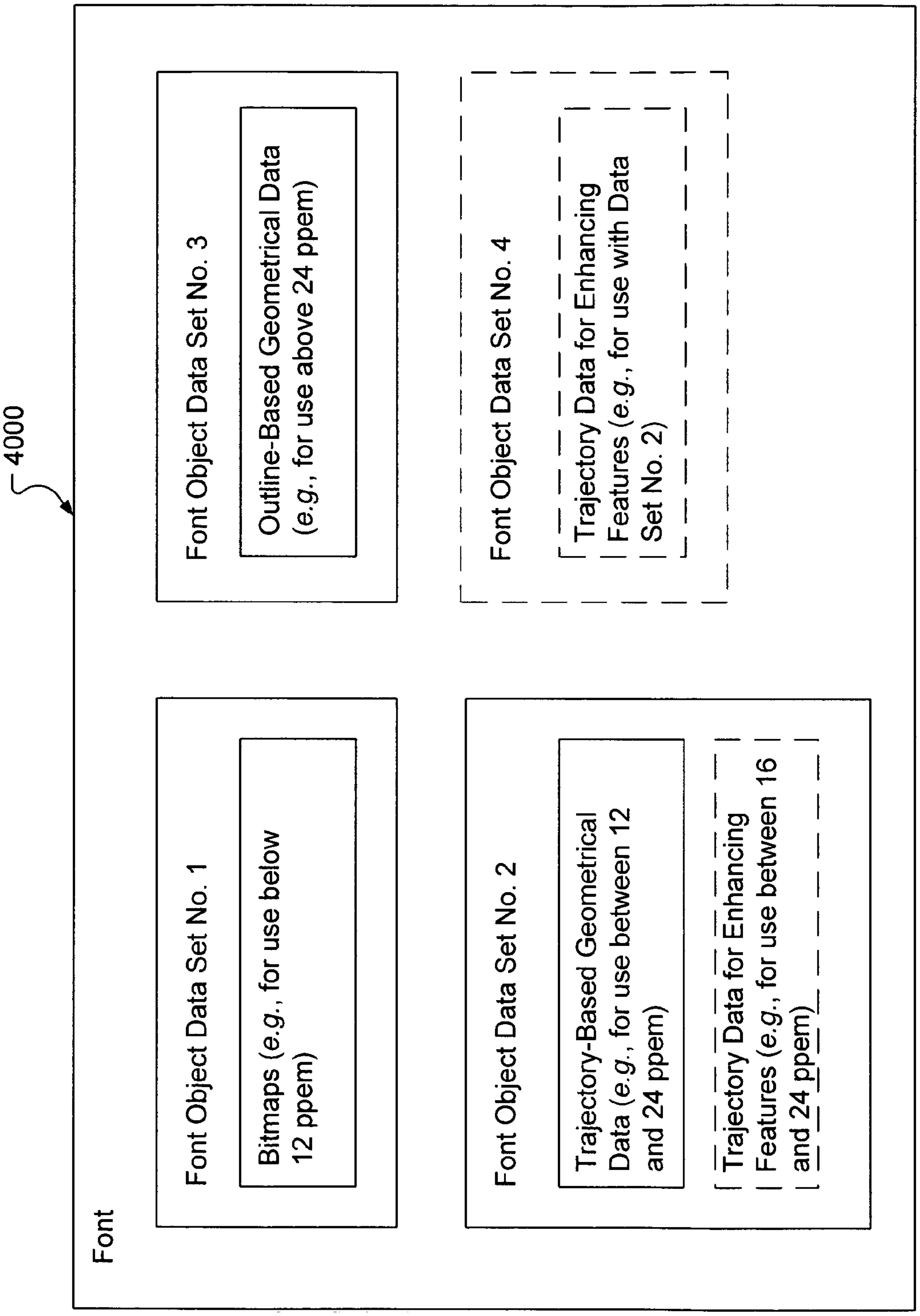
FIG. 40 illustrates an example data structure for storing a font representation in accordance with at least some examples of this invention.

FIG. 40 illustrates an example data structure 4000 for a font representation that includes a plurality of font object data sets. In the illustrated example, font object data set No. 1 includes bitmaps for various individual font objects, and code associated with the overall font representation may dictate that this data set is to be used under a certain set of conditions (e.g., when the font object is rendered at a size of less than 12 ppem, when the available pixel region is less than a certain size, etc.). Font object data set No. 2 in this example includes trajectory-based geometrical data that may be used to compile and render various font objects under a second set of conditions (e.g., between 12 and 24 ppem, at certain available pixel region sizes, etc.). Font object data set No. 3 in this example includes outline-based geometrical data that may be used to compile and render various font objects under a third set of conditions (e.g., above 24 ppem, above certain available pixel region sizes, etc.).

In font object data set No. 4 of this example, various enhancing features (such as stroke end features, serifs, or other augmenting data) are stored (e.g., as trajectory data) for use with at least the trajectory-based geometrical data present in font object data set No. 2. Alternatively, the trajectory data corresponding to the enhancing features may be stored as part of font object data set No. 2 (or No. 3), without departing from the invention (to illustrate this potential alternative arrangement, font object data set No. 4 and the enhancing feature data set of font object data set No. 2 are illustrated in broken lines). As another alternative, font object data set No. 4 also could be used to provide data for augmenting or enhancing features for use with font object data set No. 3 without departing from the invention. As still another example, if desired, font object data set No. 2 could include simple trajectory geometrical data for various font objects (e.g., for use between 12 and 16 ppem) and font object data set No. 4 could include augmented trajectory geometrical data for the various font objects, e.g., for use between 16 and 24 ppem, without departing from the invention.

Figure 41:
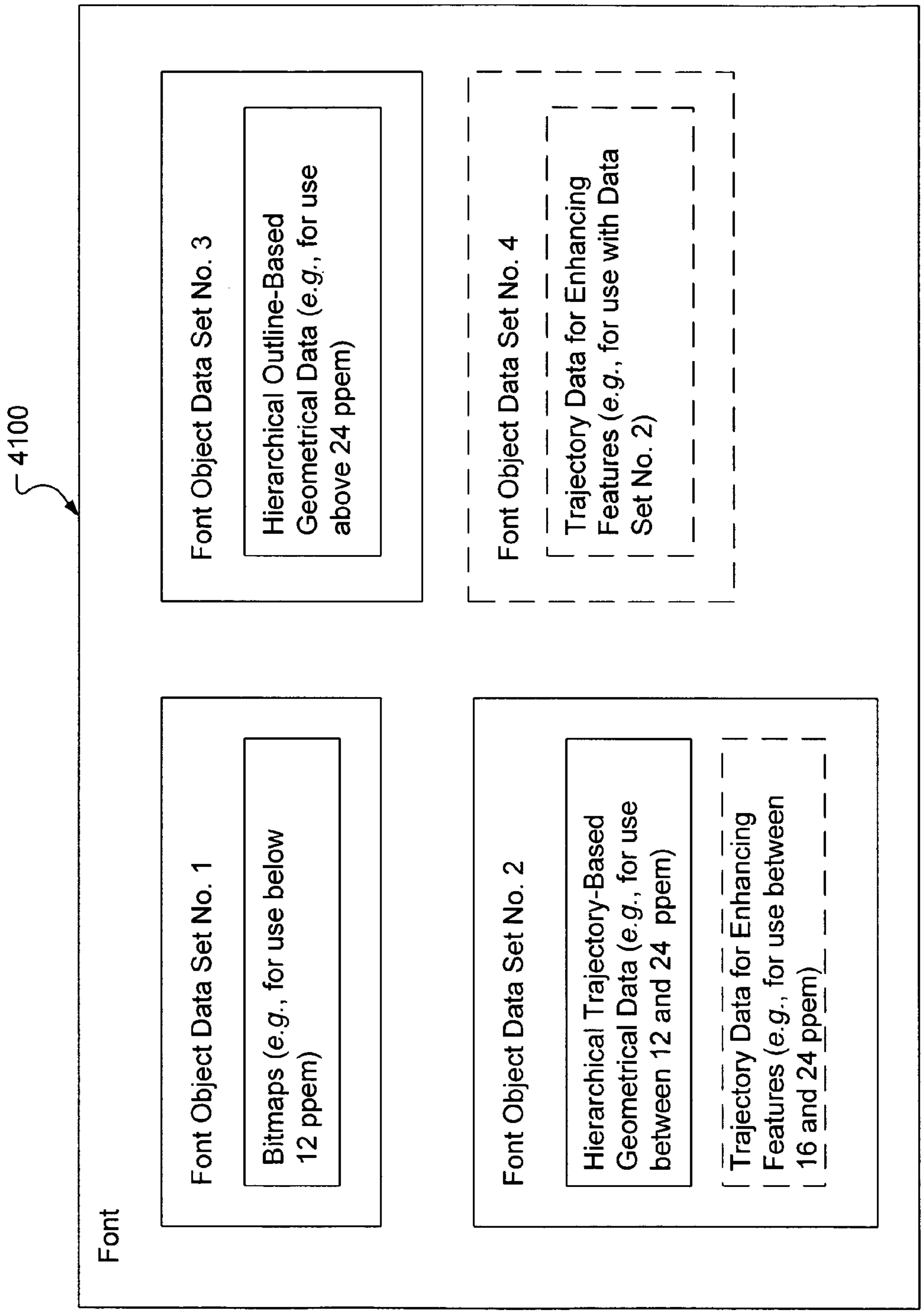
FIG. 41 illustrates an example data structure for storing a hierarchical font representation in accordance with at least some examples of this invention.

FIG. 41 illustrates another example data structure 4100 for a font representation that includes a plurality of font object data sets that may be used in accordance with at least some examples of this invention. In this illustrated example, font object data set No. 1 again includes bitmaps for various individual font objects, and code associated with the font may dictate that this data set is to be used under a certain set of conditions (e.g., when the font object is rendered at a size of less than 12 ppem, when the available pixel region is less than a certain size, etc.). Font object data set No. 2 in this example includes hierarchical trajectory-based geometrical data (e.g., data in the glyph/radical/stroke format described above) that may be used to compile and render various font objects under a second set of conditions (e.g., between 12 and 24 ppem, at a certain range of available pixel region sizes, etc.). Font object data set No. 3 in this example includes hierarchical outline-based geometrical data that may be used to compile and render various font objects under a third set of conditions (e.g., above 24 ppem, above certain available pixel region sizes, etc.).

As described above in conjunction with FIG. 40, geometrical data relating to enhancing features (e.g., trajectory based data) for use in connection with font object data set Nos. 2 and/or 3, may be stored as a separate font object data set (e.g., font object data set No. 4) or it may be stored as part of one or more of the other font object data sets (e.g., as part of data set No. 2 or No. 3). Alternatively, as also described above in connection with FIG. 40, in this data structure 4100, font object data set No. 2 could include simple trajectory geometrical data for various font objects (e.g., for use between 12 and 16 ppem) and font object data set No. 4 could include augmented trajectory geometrical data for the various font objects, e.g., for use between 16 and 24 ppem, without departing from the invention.

If desired, the conditions under which any font object will be used may be separately stored or embodied in code associated with the font object at any location in the data structures 4000 or 4100 without departing from the invention. For example, code or data may be included or associated with the geometrical data relating to an individual font object, at any level of a hierarchical structure including the font object (if any), and/or at any other suitable or desired location.

Of course, other variations on the data structures for font representations are possible without departing from the invention. For example, a font representation need not include all of the font object data sets illustrated in FIGS. 40 and 41. Rather, aspects and examples of the present invention may include font representations having any number of data sets and font object data stored in any suitable format or structure, without departing from the invention.

VI. Example Hardware

Figure 42:
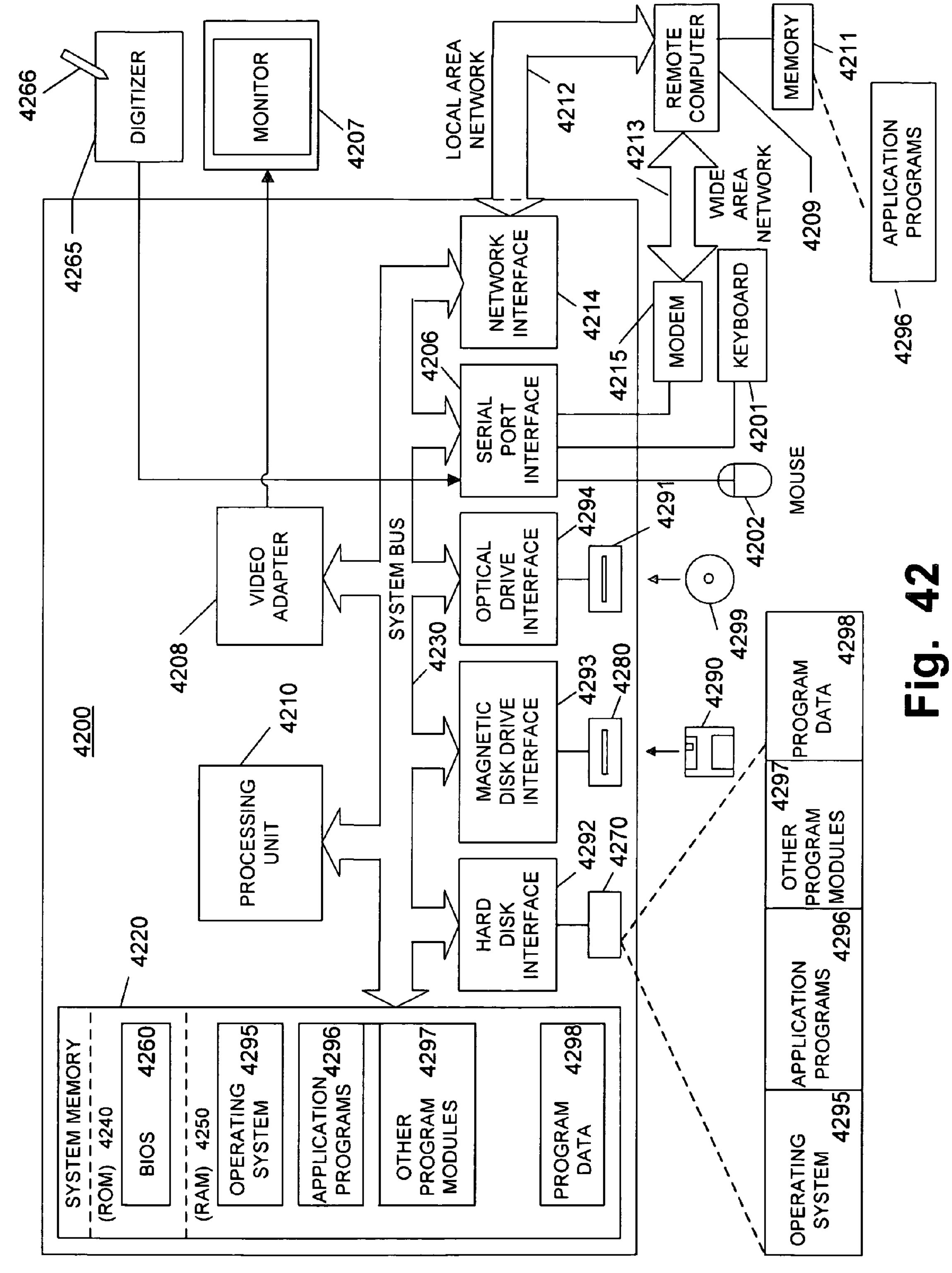
FIGS. 42 and 43 illustrate example components of a hardware system on which aspects of the present invention may be practiced.

As noted above, the various fonts and methods according to the invention, including those described above, can be used with any computer system and/or rendering device without departing from the invention. FIG. 42 illustrates a schematic diagram of an illustrative example general-purpose digital computing environment that can be used to implement various aspects of the present invention. In FIG. 42, a computer 4200 includes a processing unit 4210, a system memory 4220, and a system bus 4230 that couples various system components, including the system memory 4220, to the processing unit 4210. The system bus 4230 may be any of several types of bus structures including a memory bus or memory controller, a peripheral bus, and a local bus using any of a variety of bus architectures. The system memory 4220 includes read only memory (ROM) 4240 and random access memory (RAM) 4250.

A basic input/output system 4260 (BIOS) containing the basic routines that help to transfer information between elements within the computer 4200, such as during start-up, is stored in the ROM 4240. The computer 4200 also includes a hard disk drive 4270 for reading from and/or writing to a hard disk (not shown), a magnetic disk drive 4280 for reading from and/or writing to a removable magnetic disk 4290, and an optical disk drive 4291 for reading from and/or writing to a removable optical disk 4299, such as a CD ROM or other optical media. The hard disk drive 4270, magnetic disk drive 4280, and optical disk drive 4291 are connected to the system bus 4230 by a hard disk drive interface 4292, a magnetic disk drive interface 4293, and an optical disk drive interface 4294, respectively. The drives and their associated computer-readable media provide nonvolatile storage of computer-readable instructions, data structures, program modules, and other data for the personal computer 4200. It will be appreciated by those skilled in the art that other types of computer-readable media that can store data that is accessible by a computer, such as magnetic cassettes, flash memory cards, punch cards, digital video disks, Bernoulli cartridges, random access memories (RAMs), read only memories (ROMs), and the like, also may be used in the example operating environment without departing from the invention.

A number of program modules can be stored on the hard disk drive 4270, magnetic disk 4290, optical disk 4299, ROM 4240, or RAM 4250, including an operating system 4295, one or more application programs 4296, other program modules 4297, and program data 4298. A user can enter commands and information into the computer 4200 through input devices, such as a keyboard 4201 and a pointing device 4202. Other input devices (not shown) may include a microphone, joystick, game pad, satellite dish, scanner, or the like. These and other input devices often are connected to the processing unit 4210 through a serial port interface 4206 that is coupled to the system bus 4230, but they may be connected by other interfaces, such as a parallel port, game port, a universal serial bus (USB), or the like. Further still, these devices may be coupled directly to the system bus 4230 via an appropriate interface (not shown). A monitor 4207 or other type of display device also is connected to the system bus 4230 via an interface, such as a video adapter 4208. In addition to the monitor 4207, personal computers typically include other peripheral output devices (not shown), such as speakers and printers. In one example, a pen digitizer 4265 and accompanying pen or stylus 4266 are provided in order to digitally capture freehand electronic ink input. Although a direct connection between the pen digitizer 4265 and the serial port interface 4206 is shown, in practice, the pen digitizer 4265 may be coupled to the processing unit 4210 directly, to a parallel port, to another interface, and to the system bus 4230, as known in the art. Furthermore, although the digitizer 4265 is shown apart from the monitor 4207, the usable input area of the digitizer 4265 may be co-extensive with the display area of the monitor 4207. Further still, the digitizer 4265 may be integrated in the monitor 4207, or may exist as a separate device overlaying or otherwise appended to the monitor 4207.

The computer 4200 can operate in a networked environment using logical connections to one or more remote computers, such as remote computer 4209. The remote computer 4209 can be a server, a router, a network PC, a peer device, or other common network node, and it typically includes many or all of the elements described above relative to the computer 4200, although only a memory storage device 4211 has been illustrated in FIG. 42. The example logical connections depicted in FIG. 42 include a local area network (LAN) 4212 and a wide area network (WAN) 4213. Such networking environments are commonplace in offices, enterprise-wide computer networks, intranets, and the Internet, using both wired and wireless connections.

When used in a LAN networking environment, the computer 4200 may be connected to the local network 4212 through a network interface or adapter 4214. When used in a WAN networking environment, the personal computer 4200 typically includes a modem 4215 or other means for establishing communications over the wide area network 4213, such as the Internet. The modem 4215, which may be internal or external to the computer 4200, may be connected to the system bus 4230 via the serial port interface 4206. In a networked environment, program modules depicted relative to the personal computer 4200, or portions thereof, may be stored in the remote memory storage device 4211.

It will be appreciated that the network connections shown are illustrative and other techniques for establishing a communications link between the computers can be used. The existence of any of various well-known protocols such as TCP/IP, UDP, Ethernet, FTP, HTTP, and the like is presumed, and the system can be operated in a client-server configuration to permit a user to retrieve web pages from a web-based server. Any of various conventional web browsers can be used to display and manipulate data on web pages.

Figure 43:
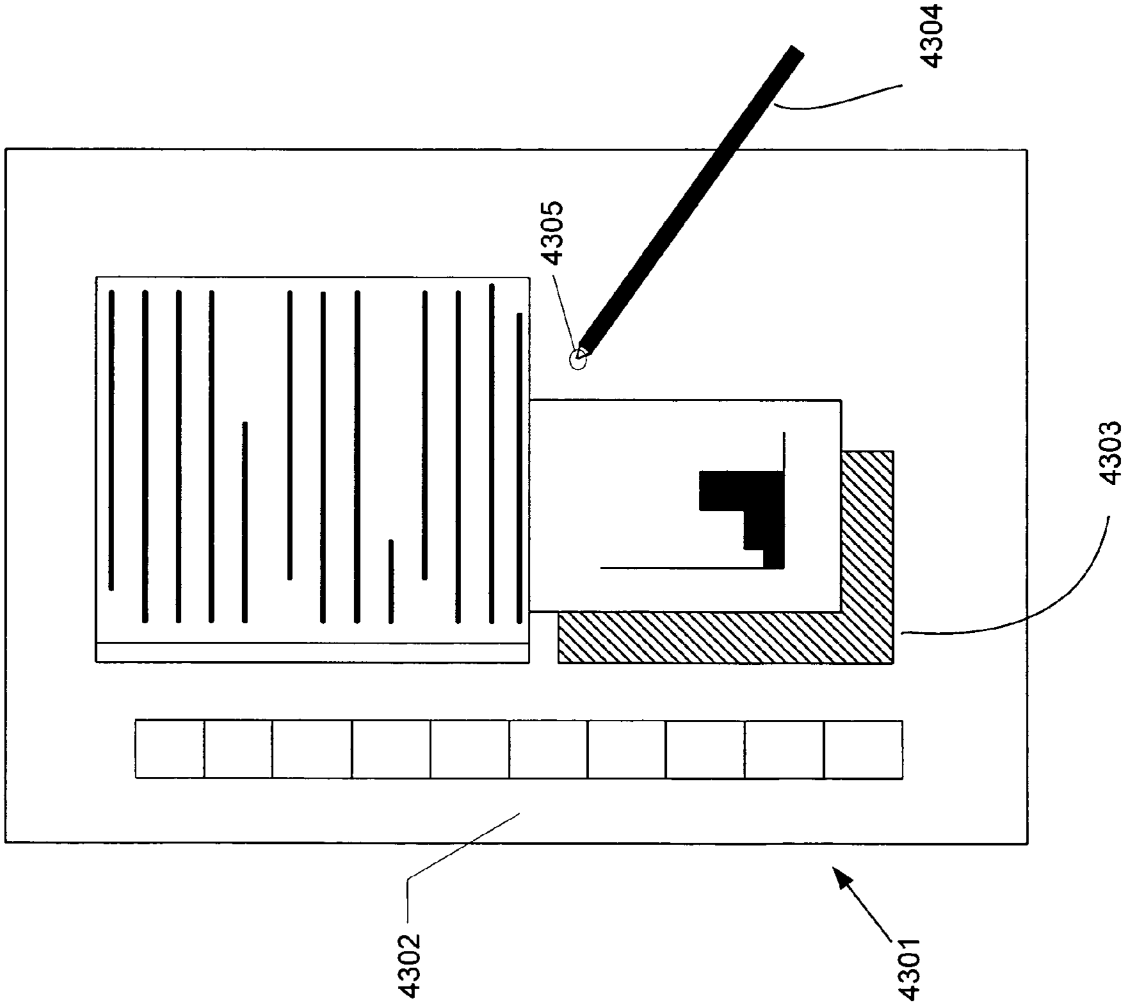

FIG. 43 illustrates an illustrative pen or stylus-based computing system 4301 (e.g., a tablet PC, PDA, or the like) that can be used in accordance with various aspects of the present invention. Any or all of the features, subsystems, and functions in the system of FIG. 42 can be included in or used with the computing system of FIG. 43. Pen or stylus-based computing system 4301 includes a display surface 4302, e.g., a digitizing flat panel display, such as a liquid crystal display (LCD) screen, on which a plurality of windows 4303 is displayed. Using stylus 4304, a user can select, highlight, and/or write on the digitizing display surface 4302. Examples of suitable digitizing display surfaces 4302 include electromagnetic pen digitizers, such as pen digitizers available from Mutoh Co. (now known as FinePoint Innovations Co.) or Wacom Technology Co. Other types of pen digitizers, e.g., optical digitizers, also may be used. The pen or stylus-based computing system 4301 interprets gestures made using stylus 4304 in order to manipulate data, enter text, create drawings, and/or execute conventional computer application tasks, such as spreadsheets, word processing programs, and the like.

The stylus 4304 may be equipped with one or more buttons or other features to augment its capabilities. In one example, the stylus 4304 could be implemented as a “pencil” or “pen,” in which one end constitutes a writing portion and the other end constitutes an “eraser” end that, when moved across the display, indicates portions of the display to be erased. Other types of input devices, such as a mouse, a trackball, or the like could be used. Additionally, a user’s own finger could be the stylus 4304 and used for selecting or indicating portions of the displayed image on a touch-sensitive or proximity-sensitive display. Consequently, the term “user input device,” as used herein, is intended to have a broad definition and encompasses many variations on well-known input devices, such as stylus 4304. Region 4305 shows a feedback region or contact region permitting the user to determine where the stylus 4304 has contacted the display surface 4302.

Of course, the invention can be used to render fonts on any other suitable type of device without departing from the invention. For example, the invention could be used to render or display information on pocket personal computers, mobile or cellular telephones, pagers, other communication devices, watches, appliances, printers, and/or any devices that have a display screen and/or that render printed information.

VII. Conclusion

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. Various changes and modifications may be made without departing from the spirit and scope of the invention, as defined in the appended claims.

The invention claimed is:

1. A method for rendering a desired font object, comprising:

receiving input data representing the desired font object to be rendered, wherein the input data includes information indicating that the desired font object includes at least a first portion and a second portion, information indicating nominal positions of the first and second portions in the desired font object, and information indicating nominal sizes of the first and second portions in the desired font object;

obtaining, based at least on the input data, a first data set for rendering the first portion of the desired font object, wherein the first data set includes data relating to a first guiding frame associated with at least the first portion of the desired font object;

obtaining, based at least on the input data, a second data set for rendering the second portion of the desired font object, wherein the second data set includes data relating to a second guiding frame associated with the second portion of the desired font object; and rendering the desired font object using at least the input data, the first data set, and the second data set, wherein the input data including information indicating the nominal positions and nominal sizes of the first and second portions of the desired font object define nominal relative positioning and nominal relative sizing of the first and second guiding frames, and wherein the first data set is used in determining at least one of a displayed relative position or displayed relative size of the first and second guiding frames during the rendering, the displayed position and/or size of the second portion in the rendered font object being based at least on the position and/or size of the second guiding frame, the displayed position being different than the nominal position of the second portion and/or the displayed size being different than the nominal size of the second portion.

2. A method according to claim 1, wherein the data relating to the first guiding frame is used in determining the position of at least some part of the second guiding frame.

3. A computer storage media including computer-executable instructions stored thereon for performing a method according to claim 1.

4. A method according to claim 1, wherein, during the rendering, the first guiding frame has a relative position with respect to the second guiding frame selected from the group consisting of: an overlapping orientation, an intersecting orientation, the first guiding frame is fully contained within the second guiding frame, and the first guiding frame fully contains the second guiding frame.

5. A method according to claim 1, wherein the first portion contains multiple independent sub-portions.

6. The method according to claim 1, wherein the displayed position and/or size of the second portion in the rendered font object is based at least on the position and/or size of the first portion.

7. A method for rendering a desired font object, the method comprising:

accessing data representing the desired font object to be rendered, wherein the data includes information indicating that the desired font object includes at least a first portion and a second portion;

retrieving, based on the data, information relating to the first portion and the second portion, the information comprising a first guiding frame related to the first portion, a second guiding frame related to the second portion, first modification information related to the first guiding frame and second modification information related to the second guiding frame;

generating a first pixel set based on runtime information, the first guiding frame and the first modification information;

generating a second pixel set based on the runtime information, the second guiding frame and the second modification information; and rendering the desired font object using at least the first pixel set and the second pixel set.

8. The method according to claim 7, wherein the data representing the desired font object is used in determining the position of at least some part of the first portion and the second portion of the desired font object.

9. A computer storage media including computer-executable instructions stored thereon for performing the method according to claim 7.

10. A method according to claim 7, wherein, during the rendering, the first guiding frame has a relative position with respect to the second guiding frame selected from a group consisting of: an overlapping orientation, an intersecting orientation, the first guiding frame is fully contained within the second guiding frame, and the first guiding frame fully contains the second guiding frame.

11. A method according to claim 7, wherein the first portion contains multiple independent sub-portions.

12. The method according to claim 7, wherein:

the first modification information comprises a first modification rule specifying an appearance of the first portion relative to the first guiding frame under at least one runtime condition; and the second modification information comprises a second modification rule specifying an appearance of the second portion relative to the second guiding frame under at least one runtime condition.

13. A method for rendering a desired font object, comprising:

receiving input data representing the desired font object to be rendered, wherein the inputdata includes information indicating that the desired font object includes at least a first portion and a second portion, information indicating positions of the first and second portions in the desired font object, and information indicating sizes of the first and second portions in the desired font object;

receiving a first data set for rendering the first portion of the desired font objects wherein the first data set includes data relating to a first guiding frame associated with at least the first portion of the desired font object;

receiving a second data set for rendering the second portion of the desired font object, wherein the second data set includes data relating to a second guiding frame associated with the second portion of the desired font object; and rendering the desired font object using at least the input data, the first data set, and the second data set, wherein the input data including information indicating the positions and sizes of the first and second portions of the desired font object are used in defining positioning and sizing of the first and second guiding frames, and wherein the first data set is used in hinting a position and/or size the second guiding frame relative to the first guiding frame during the rendering and wherein a displayed position and/or size of the second portion relative to the first portion in the rendered font object is based at least on the hinted position of the second guiding frame.

14. A computer storage media including computer-executable instructions stored thereon for performing a method according to claim 13.

15. A method for rendering a desired font object, comprising:

receiving input data representing the desired font object to be rendered, wherein the input data includes information indicating that the desired font object includes at least a first portion and a second portion, information indicating positions of the first and second portions in the desired font object, and information indicating sizes of the first and second portions in the desired font object;

receiving a first data set for rendering the first portion of the desired font object, wherein the first data set includes data relating to a first guiding frame associated with the first portion of the desired font object the first data set comprising first modification information related to the first guiding frame;

receiving a second data set for rendering the second portion of the desired font object, wherein the second data set includes data relating to a second guiding frame associated with the second portion of the desired font object the second data set comprising second modification information related to the second guiding frame; and rendering the desired font object using at least the input data, the first data set, and the second data set, wherein the input data including information indicating the positions and sizes of the first and second portions of the desired font object are used in defining positioning and sizing of the first and second guiding frames, and wherein the rendering includes hinting of the first guiding frame based on the first modification information to, at least in part, control a position or size of at least a part of the first portion of the desired font object.

16. A method according to claim 15, wherein the hinting adjusts a position of at least the part of the desired font object.

17. A method according to claim 15, wherein the hinting adjusts at least one dimension of at least the part of the desired font object.

18. A computer storage media including computer-executable instructions stored thereon for performing a method according to claim 15.

* * * * *